US011885943B2

(12) United States Patent
Park et al.

(10) Patent No.: US 11,885,943 B2
(45) Date of Patent: Jan. 30, 2024

(54) LENS ASSEMBLY AND ELECTRONIC DEVICE INCLUDING THE SAME

(71) Applicant: SAMSUNG ELECTRONICS CO., LTD., Suwon-si (KR)

(72) Inventors: Hyunsung Park, Suwon-si (KR); Hyeonsoo Park, Suwon-si (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 437 days.

(21) Appl. No.: 17/039,238

(22) Filed: Sep. 30, 2020

(65) Prior Publication Data
US 2021/0132256 A1 May 6, 2021

Related U.S. Application Data

(60) Provisional application No. 62/927,964, filed on Oct. 30, 2019.

(30) Foreign Application Priority Data

Jun. 26, 2020 (KR) .......................... 10-2020-0078756

(51) Int. Cl.
*G02B 13/00* (2006.01)
*G02B 9/62* (2006.01)
(Continued)

(52) U.S. Cl.
CPC ....... *G02B 13/0055* (2013.01); *G02B 5/1871* (2013.01); *G02B 9/62* (2013.01);
(Continued)

(58) Field of Classification Search
CPC .... G02B 13/0055; G02B 5/1871; G02B 9/62; G02B 13/0045; G02B 27/0025;
(Continued)

(56) References Cited

U.S. PATENT DOCUMENTS 9,946,051 B2    4/2018  Han et al.
2006/0087737 A1 4/2006  Choi et al.
(Continued)

FOREIGN PATENT DOCUMENTS

CN   107315206 A   11/2017
CN   108873121 A   11/2018
(Continued)

OTHER PUBLICATIONS

Introduction to Modular Transfer Function, May 28, 2018, Edmund Optics, Understanding MTF (Year: 2018).*
(Continued)

*Primary Examiner* — William Choi
*Assistant Examiner* — Ray Alexander Dean
(74) *Attorney, Agent, or Firm* — Sughrue Mion, PLLC

(57) ABSTRACT

Provided is a lens assembly including a first lens having positive optical power with respect to incident light incident from an object side and having a convex surface facing the object side, and a second lens including a meta-lens having negative chromatic aberration with respect to the incident light passing through the first lens.

46 Claims, 39 Drawing Sheets

(51) Int. Cl.
  *G02B 27/00* (2006.01)
  *G02B 5/18* (2006.01)
(52) U.S. Cl.
  CPC ..... *G02B 13/0045* (2013.01); *G02B 27/0025* (2013.01); *G02B 2207/101* (2013.01)
(58) Field of Classification Search
  CPC .. G02B 2207/101; G02B 1/002; G02B 13/00; G02B 3/00; G02B 5/3083; G02B 13/006; G02B 13/18; G02B 15/144111; G02B 15/145127; G02B 27/0087; G02B 27/50
  See application file for complete search history.

(56) References Cited

U.S. PATENT DOCUMENTS

| | | | | |
|---|---|---|---|---|
| 2011/0170846 | A1* | 7/2011 | Sung | G03B 13/36 396/90 |
| 2016/0306079 | A1 | 10/2016 | Arbabi et al. | |
| 2016/0316180 | A1* | 10/2016 | Han | G02B 13/0055 |
| 2017/0212285 | A1* | 7/2017 | Arbabi | G02B 1/002 |
| 2018/0267270 | A1 | 9/2018 | Han et al. | |
| 2018/0299595 | A1 | 10/2018 | Arbabi et al. | |
| 2019/0154877 | A1 | 5/2019 | Capasso et al. | |
| 2020/0174163 | A1* | 6/2020 | Han | G02B 5/189 |
| 2020/0355913 | A1 | 11/2020 | Park et al. | |
| 2021/0014394 | A1 | 1/2021 | Han et al. | |
| 2021/0103075 | A1 | 4/2021 | Park et al. | |
| 2021/0149081 | A1 | 5/2021 | Groever et al. | |
| 2022/0260754 | A1* | 8/2022 | Dobashi | G02B 1/002 |

FOREIGN PATENT DOCUMENTS

| | | | |
|---|---|---|---|
| CN | 109799611 A | 5/2019 | |
| CN | 110161611 A | 8/2019 | |
| CN | 110376665 A | 10/2019 | |
| JP | 2019-516128 A | 6/2019 | |
| KR | 10-2006-0036234 A | 4/2006 | |
| KR | 10-2013-0064684 A | 6/2013 | |
| KR | 10-1846021 B1 | 4/2018 | |
| KR | 10-1905444 B1 | 12/2018 | |
| KR | 10-2019-0040681 A | 4/2019 | |
| KR | 10-2020-0129034 A | 11/2020 | |
| WO | WO-2017176921 A1 * | 10/2017 | G02B 1/00 |
| WO | 2018/204856 A1 | 11/2018 | |
| WO | 2019/164849 A1 | 8/2019 | |

OTHER PUBLICATIONS

Wei Ting Chen et al., "A broadband achromatic metalens for focusing and imaging in the visible", Supplemental Information for, Nature Nanotechnology, 2018, 16 pages total.
Communication dated Mar. 12, 2021, issued by the European Patent Office in European Application No. 20202799.1.
Wei Ting Chen et al., "A broadband achromatic metalens for focusing and imaging in the visible." Nature Nanotechnology, Mar. 2018, vol. 13, pp. 220-226 (8 pages total).
Chen Wei Ting et al: "Supplementary Video to A broadband achromatic metalens for focusing and imaging in the visible", video—https://static-content.springer.com/esm/art%3A10.1038% 2Fs41565-017-0034-6/MediaObjects/41565_2017_34_MOESM2_ ESM.mov.
Wei Ting Chen et al., "A broadband achromatic metalens for focusing and imaging in the visible", (manuscript), Jan. 1, 2018, pp. 1-30 (30 pages total).
Ehsan Arbabi et al., "Controlling the sign of chromatic dispersion in diffractive optics with dielectric metasurfaces", Optica, Jun. 2017, vol. 4, No. 6, pp. 625-632 (8 pages total).
Sajan Shrestha et al., "Broadband achromatic dielectric metalenses", Light: Science & Applications, Nov. 7, 2018, vol. 7, No. 85, pp. 1-11 (11 pages total).
Ke Li et al., "Dispersion controlling meta-lens at visible frequency", Optics Express, Sep. 4, 2017, vol. 25, No. 18, pp. 21419-21427 (9 pages total).
J. Engelberg et al., "Near-IR wide field-of-view Huygens metalens for outdoor imaging applications", Jan. 22, 2019, pp. 1-21 (21 pages total).
Mohammadreza Khorasaninejad et al., "Metalenses at visible wavelengths: Diffraction-limited focusing and subwavelength resolution imaging", Science, Jun. 3, 2016, vol. 352, No. 6290, pp. 1190-1194 (6 pages total).
Communication dated Oct. 27, 2023, issued by the China National Intellectual Property Administration in Chinese Application No. 202011184540.1.
Communication dated Oct. 27, 2023, issued by the China National Intellectual Property Administration in Chinese Application No. 202011037157.3.
Groever et al., "Supplementary Information for: Meta-Lens Doublet in the Visible Region," Nano Lett, vol. 17, No. 8, 2017, Total 11 pages.
Li et al., "Metalens-Based Miniaturized Optical Systems," Micromachines 2019, vol. 10, No. 310, 2019, Total 21 pages.

* cited by examiner

LENS ASSEMBLY AND ELECTRONIC DEVICE INCLUDING THE SAME

CROSS-REFERENCE TO RELATED APPLICATIONS

This application claims the benefit of U.S. Provisional Application No. 62/927,964, filed on Oct. 30, 2019, in the U.S. Patent and Trademark Office, and priority to Korean Patent Application No. 10-2020-0078756, filed on Jun. 26, 2020 in the Korean Intellectual Property Office, the disclosures of which are incorporated herein in their entireties by reference.

BACKGROUND

1. Field

Example embodiments of the present disclosure relate to a lens assembly including a meta-lens and an electronic device including the lens assembly.

2. Description of the Related Art

A digital camera or video camera having an image sensor such as a charge coupled device (CCD) or a complementary metal-oxide semiconductor (CMOS) is used as an optical device for image or video shooting. In order to obtain high quality images and/or videos, a lens assembly consisting of a combination of a plurality of lenses may be used in an optical device. Such lens assembly has been generally used in devices specialized in photography, such as digital cameras, but is also mounted in miniaturized electronic devices such as portable wireless terminals.

SUMMARY

One or more example embodiments provide methods of reducing a space required to combine a plurality of optical lenses.

One or more example embodiments also provide miniaturized lens assemblies including a meta-lens.

One or more example embodiments also provide electronic devices including a miniaturized lens assembly.

Additional aspects will be set forth in part in the description which follows and, in part, will be apparent from the description, or may be learned by practice of example embodiments.

According to an aspect of an example embodiment, there is provided a lens assembly including a first lens having positive optical power with respect to incident light incident from an object side and having a convex surface facing the object side, and a second lens including a meta-lens having negative chromatic aberration with respect to the incident light passing through the first lens.

The meta-lens may include a nano structure array, the meta-lens being configured to form an identical phase delay profile for at least two different wavelengths of the incident light.

The incident light may include visible light.

The lens assembly may include a total of five or more lenses.

The meta-lens may satisfy the following equation: $f_{M1}\lambda_1 = f_{M2}\lambda_2 = f_{M3}\lambda_3$, where $f_{M1}$ is a focal length of the meta-lens for light of a first wavelength $\lambda_1$ of the incident light, $f_{M2}$ is a focal length of the meta-lens for light of a second wavelength $\lambda_2$ of the incident light, and $f_{M3}$ is a focal length of the meta-lens for light of a third wavelength $\lambda_3$ of the incident light.

The second lens may further include a refractive lens having positive optical power with respect to the incident light passing through the meta-lens, a surface of the refractive lens facing the object side being in contact with the meta-lens.

The lens assembly may satisfy the following expression: $0.8*F0<F1<1.2*F0$, where $F1$ is a focal length of the first lens and $F0$ is a composite focal length of the lens assembly.

The lens assembly may satisfy the following expression: $0.85*F0<TTL<1.2*F0$, where $TTL$ is a total track length of the lens assembly and $F0$ is a composite focal length of the lens assembly.

An effective radius of a surface facing the object side of the first lens may be greater than an effective radius of a surface facing the object side of the second lens.

The nano structure array may include a plurality of nano structures, wherein the plurality of nano structures may include a first phase shift layer configured to react with incident light passing through the first lens and change a phase of the incident light passing through the first lens, and a second phase shift layer configured to change a phase of incident light passing through the first phase shift layer, and wherein a first nano structure of the plurality of nano structures and a second nano structure of the plurality of nano structures adjacent to the first nano structure satisfy the following expressions: $N11>N21$, and $N12<N22$, where $N11$ is an effective refractive index of the first phase shift layer of the first nano structure, $N12$ is an effective refractive index of the second phase shift layer of the first nano structure, $N21$ is an effective refractive index of the first phase shift layer of the second nano structure, and $N22$ is an effective refractive index of the second phase shift layer of the second nano structure.

The nano structure array may include a plurality of nano structures, wherein the plurality of nano structures may include a first phase shift layer configured to react with incident light passing through the first lens and changes a phase of the incident light passing through the first lens, and a second phase shift layer configured to change a phase of incident light passing through the first phase shift layer, and wherein a first nano structure of the plurality of nano structures and a second nano structure of the plurality of nano structures adjacent to the first nano structure satisfy the following equation:

$$\frac{\frac{(D11-D21)}{D11}}{(N11-N21)} \neq \frac{\frac{(D22-D12)}{D12}}{(N22-N12)},$$
$$\quad\quad N11 \quad\quad\quad\quad N12$$

where $N11$ is an effective refractive index of the first phase shift layer of the first nano structure, $N12$ is an effective refractive index of the second phase shift layer of the first nano structure, $N21$ is an effective refractive index of the first phase shift layer of the second nano structure, $N22$ is an effective refractive index of the second phase shift layer of the second nano structure, $D11$ is dispersion of the first phase shift layer of the first nano structure, $D12$ is dispersion of the second phase shift layer of the first nano structure, $D21$ is dispersion of the first phase shift layer of the second nano structure, and $D22$ is dispersion of the second phase shift layer of the second nano structure.

The nano structure array may include a plurality of nano structures, wherein the plurality of nano structures may include a first phase shift layer configured to react with incident light passing through the first lens and changes a phase of the incident light passing through the first lens, and a second phase shift layer configured to change a phase of incident light passing through the first phase shift layer, wherein the first phase shift layer includes a first inner post and a first structure surrounding the first inner post, wherein the second phase shift layer includes a second inner post and a second structure surrounding the second inner post, wherein the first inner post and the first structure respectively includes materials having different refractive indices, and wherein the second inner post and the second structure respectively includes materials having different refractive indices.

The first inner post may include an air post.

The lens assembly may further include a third lens having negative optical power with respect to the incident light passing through the second lens and having a concave surface facing the image side, a fourth lens having positive optical power with respect to the incident light passing through the third lens and having a concave surface facing the object side, a fifth lens having positive optical power with respect to the incident light passing through the fourth lens and having a concave surface facing the object side, and a sixth lens having negative optical power with respect to the incident light passing through the fifth lens and having a concave surface facing the object side.

The meta-lens may include a first meta-lens, and wherein the lens assembly further includes a second meta-lens and at least one lens provided between the first meta-lens and the second meta-lens.

The lens assembly may further include an infrared filter configured to remove light in an infrared wavelength band of the incident light, and a surface of the second meta-lens contacts the infrared filter.

According to another aspect of an example embodiment, there is provided an electronic device including a lens assembly including a plurality of lenses provided from an object side to an image side, an image sensor configured to detect an image of the object based on incident light passing through the plurality of lenses sequentially, and an image signal processor configured to store or output an image, wherein the lens assembly includes a first lens having positive optical power with respect to incident light incident from the object side and having a convex surface facing the object side, and a second lens including a meta-lens having negative chromatic aberration with respect to the incident light passing through the first lens.

The meta-lens may include a nano structure array, the meta-lens being configured to form an identical phase delay profile for at least two different wavelengths of the incident light.

The incident light may be visible light.

The lens assembly may include a total of five or more lenses.

The meta-lens satisfies the following equation: $f_{M1}\lambda_1 = f_{M2}\lambda_2 = f_{M3}\lambda_3$, where $f_{M1}$ is a focal length of the meta-lens for light of a first wavelength $\lambda_1$ of the incident light, $f_{M2}$ is a focal length of the meta-lens for light of a second wavelength $\lambda_2$ of the incident light, and $f_{M3}$ is a focal length of the meta-lens for light of a third wavelength $\lambda_3$ of the incident light.

The second lens further includes a refractive lens having positive optical power with respect to the incident light passing through the meta-lens, a surface facing the object side of the second lens being in contact with the meta-lens.

The lens assembly may satisfy the following expression: $0.8*F0 < F1 < 1.2*F0$, where F1 is a focal length of the first lens and F0 is a composite focal length of the lens assembly.

The lens assembly may satisfy the following expression: $0.85*F0 < TTL < 1.2*F0$, where TTL is a total track length of the lens assembly and F0 is a composite focal length of the lens assembly.

An effective radius of a surface facing the object side of the first lens may be greater than an effective radius of a surface facing the object side of the second lens.

The nano structure array may include a plurality of nano structures, wherein the plurality of nano structures include a first phase shift layer configured to react with incident light passing through the first lens and change a phase of the incident light passing through the first lens, and a second phase shift layer configured to change a phase of incident light passing through the first phase shift layer, and wherein a first nano structure of the plurality of nano structures and a second nano structure of the plurality of nano structures adjacent to the first nano structure satisfy the following expressions: N11>N21, and N12<N22, where N11 is an effective refractive index of the first phase shift layer of the first nano structure, N12 is an effective refractive index of the second phase shift layer of the first nano structure, N21 is an effective refractive index of the first phase shift layer of the second nano structure, and N22 is an effective refractive index of the second phase shift layer of the second nano structure.

The nano structure array may include a plurality of nano structures, wherein the plurality of nano structures include a first phase shift layer configured to react with incident light passing through the first lens and change a phase of the incident light, and a second phase shift layer configured to change a phase of incident light passing through the first phase shift layer, and wherein a first nano structure of the plurality of the nano structures and a second nano structure of the plurality of nano structures adjacent to the first nano structure satisfy the following equation:

$$\frac{\frac{(D11-D21)}{D11}}{(N11-N21)} \neq \frac{\frac{(D22-D12)}{D12}}{(N22-N12)},$$

where N11 is an effective refractive index of the first phase shift layer of the first nano structure, N12 is an effective refractive index of the second phase shift layer of the first nano structure, N21 is an effective refractive index of the first phase shift layer of the second nano structure, N22 is an effective refractive index of the second phase shift layer of the second nano structure, D11 is dispersion of the first phase shift layer of the first nano structure, D12 is dispersion of the second phase shift layer of the first nano structure, D21 is dispersion of the first phase shift layer of the second nano structure, and D22 is dispersion of the second phase shift layer of the second nano structure.

The nano structure array may include a plurality of nano structures, wherein the plurality of nano structures include a first phase shift layer configured to react with incident light passing through the first lens and change a phase of the incident light, and a second phase shift layer configured to change a phase of incident light passing through the first phase shift layer, wherein the first phase shift layer includes a first inner post and a first structure surrounding the first inner post, wherein the second phase shift layer includes a second inner post and a second structure surrounding the second inner post, wherein the first inner post and the first structure respectively include materials having different refractive indices, and wherein the second inner post and the second structure respectively include materials having different refractive indices.

The first inner post may include an air post.

The electronic device may further include a third lens having negative optical power with respect to the incident light passing through the second lens and having a concave surface facing the image side, a fourth lens having positive optical power with respect to the incident light passing through the third lens and having a concave surface facing the object side, a fifth lens having positive optical power with respect to the incident light passing through the fourth lens and having a concave surface facing the object side, and a sixth lens having negative optical power with respect to the incident light passing through the fifth lens and having a concave surface facing the object side.

The meta-lens may include a first meta-lens, and the lens assembly may further include a second meta-lens and at least one lens provided between the first meta-lens and the second meta-lens.

The lens assembly may further include an infrared filter configured to remove light in an infrared wavelength band of the incident light, and a surface of the second meta-lens may contact the infrared filter.

According to yet another aspect of an example embodiment, there is provided a meta-lens including nano structures including a first phase shift layer configured to react with incident light to change a phase of the incident light, and a second phase shift layer configured to change the phase of the incident light passing through the first phase shift layer, wherein the nano structures are configured to form an identical phase delay profile for at least two different wavelengths of the incident light.

The incident light may be visible light.

The meta-lens may satisfy the following equation: $f_{M1}\lambda_1 = f_{M2}\lambda_2 = f_{M3}\lambda_3$, where $f_{M1}$ is a focal length of the meta-lens for light of a first wavelength $\lambda_1$ of the incident light, $f_{M2}$ is a focal length of the meta-lens for light of a second wavelength $\lambda_2$ of the incident light, and $f_{M3}$ is a focal length of the meta-lens for light of a third wavelength $\lambda_3$ of the incident light.

A first nano structure of one of the nano structures and a second nano structure adjacent to the first nano structure may satisfy the following expressions: N11>N21, and N12<N22, where N11 is an effective refractive index of the first phase shift layer of the first nano structure, N12 is an effective refractive index of the second phase shift layer of the first nano structure, N21 is an effective refractive index of the first phase shift layer of the second nano structure, N22 is an effective refractive index of the second phase shift layer of the second nano structure.

A first nano structure of one of the nano structures and a second nano structure adjacent to the first nano structure may satisfy the following equation:

$$\frac{\frac{(D11-D21)}{D11}}{\frac{(N11-N21)}{N11}} \neq \frac{\frac{(D22-D12)}{D12}}{\frac{(N22-N12)}{N12}},$$

where N11 is an effective refractive index of the first phase shift layer of the first nano structure, N12 is an effective refractive index of the second phase shift layer of the first nano structure, N21 is an effective refractive index of the first phase shift layer of the second nano structure, N22 is an effective refractive index of the second phase shift layer of the second nano structure, D11 is dispersion of the first phase shift layer of the first nano structure, D12 is dispersion of the second phase shift layer of the first nano structure, D21 is dispersion of the first phase shift layer of the second nano structure, and D22 is dispersion of the second phase shift layer of the second nano structure.

The first phase shift layer may include a first inner post and a first structure surrounding the first inner post, wherein the second phase shift layer includes a second inner post and a second structure surrounding the second inner post, wherein the first inner post and the first structure respectively include materials having different refractive indices, and wherein the second inner post and the second structure respectively include materials having different refractive indices.

The first inner post may include an air post.

The second inner post may include a material having a higher refractive index than a refractive index of the first inner post.

The first inner post and the second inner post respectively may have a post shape with a width to height ratio of 2 or more.

The meta-lens may further include a support layer configured to support the first phase shift layer and the second phase shift layer.

The meta-lens may further include a spacer layer provided between the first phase shift layer and the second phase shift layer.

According to yet another aspect of an example embodiment, there is provided an electronic device including a lens assembly including a plurality of lenses provided from an object side to an image side, an image sensor configured to detect an image of an object from incident light passing through the plurality of lenses sequentially, and an image signal processor configured to store or output an image, wherein the lens assembly includes a first lens having positive optical power with respect to incident light incident from the object side and having a convex surface facing the object side, and a second lens including a meta-lens having negative chromatic aberration with respect to the incident light passing through the first lens, wherein the lens assembly has a modulation transfer function of 0.5 or more at 120 cycles/mm or less for incident light, and wherein the electronic device satisfies the following expression: TTL/ISS<0.65, where a total track length (TTL) is a total track length of the lens assembly and an image sensor size (ISS) is a diagonal length of the image sensor.

The lens assembly may include a total of five or more lenses.

The second lens may further include a refractive lens having positive optical power with respect to the incident light passing through the meta-lens, a surface facing the object side of the second lens being in contact with a surface of the meta-lens facing the image side.

The lens assembly may satisfy the following expression: 0.8*F0<F1<1.2*F0, where F1 is a focal length of the first lens and F0 is a composite focal length of the lens assembly.

The lens assembly may satisfy the following expression: 0.85*F0<TTL<1.2*F0, where TTL is a total track length of the lens assembly and F0 is a composite focal length of the lens assembly.

Am effective radius of a surface facing the object side of the first lens may be greater than an effective radius of a surface facing the object side of the second lens.

The electronic device may further include a third lens having negative optical power with respect to the incident light passing through the second lens and having a concave surface facing the image side, a fourth lens having positive optical power with respect to the incident light passing through the third lens and having a concave surface facing the object side, a fifth lens having positive optical power with respect to the incident light passing through the fourth lens and having a concave surface facing the object side, and a sixth lens having negative optical power with respect to the incident light passing through the fifth lens and having a concave surface facing the object side.

BRIEF DESCRIPTION OF THE DRAWINGS

The above and/or other aspects, features, and advantages of certain example embodiments will be more apparent from the following description taken in conjunction with the accompanying drawings, in which.

DETAILED DESCRIPTION

Figure 1:
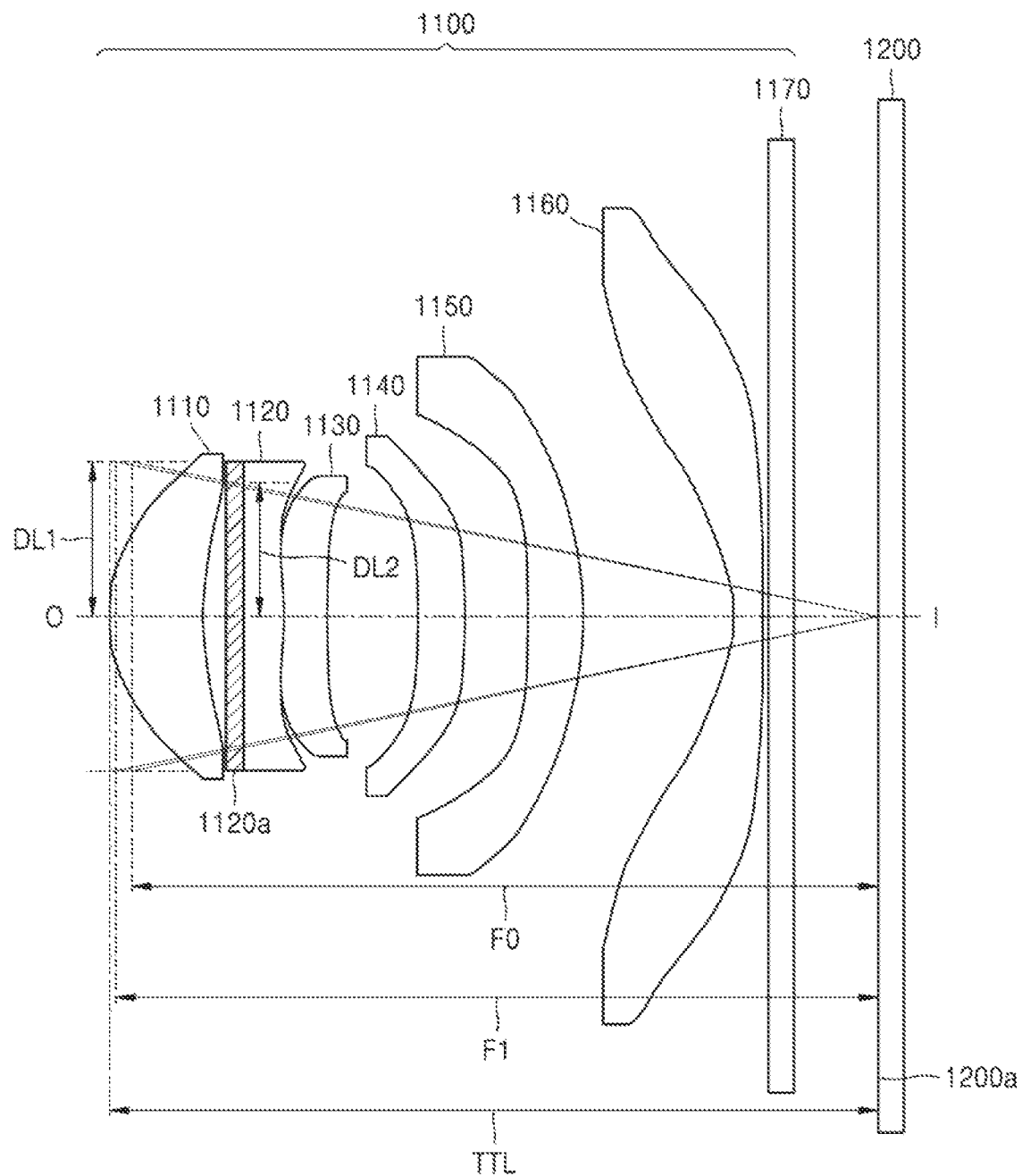
FIG. 1 is a cross-sectional view of a lens assembly including a meta-lens according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, one or more example embodiments will be described more fully with reference to the accompanying drawings. However, this does not limit the disclosure to specific example embodiments, and it should be understood that the disclosure covers all the modifications, equivalents and replacements included within the idea and technical scope of the disclosure. Similar reference numerals are assigned to similar elements throughout the specification. As used herein, the singular forms "a", "an", and "the" are intended to include the plural forms as well, unless the context clearly indicates otherwise. In the embodiments, the terms "A or B" or "A and/or B" and the like may include all possible combinations of the items listed together. It will be understood that although the terms "first", "second", "third", etc. may be used herein to describe various components, these components should not be limited by these terms. Further, when it is described that one element (e.g., first element) is "connected" or "accesses" the other element (e.g., second element), it is understood that the one element may be directly connected to or may directly access the other element but unless explicitly described to the contrary, another element (e.g., third element) may be "connected" or "access" between the elements.

In the embodiments, "configured to~" may be used interchangeably, either hardware or software, with, for example, "adapted to," "capable of," "modified to," "made to," or "designed to", depending on the situation. In some situations, the term "a device configured to~" may mean that the device "capable of~" with other devices or components. For example, the phrase "a processor configured to perform A, B, and C operations" may refer to a dedicated processor (e.g., an embedded processor) for performing operations, or a general purpose processor (e.g., a central processing unit (CPU)) capable of performing operations by executing one or more software programs stored in a memory device.

A radius of curvature, a thickness, a total track length (TTL), a focal length, and the like of a lens may all have a unit of mm unless otherwise specified. Further, the thickness of the lens, a distance between lenses, and the TTL may be a distance measured based on an optical axis of the lens. In addition, in the description of a shape of the lens, that one surface is convex may mean that an optical axis portion of the surface is convex, and that one surface is concave may mean that an optical axis portion of the surface is concave. Therefore, even if it is described that one surface (an optical axis portion of the surface) of the lens is convex, an edge portion (a portion spaced a certain distance from the optical axis portion of the surface) of the lens may be concave. Similarly, even if it is described that one surface of the lens (an optical axis portion of the surface) is concave, an edge portion (a portion spaced a certain distance from the optical axis portion of the surface) of the lens may be convex. In addition, when a surface facing an image side is convex, it means that it is convex (protruding) toward the image side, and when a surface facing an object side is convex, it means that it is convex (protruding) toward the object side.

An electronic device according to the embodiments may include smart phones, tablet personal computers (PCs), mobile phones, video telephones, E-book readers, desktop PCs, laptop PCs, netbook computers, workstations, personal digital assistants (PDAs), portable multimedia players (PMPs), MP3 players, medical devices, cameras, and/or wearable devices. A wearable device may include accessory-type devices (e.g., watches, rings, bracelets, braces, necklaces, glasses, contact lenses, or a head-mounted device (HMD)), textile or garment-integrated devices (e.g., electronic apparel), body-attachment devices (e.g., a skin pad or tattoos), and/or implantable circuits. In some embodiments, the electronic device may include televisions (TVs), digital video disk (DVD) players, audio players, refrigerators, air conditioners, vacuum cleaners, ovens, microwave ovens, washing machines, air purifiers, set-top boxes, home automation control panels, security control panels, media boxes (e.g., Samsung HomeSync™, Apple TV™, or Google TV™), game consoles (e.g., Xbox™, PlayStation™), electronic dictionaries, electronic keys, camcorders, and/or electronic photo frames.

The electronic device may also include various medical devices (e.g., various portable medical measuring instruments (such as a blood glucose meter, a heart rate meter, a blood pressure meter, or a body temperature meter), magnetic resonance angiography (MRA), magnetic resonance imaging (MRI), computed tomography (CT), cameras, or ultrasound devices), navigation devices, a global navigation satellite system (GNSS), an event data recorder (EDR), a flight data recorder (FDR), automotive infotainment devices, marine electronic devices (e.g., marine navigation device, gyro compass, etc.), avionics, security devices, car head units, industrial or household robots, drones, automatic teller machines (ATMs) at financial institutions, point of sale (POS) of stores, and/or Internet of Things (IoT) devices (e.g., light bulbs, various sensors, sprinkler devices, fire alarms, thermostats, street lights, toasters, exercise equipment, hot water tanks, heaters, boilers, etc.). Also, the electronic device may include a portion of furniture, a building/structure, or an automobile, an electronic board, an electronic signature receiving device, a projector, and/or any of a variety of metering devices (e.g., water, electricity, gas, or a radio wave measuring instrument). The electronic device may be flexible or may be a combination of two or more of the various devices described above. The term "user" may refer to a person using an electronic device or a device using the electronic device (e.g., an artificial intelligence electronic device). As a typical example of the electronic device, an optical device (such as a camera) may be included, and the following description is based on an embodiment in which a lens assembly is mounted on the optical device.

In describing the embodiments, some numerical values and the like may be presented, but these numerical values do not limit the scope of rights unless stated in the claims.

Figure 2:
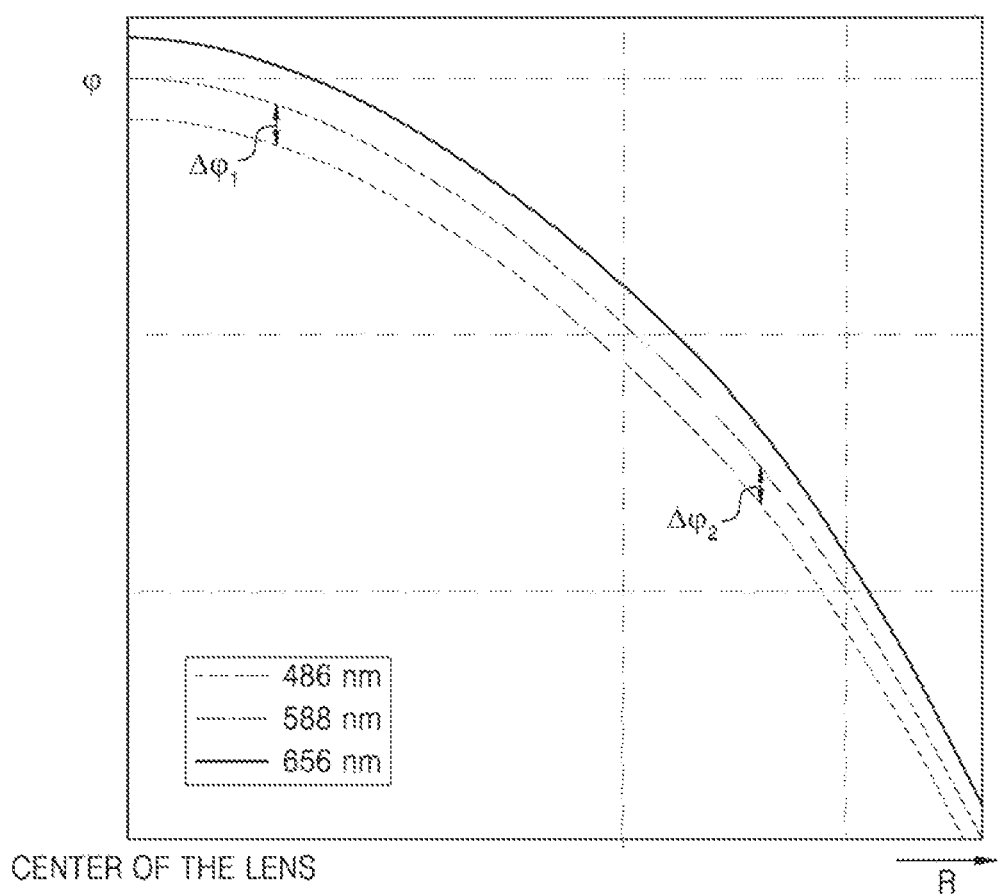
FIG. 2 illustrates a phase delay profile of light of three wavelengths having the identical phase delay profile by a meta-lens included in FIG. 1.
Figure 3:
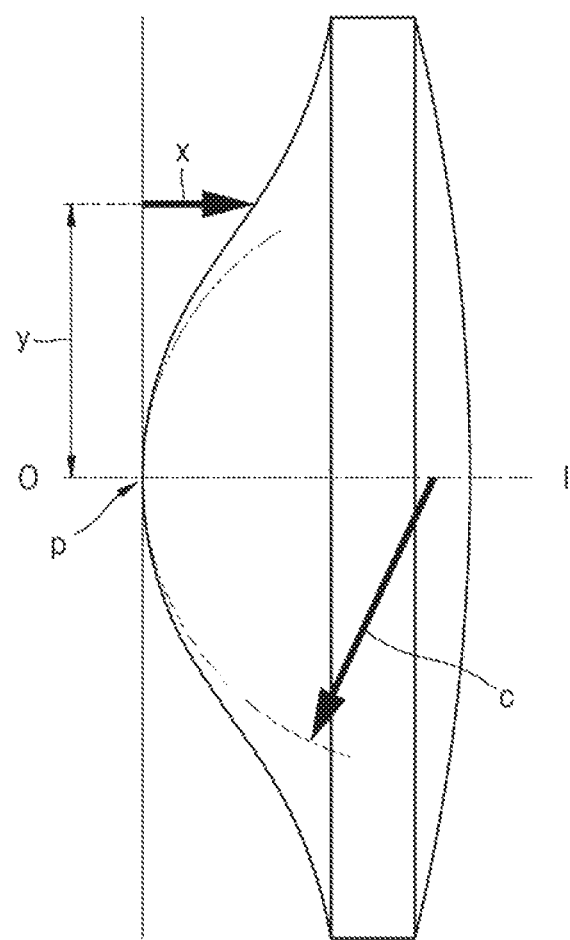
FIG. 3 illustrates a structure of an aspherical lens.

FIG. 1 is a cross-sectional view of an image sensor and a lens assembly including a meta-lens according to an example embodiment, FIG. 2 is an exemplary view of light of three wavelengths having an identical phase delay profile by a meta-lens included in FIG. 1, FIG. 3 illustrates an aspherical lens, and FIGS. 4A to 4D illustrate optical properties of the lens assembly of FIG. 1.

Referring to FIG. 1, a lens assembly 1100 may include a refractive lens made of plastic, glass, or the like, and a meta-lens made of dielectric nano structures, and may include, for example, a plurality of lenses 1110, 1120, 1130, 1140, 1150, 1160, and 1170 sequentially arranged in a direction of an optical axis O-I, a direction from an object side O in FIG. 1 to an image side I.

An image sensor 1200 is a sensor mounted on a circuit board or the like and arranged in alignment with the optical axis O-I of the lens assembly 1100, and may react to light. The image sensor 1200 may be, for example, a complementary metal-oxide semiconductor (CMOS) image sensor or a sensor such as a charge-coupled device (CCD), and may convert an object image into an electrical image signal. The image sensor 1200 may obtain an object image by detecting contrast information, gradation ratio information, color information, and the like of the object from light passing through the plurality of lenses 1110, 1120, 1130, 1140, 1150, 1160, and 1170.

The lens assembly 1100 may have the optical axis O-I from the object side O to the image side I. In explaining the configuration of each lens, the object side O may indicate a direction in which the object is located, and the image side I may indicate a direction in which an imaging plane 1200a of the image sensor 1200 where an image is formed is located. In addition, a surface facing the object side O of a lens is a surface on the object side with respect to the optical axis O-I, which is a left surface or front surface of the lens in the drawing, and a surface facing the image side I is a surface of the imaging plane 1200a side with respect to the optical axis O-I, which is a right surface or rear surface of the lens in the drawing. Here, the imaging plane 1200a may be a portion where an image is formed by an imaging device or an image sensor 1200.

In describing the lenses, a side closer to the optical axis O-I of each lens may be referred to as a chief portion, and a side far from the optical axis O-I or near an edge of the lens may be referred to as a marginal portion. The chief portion may be a portion intersecting with the optical axis O-I in the first lens 1110, and the marginal portion may include a portion spaced a certain distance from the optical axis of the first lens 1110, for example, an end portion of the lens farthest from the optical axis O-I of the lens.

The first lens 1110, the second lens 1120, the fourth lens 1140, and the fifth lens 1150 may have positive optical power, and the third lens 1130, the sixth lens 1160, and the seventh lens 1170 may have negative optical power. A lens having positive optical power is a lens based on the principle of a convex lens with a positive focal length, and may be focused by passing light incident parallel to the optical axis O-I. A lens having negative optical power is a lens based on the principle of a concave lens, and may pass light incident parallel to the optical axis and disperse the light.

A surface facing the object side O of the first lens 1110 may be convex, and a surface facing the image side I of the first lens 1110 may be concave. A meniscus lens having a concave surface toward the image side I may improve coma aberration and astigmatism, which are phenomena in which light passing through a marginal portion of a lens does not form a distinct image. The first lens 1110 may be a large-diameter lens having a larger effective radius of a surface facing the object side O than the second lens 1120 and the third lens 1130 described below. The first lens 1110, which has a large diameter with a short focal length, may satisfy the spatial constraints required by an optical device and/or an electronic device, and also provide strong positive optical power, such that a lens assembly may have a short total track length. Through this, the first lens 1110 may increase the resolution of an image or video imaged by a ray passing through the marginal portion, and may shorten a light travel path.

The second lens 1120 may be a lens in which a meta-lens 1120a is coupled to the object side O. The meta-lens 1120a may include a nano structure that modulates the phase, polarization, and/or amplitude of a wavelength of incident light. The nano structure may change a wavefront of light transmitted through the meta-lens 1120a differently from a wavefront of the incident light. The meta-lens 1120a may be designed to correct optical aberration such as geometric aberration and chromatic aberration generated by a refractive lens such as the first lens 1110 by using the nano structure.

The meta-lens 1120a has positive optical power and may provide an identical phase delay profile for light having different wavelengths passing therethrough. FIG. 2 shows an example in which light of a first wavelength (588 nm), light of a second wavelength (486 nm), and light of a third wavelength (656 nm) have an identical phase delay profile. Because the pieces of light of first to third wavelengths have an identical phase delay profile, intervals of phase delay profiles are kept constant even at different positions R ($\Delta\varphi_1 = \Delta\varphi_2$). When different wavelengths have an identical phase delay profile, the wavelength and the focal length are inversely related, and the meta-lens 1120a may have negative chromatic aberration. The relationship between the focal length and the wavelength by the meta-lens 1120a is as shown in Equation 1 below.

$$f_{M1}\lambda_1 = f_{M2}\lambda_2 = f_{M3}\lambda_3 = f_{M4}\lambda_4 \quad \text{[Equation 1]}$$

In Equation 1, $f_{Mn}$ (where n is a natural number) is a focal length of the meta-lens 1120a for light having a wavelength of $\lambda_n$ (where n is a natural number).

The first lens 1110 generates positive chromatic aberration in which light of a long wavelength has a longer focal length than light of a short wavelength, instead of providing strong positive optical power. However, because the meta-lens 1120a has negative chromatic aberration, a portion or all of the chromatic aberration caused by the first lens 1110 may be corrected. In the related art, in order to correct chromatic aberration, a lens having negative optical power is used, such as a flint lens. The loss of the optical power and the increase in a thickness of a lens assembly in related art may be improved by applying the meta-lens 1120a. A surface facing the image side I of the second lens 1120 may be configured as a convex lens.

When designing the meta-lens 1120a, Equation 2 and Equation 3 below may be referred to. In Equation 2, an Abbe number of a meta-lens providing an identical phase delay profile for different wavelengths may have a value of −3.3 to −3.5, and Equation 3 shows an example in which an Abbe number of the meta-lens 1120a is −3.45.

$$\phi_1 + \phi_2 + \cdots + \phi_N + \phi_{meta} = \phi_{sys} \quad \text{[Equation 2]}$$

$$\frac{\phi_1}{V_1} + \frac{\phi_2}{V_2} + \cdots + \frac{\phi_N}{V_N} - \frac{\phi_{meta}}{3.45} = 0 \quad \text{[Equation 3]}$$

Here, $\phi_i$ is optical power (a reciprocal of a focal length) of an $i^{th}$ refractive lens, and $V_i$ is an Abbe number of the $i^{th}$ refractive lens. $\phi_{meta}$ is optical power of a meta-lens.

A surface facing the image side I of the third lens 1130 and a surface facing the object side O of the fourth lens 1140 may be concave. For example, the third lens 1130 and the fourth lens 1140 facing concave surfaces of each other may be arranged at the rear of the second lens 1120. The third lens 1130 may compensate for spherical aberration caused by the first lens 1110 formed of a large diameter by providing negative optical power.

The surfaces facing the object side O of the fifth lens 1150 and the sixth lens 1160 are concave, and the surfaces facing the image side I of the fifth lens 1150 and the sixth lens 1160 may be convex. The sixth lens 1160 may provide appropriate negative optical power, and may form light rays passing through a marginal portion of the lens on the imaging plane 1200a. In addition, the negative optical power of the sixth lens 1160 may correct chromatic aberration and curvature of field caused by other lenses. The surface of the sixth lens 1160 facing the object side O and/or the surface facing the image side I may be aspheric to reduce or prevent distortion of light rays as the light rays pass through the marginal portion of the lens.

In addition to the surface of the sixth lens 1160, one or more surfaces of the first lens 1110 to the fifth lens 1150 may be aspheric. Spherical aberration generated by the first lens 1110 may be corrected by the aspheric surface implemented by the one or more surfaces of the first lens 1110 to the sixth lens 1160.

The seventh lens 1170 may be an optical filter, and may block light, such as infrared ray (IR), detected by a film or an image sensor of an optical device. The optical filter may include a low pass filter and/or a cover glass, and may transmit visible light but block infrared ray to prevent the infrared from being transmitted to the imaging plane 1200a of the image sensor. As another example, the optical filter may selectively transmit only a portion of a wavelength of incident light to bring a color sense of an image detected and captured through the image sensor 1200 closer to a desired color sense.

Intervals between the lenses 1110, 1120, 1130, 1140, 1150, 1160, and 1170 may be variously designed according to optical properties such as aberration characteristics, wide-angle characteristics, and/or brightness characteristics required of the lens assembly 1100. When an optical device and/or an electronic device have a relatively small size, it is advantageous to narrow a distance between the lenses to reduce a total track length of the lens assembly 1100 in the direction of an optical axis. However, reducing the total track length of the lens assembly 1100 while maintaining an appropriate telephoto ratio may have physical limitations.

The lens assembly 1100 may further include an aperture. The aperture may be arranged in various positions, and a plurality of apertures may be provided. For example, the aperture may be arranged in front of a surface facing the image side I of the first lens 1110 to control the amount of light reaching the imaging plane 1200a of the image sensor 1200.

One or more lenses of the first lenses 1110 to seventh lenses 1170 may include a surface having an inflection point. The inflection point may be a point where the sign of a radius of curvature changes from (+) to (−) or (−) to (+). For example, an inflection point may be a point in which the shape of a lens changes from convex to concave or from concave to convex. The radius of curvature may indicate a value indicating the degree of curvature at each point located on a curved surface or curve. A sign of the radius of curvature may be defined as (+) in the case of a convex shape toward the object side O and in the case of a concave shape toward the image side I, and may be defined as (−) in the case of a concave shape toward the object side O and in the case of a convex shape toward the image side I.

The lens assembly 1100 may have optical properties satisfying the following Equation 4 to Equation 7.

$$0.8*F0 < F1 < 1.2*F0$$

【Equation 4】

Here, F1 is a focal length of the first lens 1110 for light having a wavelength of 588 nm, and F0 is a composite focal length of the lens assembly 1100 for light having a wavelength of 588 nm.

$$0.85*F0 < TTL < 1.2*F0$$

【Equation 5】

Here, TTL is a total length that is a distance from a surface of the object side O of the first lens 1110 to the imaging plane 1200a. F0 may have a value of 6.5 mm to 7.5 mm.

$$DL1 > DL2$$

【Equation 6】

Here, DL1 is an effective radius of a surface of the first lens 1110 facing the object side O, and may be greater than 1.86 mm and less than 1.92 mm. DL2 is an effective radius of a surface of the second lens 1120 facing the object side O, that is, a surface of the meta-lens 1120a facing the object side O, and may be greater than 1.78 mm and less than 1.84 mm. The first lens 1110 may have a larger effective radius of the surface of the object side O than the second lens 1120. The effective radius may be a shortest distance between an optical axis and a portion farthest from the optical axis in an area of a lens through which light incident to the image sensor 1200 passes.

$$TTL/ISS < 0.65$$

【Equation 7】

Here, ISS (image sensor size) is a diagonal length of an image sensor.

Table 1 below describes a variety of lens data of the lens assembly 1100, wherein '(O)' on the right side of each lens is a surface facing an object side of the lens, and '(I)' is a surface facing an image side. Radius is a radius of curvature of each lens surface, the thickness in the '(O)' row is the thickness of the lens, Thickness in the '(I)' row is a distance between lenses or between a lens and an image sensor, an effective focal length (EFL) is a focal length of a lens, nd is a refractive index of a lens, and vd is an Abbe number of a lens. The lens assembly 1100 shown in Table 1 below shows an example in which a TTL is 7.2 mm, an effective focal length (F0) is 7.0 mm, a focal length of the meta-lens 1120a is 52.7 mm, and a diagonal length (ISS) of the image sensor 1200 is 12 mm, and may satisfy one or more conditions of Equation 4 to Equation 7 described above.

TABLE 1

| Surface | Radius | Thickness | Effective radius | EFL | nd | vd |
|---|---|---|---|---|---|---|
| First lens 1110 (O) | 3.60E+00 | 8.86E−01 | 1.89E+00 | 6.3 | 1.54 | 54 |
| First lens 1110 (I) | 9.32E+00 | 1.94E−01 | 1.81E+00 | | | |
| Second lens 1120 (O) | Infinity | 3.97E−01 | 1.81E+00 | 9.5 | | |
| Second lens 1120 (I) | −7.97E+00 | 6.78E−03 | 1.75E+00 | | 1.65 | 21.7 |
| Third lens 1130 (O) | −5.42E+01 | 4.00E−01 | 1.65E+00 | −9.5 | 1.54 | 54 |
| Third lens 1130 (I) | 1.96E+01 | 1.02E+00 | 1.50E+00 | | | |
| Fourth lens 1140 (O) | −1.79E+01 | 4.38E−01 | 1.80E+00 | 291 | 1.54 | 54 |
| Fourth lens 1140 (I) | −9.39E+00 | 5.93E−01 | 2.10E+00 | | | |
| Fifth lens 1150 (O) | −1.70E+01 | 5.18E−01 | 2.40E+00 | 12 | 1.54 | 54 |
| Fifth lens 1150 (I) | −1.70E+01 | 1.40E+00 | 3.05E+00 | | | |
| Sixth lens 1160 (O) | −3.42E+00 | 2.80E−01 | 4.18E+00 | −5.1 | 1.54 | 54 |
| Sixth lens 1160 (I) | −2.98E+01 | 1.87E−02 | 4.80E+00 | | | |
| Seventh lens 1170 (O) | Infinity | 2.00E−01 | 5.60E+00 | — | 1.52 | 64.2 |
| Seventh lens 1170 (I) | Infinity | 8.50E−01 | 5.31E+00 | | | |
| Image sensor 1200 | — | — | — | — | | |

Table 2 and Table 3 below describe aspheric coefficients of the plurality of lenses 1110, 1120, 1130, 1140, 1150, 1160, and 1170, and the aspheric coefficients may be calculated through the following Equation 8.

$$x = \frac{cy^2}{1 + \sqrt{1 - (K+1)c^2 y^2}} + Ay^2 + By^4 + Cy^6 + Dy^8 + \ldots$$

[Equation 8]

Referring to FIG. 3, in Equation 8, x may be a distance from a vertex p of a lens to a point on a lens surface in a direction of the optical axis O-I, and y may be a distance from a point on the lens surface to the optical axis in a direction perpendicular to the optical axis. In Equation 8, c may be a basic curvature of the lens, K may be a conic constant, and A, B, C, D, E, F, and G may be an aspherical coefficient.

TABLE 2

| Surface | K | A | B | C |
| --- | --- | --- | --- | --- |
| First lens 1110 (O) | 5.18E−02 | 6.94E−02 | 4.62E−02 | −1.26E−03 |
| First lens 1110 (I) | 8.81E−01 | 3.85E−02 | −8.75E−03 | −6.14E−03 |
| Second lens 1120 (O) | 0.00E+00 | −1.01E+02 | 2.71E+00 | 1.96E+01 |
| Second lens 1120 (I) | −3.36E+01 | −3.06E−03 | 1.11E−02 | 8.94E−02 |
| Third lens 1130 (O) | 9.64E+01 | −5.52E−02 | 9.65E−02 | 2.71E−01 |
| Third lens 1130 (I) | −3.02E+03 | 2.51E−03 | 8.56E−02 | −1.13E−01 |
| Fourth lens 1140 (O) | 6.70E+01 | −1.13E−02 | −1.01E−01 | −1.01E−02 |
| Fourth lens 1140 (I) | 1.74E+01 | 1.21E−02 | −1.51E−01 | 1.28E−01 |
| Fifth lens 1150 (O) | 2.47E+01 | 1.33E−02 | −6.90E−02 | −2.18E−02 |
| Fifth lens 1150 (I) | 1.26E+01 | −6.73E−02 | 2.65E−02 | −2.61E−02 |
| Sixth lens 1160 (O) | −4.89E+00 | −5.17E−02 | 1.39E−02 | 2.23E−04 |
| Sixth lens 1160 (I) | −2.64E+01 | 7.77E−03 | −2.56E−03 | −7.44E−04 |
| Seventh lens 1170 (O) | — | — | — | — |
| Seventh lens 1170 (I) | — | — | — | — |

TABLE 3

| Surface | D | E | F | G |
| --- | --- | --- | --- | --- |
| First lens 1110 (O) | −1.08E−01 | 8.52E−01 | −1.06E+00 | −7.45E+00 |
| First lens 1110 (I) | −3.10E−01 | 1.20E+00 | 3.05E+00 | 4.54E+00 |
| Second lens 1120 (O) | −8.97E+00 | 1.19E+00 | 3.73E−01 | −1.31E−01 |
| Second lens 1120 (I) | −1.32E−01 | 1.78E−01 | −1.76E−01 | 1.13E−01 |
| Third lens 1130 (O) | 1.65E−01 | 1.75E+00 | 2.95E+00 | −1.28E+00 |
| Third lens 1130 (I) | 1.48E−01 | 1.71E−01 | 7.94E−04 | −1.62E−01 |
| Fourth lens 1140 (O) | 2.58E−01 | −9.27E−01 | 1.32E+00 | −8.25E−01 |
| Fourth lens 1140 (I) | −2.37E−01 | 2.31E−01 | −2.89E−02 | −1.63E−01 |
| Fifth lens 1150 (O) | 6.38E−03 | −1.31E−02 | 5.38E−03 | 3.01E−03 |
| Fifth lens 1150 (I) | 5.82E−03 | 1.09E−03 | −4.78E−04 | −1.69E−04 |
| Sixth lens 1160 (O) | −1.11E−04 | −9.85E−06 | 2.46E−07 | 1.11E−07 |
| Sixth lens 1160 (I) | 1.10E−05 | 3.95E−06 | −1.43E−07 | −9.89E−09 |
| Seventh lens 1170 (O) | — | — | — | — |
| Seventh lens 1170 (I) | — | — | — | — |

Figure 4A:
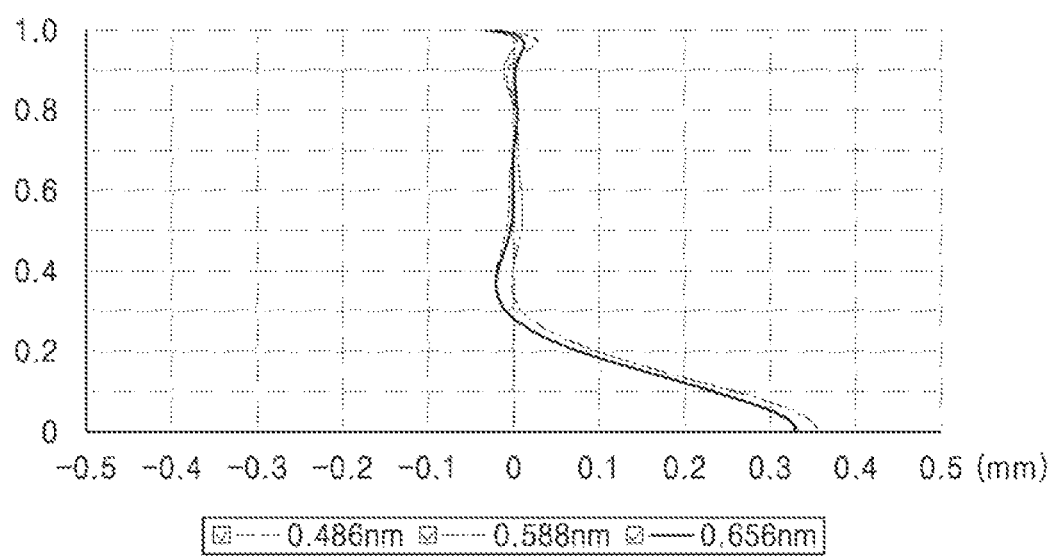
FIGS. 4A, 4B, 4C, and 4D illustrate optical properties of the lens assembly of FIG. 1.

FIG. 4A is a graph illustrating spherical aberration of the lens assembly 1100 of FIG. 1. The spherical aberration indicates the degree of change in the position of focus of light passing through different portions of a lens, for example, a chief portion and a marginal portion.

In FIG. 4A, the horizontal axis indicates the degree of longitudinal spherical aberration, the vertical axis indicates a distance from the center of an optical axis by normalization, and a change in longitudinal spherical aberration according to a wavelength of light may be shown. FIG. 4A shows spherical aberration for light of 486 nm, 588 nm, and 656 nm. The longitudinal spherical aberration of the lens assembly 1100 may be −0.50 mm to +0.50 mm, −0.30 mm to +0.40 mm, or −0.10 mm to +0.35 mm. According to FIG. 4A, it can be seen that the longitudinal spherical aberration is limited to −0.10 mm to +0.35 mm, showing stable optical properties.

Figure 4B:
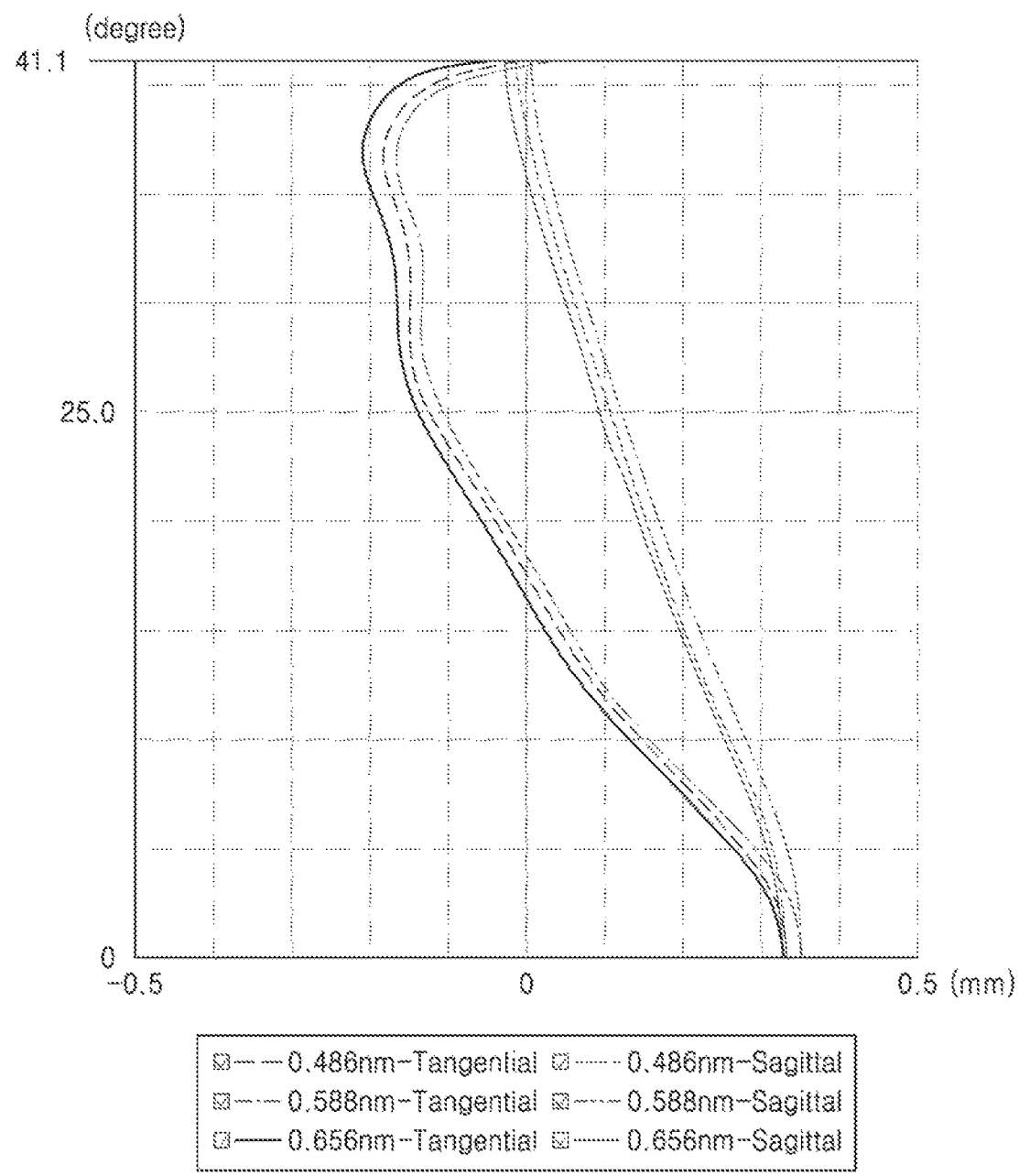

FIG. 4B is a graph illustrating astigmatism of the lens assembly 1100 of FIG. 1. Astigmatism indicates the degree of deviation of the focus of light passing in vertical and horizontal directions when a meridian plane and a sagittal plane of the lens have different radii.

In FIG. 4B, the horizontal axis indicates the degree of astigmatism, and the vertical axis indicates an angle of incidence of light, and shows a change of astigmatism for light at 486 nm, 588 nm, and 656 nm. Solid lines indicate astigmatism in a tangential direction, and dashed lines indicate astigmatism in a sagittal direction. As can be seen through FIG. 4B, the astigmatism of the lens assembly 1100 is limited to −0.50 mm to +0.50 mm, and more specifically −0.30 mm to +0.40 mm to show stable optical properties.

Figure 4C:
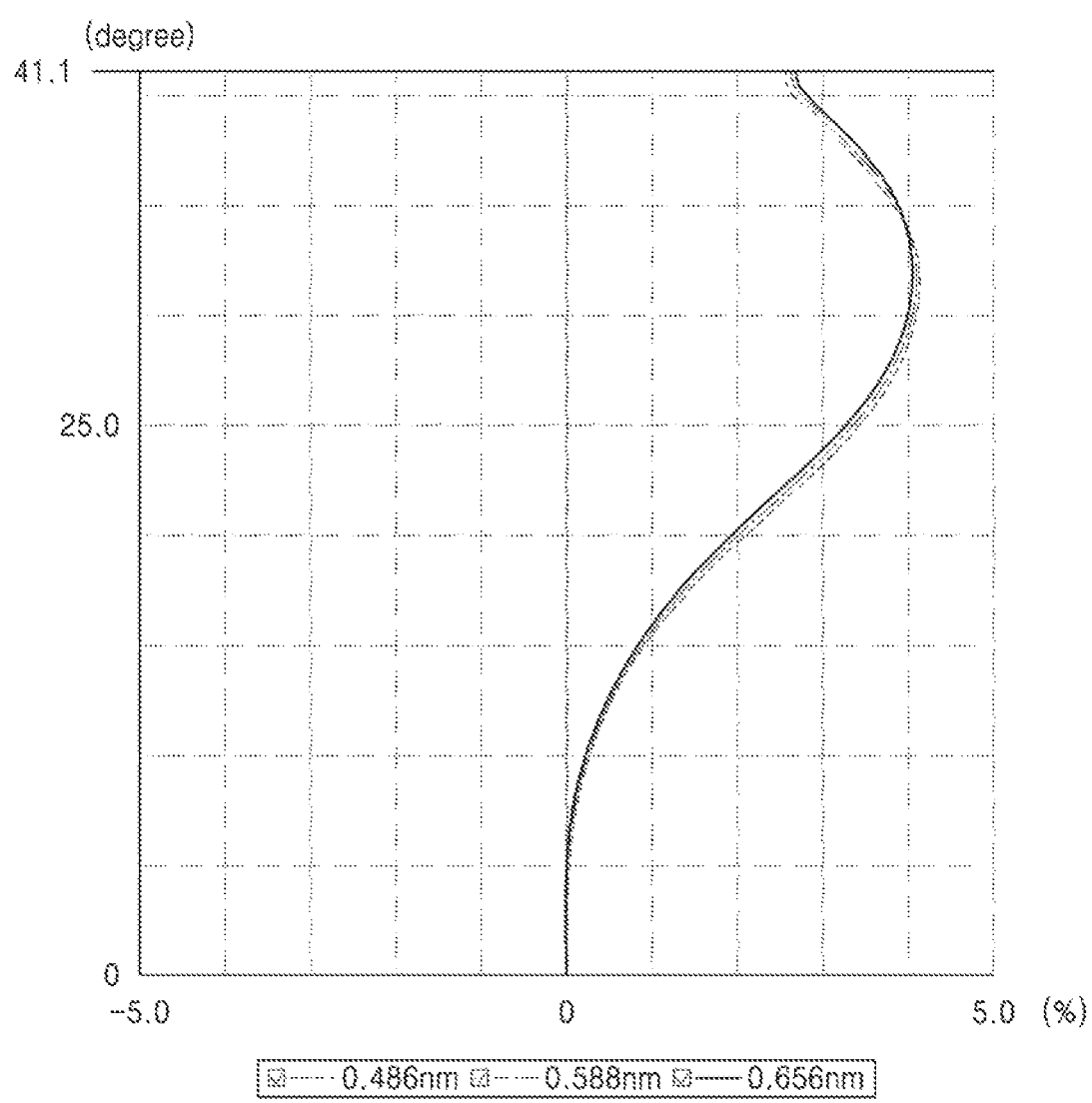

FIG. 4C is a graph illustrating distortion of the lens assembly 1100 of FIG. 1. The distortion occurs because optical magnification varies according to a distance from the optical axis O-I, and shows the degree to which an image formed on the actual imaging plane 1200a looks larger or smaller than an image formed on a theoretical imaging plane.

In FIG. 4C, the horizontal axis indicates the degree of distortion, and the vertical axis indicates the angle of incidence of light, and shows distortion for light having a wavelengths of 486 nm, 588 nm, and 656 nm, and a distortion rate may be less than 5% or less than 4.2%. Referring to FIG. 4C, it can be seen that the lens assembly 1100 exhibits good optical properties with a distortion rate of less than 4.2%.

Figure 4D:
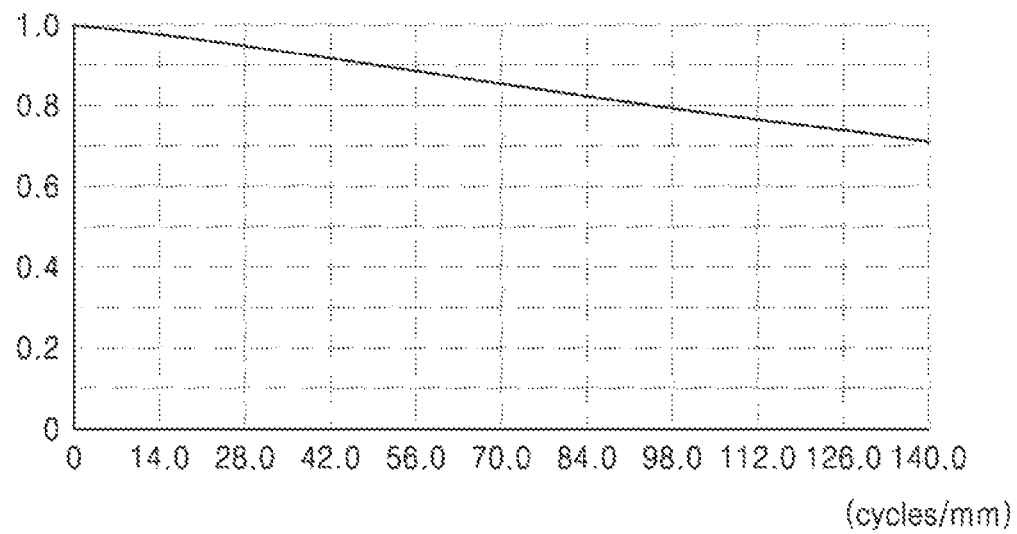

FIG. 4D is a graph showing a modulation transfer function (MTF) of the lens assembly 1100 of FIG. 1. The MTF may be used as an index to measure the resolution of a lens, that is, how little light rays originating from one point pass through the lens and converge to another point. The horizontal axis in FIG. 4D indicates 'cycles/mm'. For example, 120 cycles/mm may indicate a pattern in which 120 black stripes and 120 white stripes are crossed in 1 mm. The vertical axis in FIG. 4D indicates the MTF, and when the MTF is 0.5 or more, it can be seen that it has a resolution capable of distinguishing black stripes from white band stripes. It can be seen that the lens assembly 1100 exhibits an MTF of 0.5 or more, specifically 0.7 or more, at 120 cycles/mm with respect to normal incident light (0.0 field) of a pattern in a tangential direction.

Although the lens assembly 1100 of FIG. 1 illustrates a configuration including one meta-lens, the lens assembly may include two or more meta-lenses. In addition, although FIG. 1 illustrates that the meta-lens is arranged on an object side of the second lens 1120, the meta-lens may be independently arranged without being combined with a refractive lens, or its position may be changed. For example, the meta-lens may be arranged on an image side of the first lens 1110 or the second lens 1120.

Figure 5:
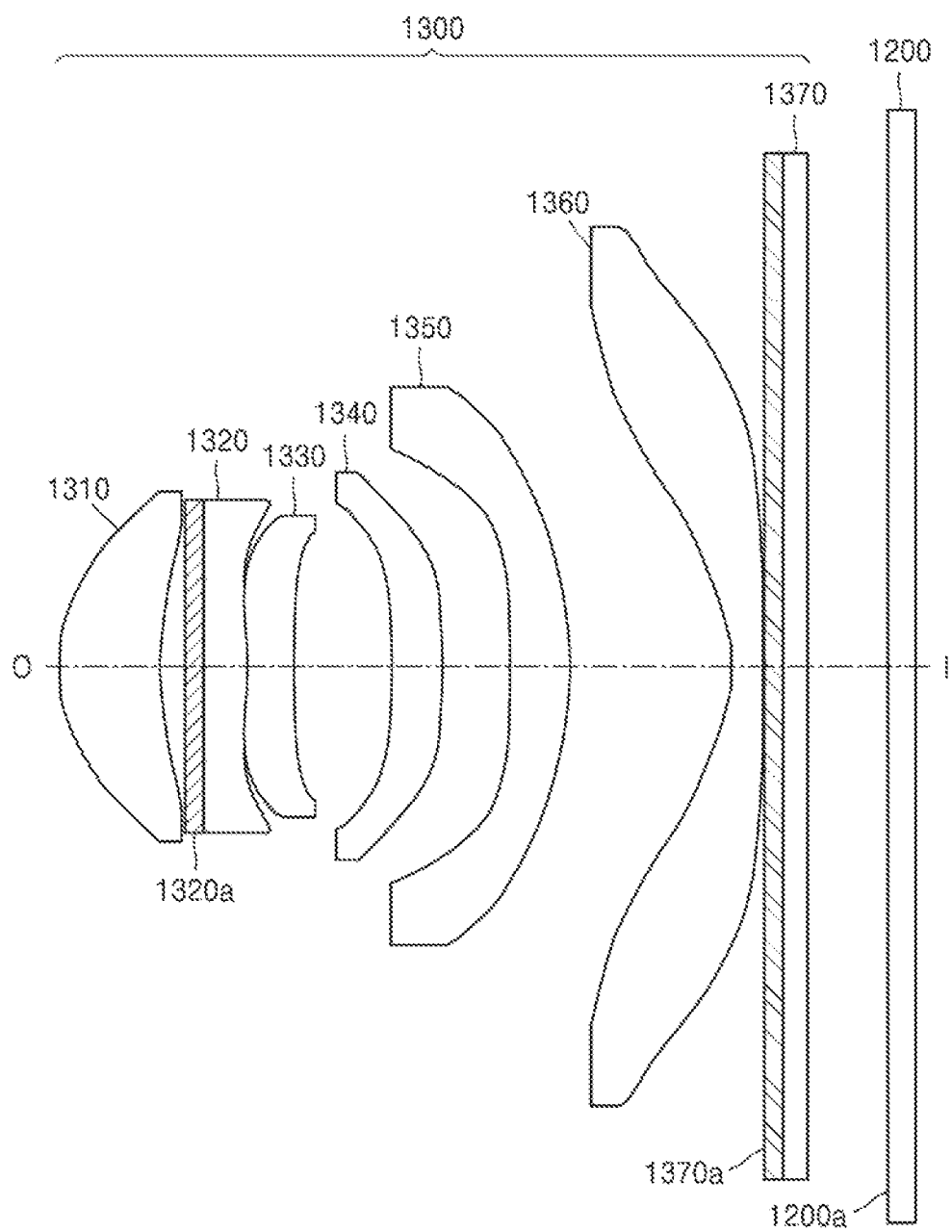
FIG. 5 is a cross-sectional view of a lens assembly including a meta-lens according to another example embodiment.

FIG. 5 is a cross-sectional view of a lens assembly including a meta-lens according to another example embodiment, and FIGS. 6A to 6D illustrate optical properties of the lens assembly of FIG. 5. In describing the lens assembly of FIG. 5, repeated descriptions of the previous example embodiment are not provided.

Referring to FIG. 5, a lens assembly 1300 may include a plurality of lenses and the image sensor 1200. For example, first to seventh lenses 1310, 1320, 1330, 1340, 1350, 1360, and 1370 may be sequentially arranged in a direction of the optical axis O-I. Compared to the lens assembly 1100 of FIG. 1, the lens assembly 1300 includes two meta-lenses, that is, a first meta-lens 1320a and a second meta-lens 1370a. The first meta-lens 1320a is similar in structure, arrangement, and function to the meta-lens 1120a of FIG. 1. The second meta-lens 1370a may be designed to make light incident on the imaging plane 1200a of the image sensor 1200 have a small slope with respect to the optical axis O-I, and to correct lateral chromatic aberration in a direction perpendicular to the optical axis. Through the second meta-lens 1370a, the amount of light around the image sensor 1200 may be secured, such that an object image with good brightness may be obtained even at low illumination.

Table 4 below shows a variety of lens data of the lens assembly 1300 of FIG. 5. Table 5 and Table 6 respectively describe aspheric coefficients of a plurality of lenses. The lens assembly 1300 shows an example in which a TTL is 7.2 mm, an effective focal length is 7.0 mm, a focal length of the first meta-lens 1320a is 52.7 mm, and an ISS of the image sensor 1200 is 12 mm.

TABLE 4

| Surface | Radius | Thickness | Effective radius | EFL | nd | vd |
|---|---|---|---|---|---|---|
| First lens 1310 (O) | 3.61E+00 | 8.86E-01 | 1.85E+00 | 7.17 | 1.54 | 54 |
| First lens 1310 (I) | 9.28E+00 | 1.94E-01 | 1.81E+00 | | | |
| Second lens 1320 (O) | Infinity | 3.97E-01 | 1.81E+00 | 9.6 | | |
| Second lens 1320 (I) | -7.77E+00 | 6.78E-03 | 1.77E+00 | | 1.65 | 21.7 |
| Third lens 1330 (O) | -5.39E+01 | 4.00E-01 | 1.65E+00 | -9.93 | 1.54 | 54 |
| Third lens 1330 (I) | 1.60E+01 | 1.02E+00 | 1.50E+00 | | | |
| Fourth lens 1340 (O) | -1.85E+01 | 4.38E-01 | 1.80E+00 | 631 | 1.54 | 54 |
| Fourth lens 1340 (I) | -9.27E+00 | 5.93E-01 | 2.10E+00 | | | |
| Fifth lens 1350 (O) | 1.65E+01 | 5.18E-01 | 2.40E+00 | 11.5 | 1.54 | 54 |
| Fifth lens 1350 (I) | -1.76E+01 | 1.40E+00 | 3.05E+00 | | | |
| Sixth lens 1360 (O) | -3.52E+00 | 2.80E-01 | 4.40E+00 | -4.91 | 1.54 | 54 |
| Sixth lens 1360 (I) | -3.24E+01 | 1.87E-02 | 4.55E+00 | | | |
| Seventh lens 1370 (O) | Infinity | 2.00E-01 | 5.60E+00 | -333 | | |
| Seventh lens 1370 (I) | Infinity | 8.50E-01 | 5.25E+00 | | 1.52 | 64.2 |
| Image sensor 1200 | — | — | — | — | | |

TABLE 5

| Surface | K | A | B | C |
|---|---|---|---|---|
| First lens 1310 (O) | 5.18E-02 | 6.94E-02 | 4.79E-02 | -1.05E-03 |
| First lens 1310 (I) | 8.81E-01 | 3.85E-02 | 8.86E-03 | -5.85E-03 |
| Second lens 1320 (O) | 0.00E+00 | -1.01E+02 | 2.71E+00 | 1.97E+01 |
| Second lens 1320 (I) | -3.36E+01 | -3.02E-03 | 1.12E-02 | 8.95E-02 |
| Third lens 1330 (O) | 9.64E+01 | -5.50E-02 | 9.68E-02 | 2.71E-01 |
| Third lens 1330 (I) | -3.02E+03 | 2.28E-03 | 8.49E-02 | -1.14E-01 |
| Fourth lens 1340 (O) | 6.70E+01 | -1.15E-02 | -1.01E-01 | -1.04E-02 |
| Fourth lens 1340 (I) | 1.74E+01 | 1.29E-02 | -1.49E-01 | 1.29E-01 |
| Fifth lens 1350 (O) | 2.47E+01 | 1.29E-02 | -6.75E-02 | -2.30E-02 |
| Fifth lens 1350 (I) | 1.26E+01 | -6.64E-02 | 2.59E-02 | -2.58E-02 |
| Sixth lens 1360 (O) | -4.89E+00 | -4.96E-02 | 1.42E-02 | 2.71E-04 |
| Sixth lens 1360 (I) | -2.64E+01 | 8.22E-03 | -2.19E-03 | -7.06E-04 |
| Seventh lens 1370 (O) | 0.00E+00 | 1.61E+01 | 7.37E-01 | -2.35E-01 |
| Seventh lens 1370 (I) | — | — | — | — |

TABLE 6

| Surface | D | E | F | G |
|---|---|---|---|---|
| First lens 1310 (O) | -1.09E-01 | 8.49E-01 | -1.06E+00 | -7.46E+00 |
| First lens 1310 (I) | -3.10E-01 | 1.20E+00 | 3.05E+00 | 4.53E+00 |
| Second lens 1320 (O) | -8.96E+00 | 1.18E+00 | 3.73E-01 | -1.31E-01 |
| Second lens 1320 (I) | -1.32E-01 | 1.78E-01 | -1.76E-01 | 1.13E-01 |
| Third lens 1330 (O) | 1.66E-01 | -1.74E+00 | 2.95E+00 | -1.27E+00 |

TABLE 6-continued

| Surface | D | E | F | G |
|---|---|---|---|---|
| Third lens 1330 (I) | 1.49E−01 | 1.72E−01 | 4.01E−03 | −1.56E−01 |
| Fourth lens 1340 (O) | 2.59E−01 | −9.26E−01 | 1.32E+00 | −8.26E−01 |
| Fourth lens 1340 (I) | −2.38E−01 | 2.31E−01 | −2.88E−02 | −1.63E−01 |
| Fifth lens 1350 (O) | 5.69E−03 | −1.33E−02 | 5.30E−03 | 2.95E−03 |
| Fifth lens 1350 (I) | 5.71E−03 | 1.06E−03 | −4.52E−04 | −1.45E−04 |
| Sixth lens 1360 (O) | −1.01E−04 | −7.85E−06 | 5.09E−06 | 1.32E−07 |
| Sixth lens 1360 (I) | 1.30E−05 | 4.04E−06 | −1.39E−07 | −9.40E−09 |
| Seventh lens 1370 (O) | 1.18E−02 | −1.82E−04 | 9.15E−06 | −5.49E−07 |
| Seventh lens 1370 (I) | — | — | — | — |

Figure 6A:
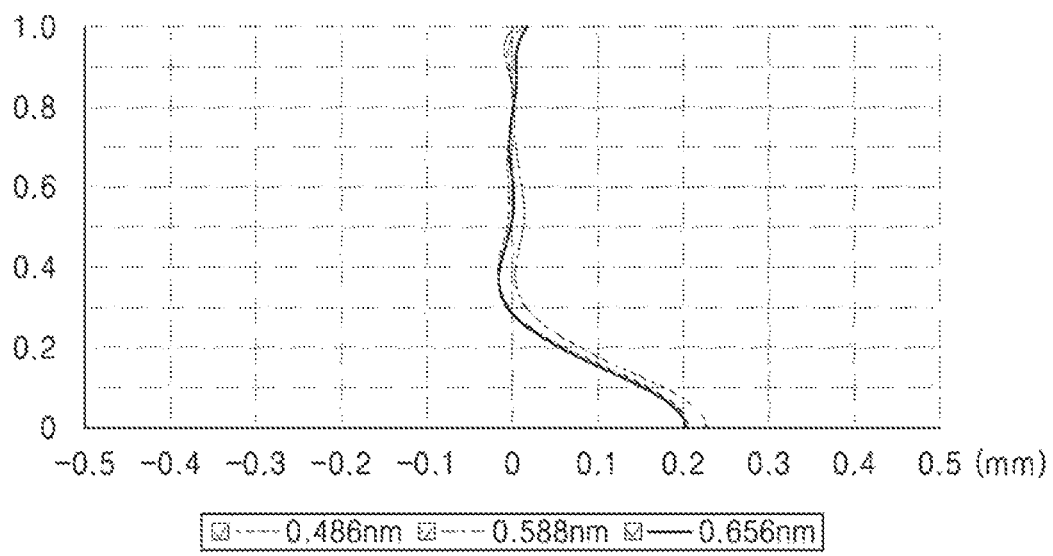
FIGS. 6A, 6B, 6C, and 6D are views showing optical properties of the lens assembly of FIG. 5.
Figure 6B:
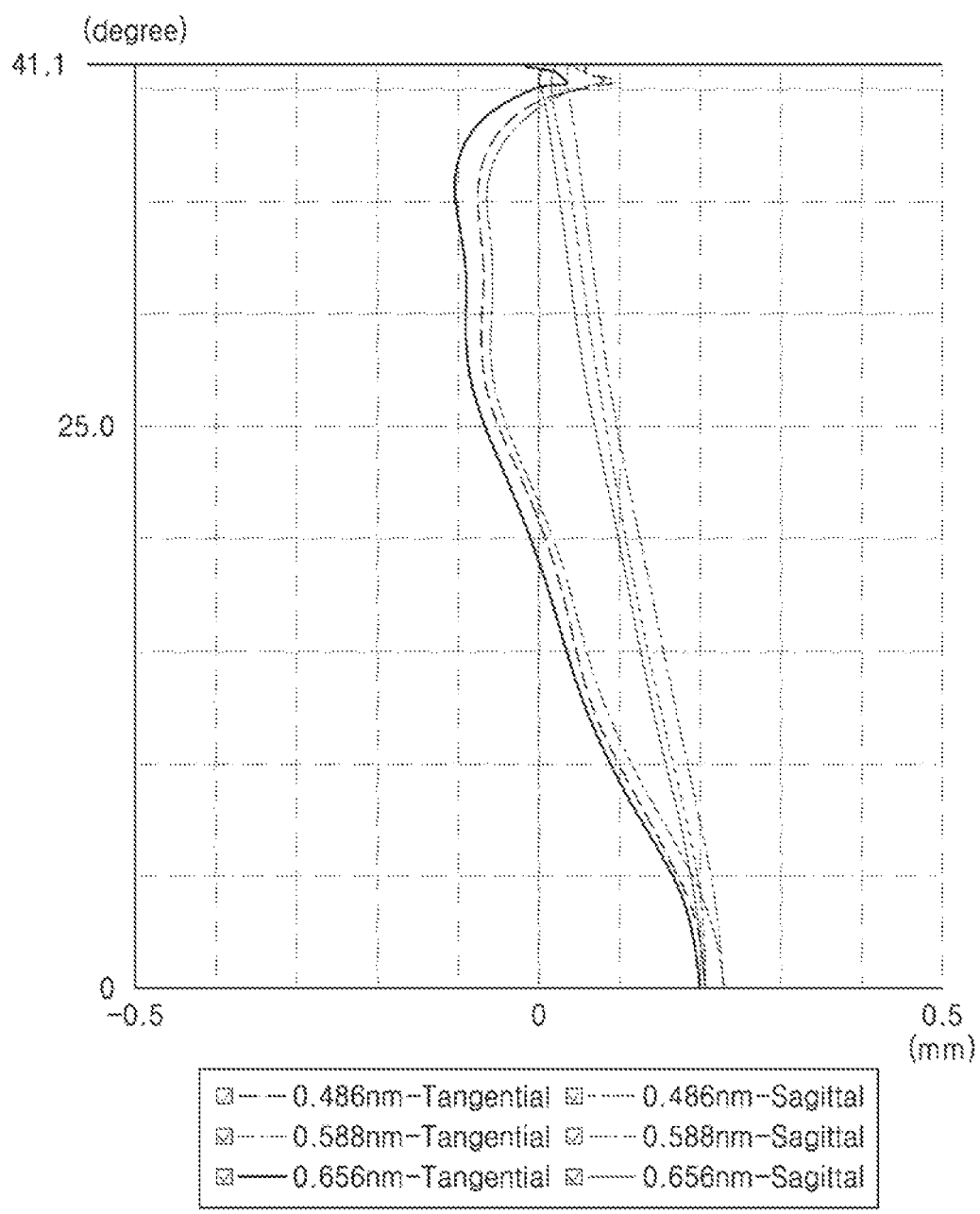
Figure 6C:
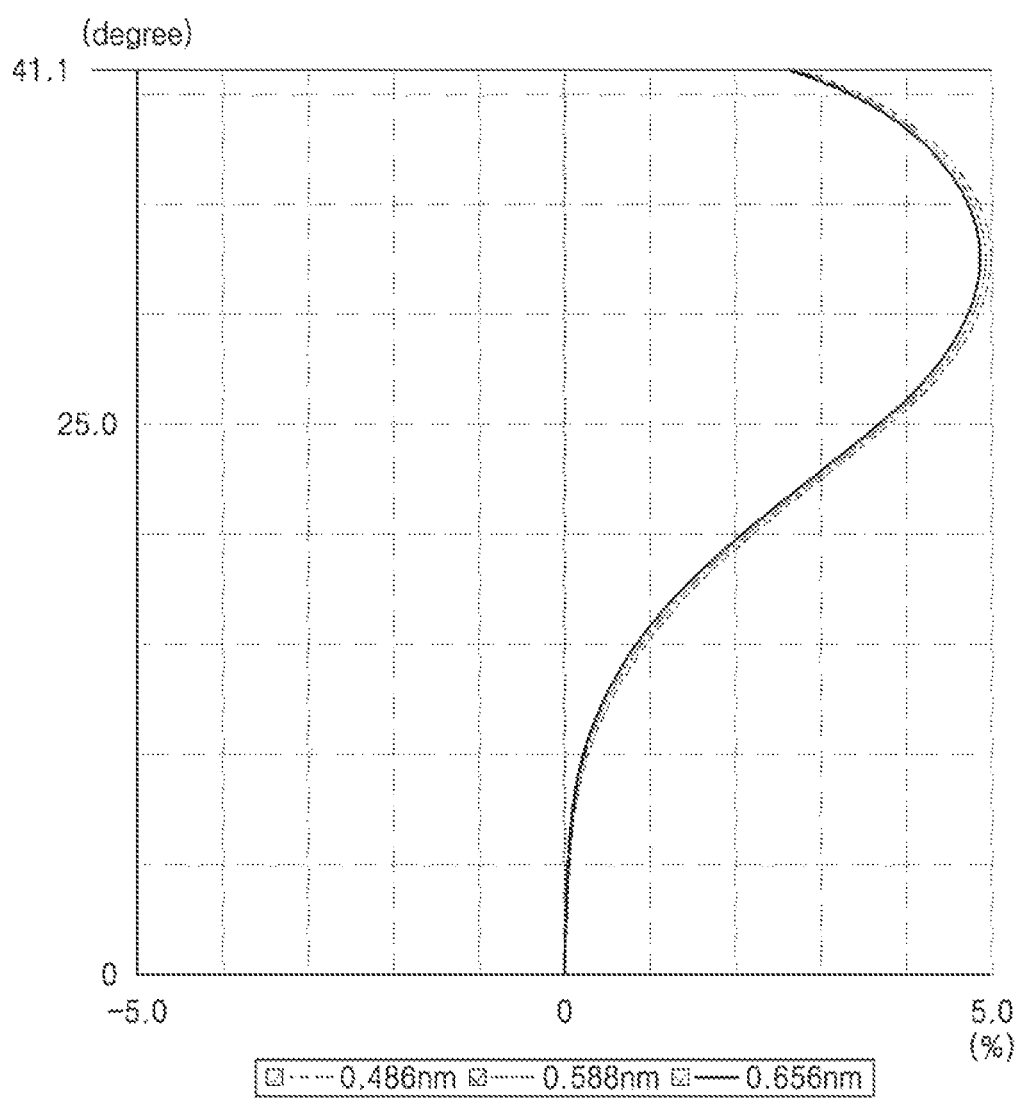
Figure 6D:
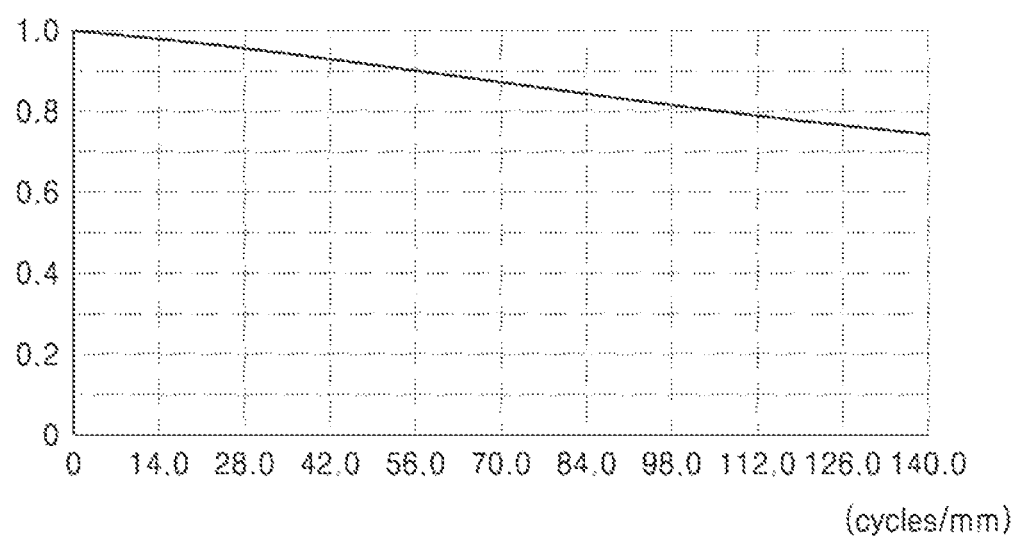

FIG. 6A is a graph showing spherical aberration of the lens assembly 1300 of FIG. 5, FIG. 6B is a graph showing astigmatism of the lens assembly 1300, and FIG. 6C is a graph showing distortion of the lens assembly 1300, and is a result obtained with pieces of light at wavelengths of 486 nm, 588 nm, and 656 nm. FIG. 6D is a view illustrating an MTF of the lens assembly 1300.

Referring to FIG. 6A, longitudinal spherical aberration of the lens assembly 1300 may be −0.50 mm to +0.50 mm, −0.30 mm to +0.40 mm, or −0.10 mm to +0.3 mm. According to FIG. 6A, it can be seen that the longitudinal spherical aberration is limited to −0.05 mm to +0.25 mm, showing stable optical properties.

Referring to FIG. 6B, astigmatism of the lens assembly 1300 may be −0.50 mm to +0.50 mm, −0.30 mm to +0.40 mm, or −0.20 mm to +0.30 mm. According to FIG. 6B, it can be seen that the longitudinal spherical aberration is limited to −0.15 mm to +0.25 mm, showing stable optical properties.

Referring to FIG. 6C, a distortion rate of the lens assembly 1300 may be less than 5%. Referring to FIG. 6C, it can be seen that the lens assembly 1300 exhibits good optical properties at a distortion rate of less than 5%.

Referring to FIG. 6D, the lens assembly 1300 may exhibit an MTF of 0.5 or more, specifically 0.7 or more, at 120 cycles/mm with respect to normal incident light (0.0 field) of a pattern in a tangential direction. Referring to FIG. 6D, it can be seen that the lens assembly 1300 exhibits good optical properties with an MTF of 0.7 or more.

Figure 7:
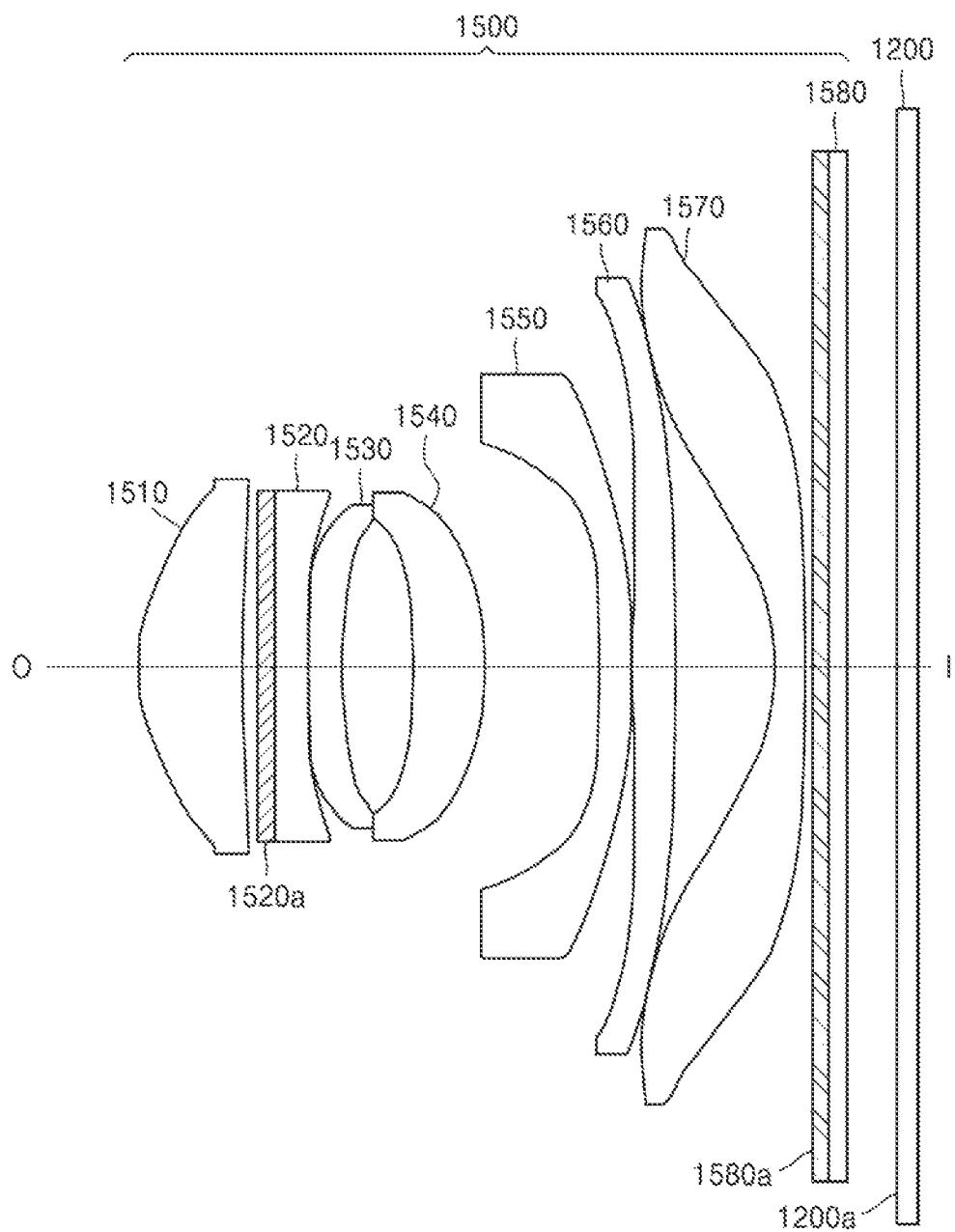
FIG. 7 is a cross-sectional view of a lens assembly including a meta-lens according to another example embodiment.

FIG. 7 is a cross-sectional view of a lens assembly including a meta-lens according to another example embodiment, and FIGS. 8A to 8D are views showing optical properties of the lens assembly of FIG. 7. In describing the lens assembly of FIG. 7, repeated descriptions of the previous example embodiment are not provided.

Referring to FIG. 7, the lens assembly 1500 may include a plurality of lenses. For example, the lens assembly 1500 may include first to eighth lenses 1510, 1520, 1530, 1540, 1550, 1560, 1570, and 1580 arranged sequentially in a direction of the optical axis O-I. Compared to the lens assembly 1300 of FIG. 5, the lens assembly 1500 may be configured to further include the sixth lens 1560.

Table 7 below shows a variety of lens data of the lens assembly 1500 of FIG. 7. Table 8 and Table 9 respectively describe aspheric coefficients of a plurality of lenses. The lens assembly 1500 shows an example in which a TTL is 7.2 mm, an effective focal length is 7.0 mm, a focal length of the first meta-lens 1520a is 90 mm, and an ISS of the image sensor 1200 is 12 mm.

TABLE 7

| Surface | Radius | Thickness | Effective radius | EFL | nd | vd |
|---|---|---|---|---|---|---|
| First lens 1510 (O) | 4.00E+00 | 9.45E−01 | 1.87E+00 | 6.14 | 1.54 | 54 |
| First lens 1510 (I) | 1.59E+01 | 1.34E−01 | 1.93E+00 | | | |
| Second lens 1520 (O) | Infinity | 4.68E−01 | 1.80E+00 | 97.4 | | |
| Second lens 1520 (I) | −1.17E+01 | 4.28E−03 | 1.81E+00 | | 1.65 | 21.7 |
| Third lens 1530 (O) | 3.48E+01 | 3.16E−01 | 1.65E+00 | −18.2 | 1.54 | 54 |
| Third lens 1530 (I) | 1.42E+01 | 6.49E−01 | 1.50E+00 | | | |
| Fourth lens 1540 (O) | −1.97E+01 | 6.34E−01 | 1.55E+00 | 18.1 | 1.54 | 54 |
| Fourth lens 1540 (I) | −7.66E+00 | 1.06E+00 | 1.78E+00 | | | |
| Fifth lens 1550 (O) | −2.44E+01 | 3.01E−01 | 2.30E+00 | 21.4 | 1.54 | 54 |
| Fifth lens 1550 (I) | −2.60E+01 | 1.67E−03 | 3.00E+00 | | | |
| Sixth lens 1560 (O) | 6.05E+01 | 3.83E−01 | 3.53E+00 | 46.3 | 1.54 | 54 |
| Sixth lens 1560 (I) | −2.17E+02 | 9.23E−01 | 3.73E+00 | | | |
| Seventh lens 1570 (O) | −3.07E+00 | 2.79E−01 | 4.09E+00 | −4.4 | 1.54 | 54 |
| Seventh lens 1570 (I) | −1.21E+02 | −1.79E−01 | 4.60E+00 | | | |
| Eighth lens 1580 (O) | Infinity | 2.00E−01 | 5.38E+00 | 161.5 | 1.52 | 64.2 |
| Eighth lens 1580 (I) | Infinity | 7.52E−01 | 5.47E+00 | | | |
| Image sensor | — | — | — | — | | |

TABLE 8

| Surface | K | A | B | C |
|---|---|---|---|---|
| First lens 1510 (O) | 5.18E−02 | 6.94E−02 | 2.45E−02 | −2.38E−02 |
| First lens 1510 (I) | 8.81E−01 | 2.01E−02 | −5.68E−02 | 1.40E−02 |
| Second lens 1520 (O) | 0.00E+00 | −6.46E+01 | −8.74E−01 | 1.22E+01 |
| Second lens 1520 (I) | −3.36E+01 | 4.40E−02 | 1.17E−03 | 7.84E−02 |

TABLE 8-continued

| Surface | K | A | B | C |
|---|---|---|---|---|
| Third lens 1530 (O) | 9.64E+01 | 3.09E−03 | −1.86E−02 | 2.99E−01 |
| Third lens 1530 (I) | −3.02E+03 | 3.30E−02 | 6.97E−02 | 1.89E−01 |
| Fourth lens 1540 (O) | 6.70E+01 | −2.51E−02 | −8.91E−02 | −6.14E−02 |
| Fourth lens 1540 (I) | 1.74E+01 | −3.36E−02 | −9.52E−02 | 4.37E−02 |
| Fifth lens 1550 (O) | 2.47E+01 | 5.58E−04 | −5.47E−02 | −4.45E−02 |
| Fifth lens 1550 (I) | 1.26E+01 | −4.34E−02 | 1.80E−02 | −2.59E−02 |
| Sixth lens 1560 (O) | 0.00E+00 | 4.51E−03 | −2.58E+01 | −2.84E+03 |
| Sixth lens 1560 (I) | 0.00E+00 | −4.81E−03 | −1.44E+01 | 1.47E+03 |
| Seventh lens 1570 (O) | −4.89E+00 | −5.05E−02 | −3.92E−03 | 8.04E−03 |
| Seventh lens 1570 (I) | −2.64E+01 | −1.43E−03 | −5.23E−03 | 4.00E−04 |
| Eighth lens 1580 (O) | 0.00E+00 | −3.31E+01 | 1.02E+01 | −1.19E+00 |
| Eighth lens 1580 (I) | 0.00E+00 | — | — | — |

TABLE 9

| Surface | D | E | F | G |
|---|---|---|---|---|
| First lens 1510 (O) | −6.61E−02 | 6.00E−01 | −1.08E+00 | −6.75E+00 |
| First lens 1510 (I) | −2.30E−01 | 1.22E+00 | −2.99E+00 | 4.25E+00 |
| Second lens 1520 (O) | −7.68E+00 | 2.80E+00 | −2.85E−01 | −1.22E−01 |
| Second lens 1520 (I) | −1.37E−01 | 1.92E−01 | −1.92E−01 | 1.24E−01 |
| Third lens 1530 (O) | 1.67E−01 | −1.58E+00 | −2.98E+00 | −1.54E+00 |
| Third lens 1530 (I) | 4.15E−01 | −7.36E−02 | −3.31E−01 | 1.42E−02 |
| Fourth lens 1540 (O) | 2.27E−01 | −8.54E−01 | 1.26E+00 | −9.25E−01 |
| Fourth lens 1540 (I) | −1.30E−01 | −8.35E−03 | 6.16E−01 | −1.14E+00 |
| Fifth lens 1550 (O) | −9.30E−03 | 8.64E−03 | −3.48E−03 | 2.71E−05 |
| Fifth lens 1550 (I) | −4.30E−03 | 2.08E−02 | −8.84E−03 | −2.84E−04 |
| Sixth lens 1560 (O) | 6.48E+06 | 1.50E+09 | −2.85E+12 | 0.00E+00 |
| Sixth lens 1560 (I) | −1.15E+06 | −4.62E+08 | 7.23E+11 | 0.00E+00 |
| Seventh lens 1570 (O) | −1.36E−03 | 4.50E−05 | 5.52E−06 | −1.39E−07 |
| Seventh lens 1570 (I) | −1.25E−05 | 2.62E−06 | 2.23E−07 | 4.03E−09 |
| Eighth lens 1580 (O) | 8.11E−02 | −3.41E−03 | 8.81E−05 | −1.44E−06 |
| Eighth lens 1580 (I) | — | — | — | — |

Figure 8A:
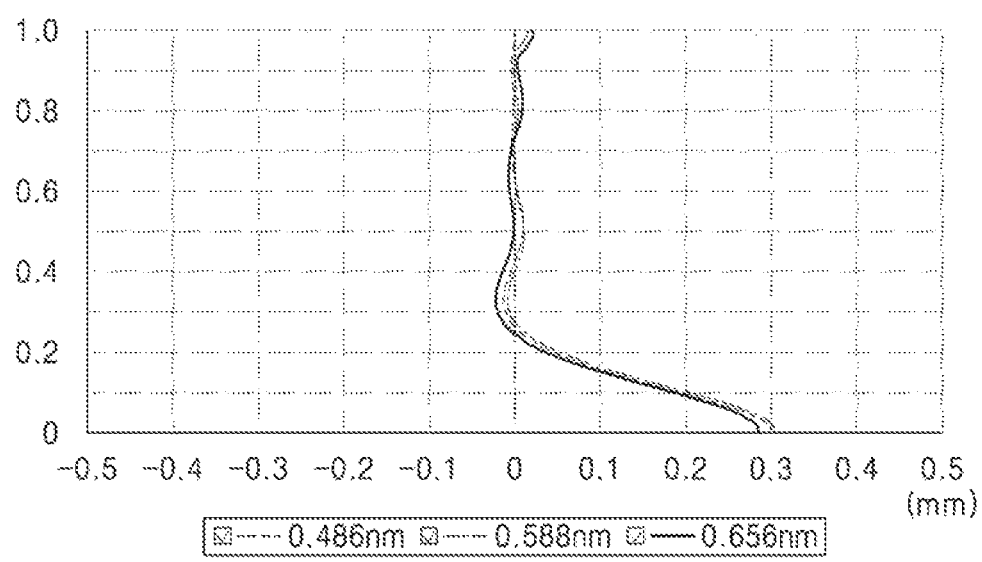
FIGS. 8A, 8B, 8C, and 8D illustrate optical properties of the lens assembly of FIG. 7.
Figure 8B:
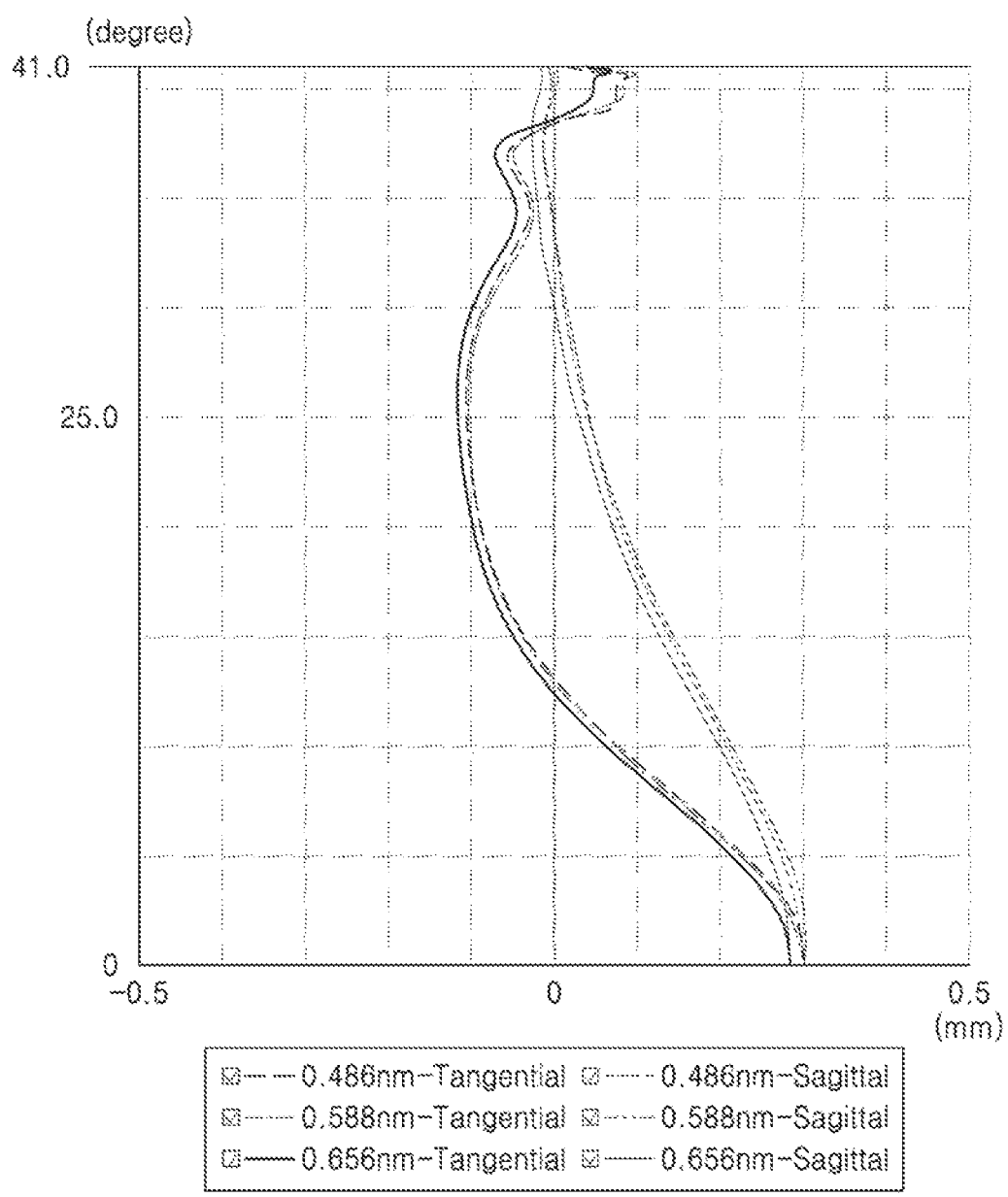
Figure 8C:
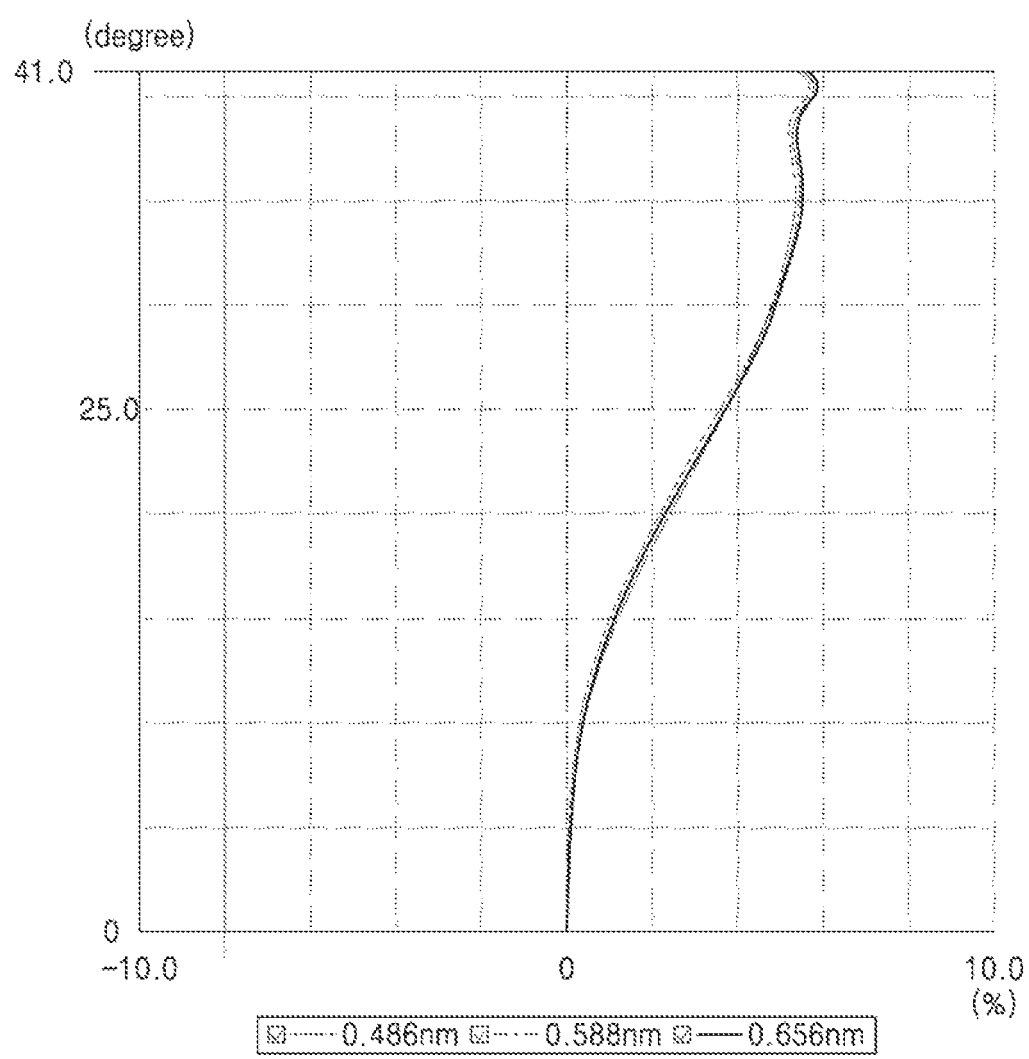
Figure 8D:
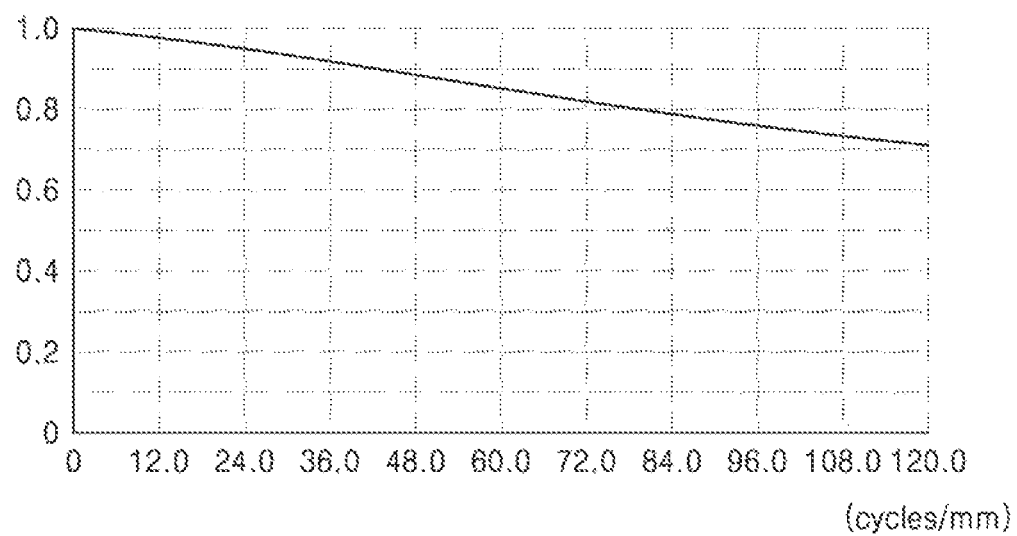

FIG. 8A is a graph showing spherical aberration of the lens assembly 1500 of FIG. 7, FIG. 8B is a graph showing astigmatism of the lens assembly 1500, and FIG. 8C is a graph showing distortion of the lens assembly 1500, and is a result obtained with respect to light at wavelengths of 486 nm, 588 nm, and 656 nm. FIG. 8D is a view illustrating an MTF of the lens assembly 1500.

Referring to FIG. 8A, longitudinal spherical aberration of the lens assembly 1500 may be −0.50 mm to +0.50 mm, −0.30 mm to +0.40 mm, or −0.10 mm to 0.35 mm. According to FIG. 8A, it can be seen that the longitudinal spherical aberration is limited to −0.05 mm to +0.35 mm, showing stable optical properties.

Referring to FIG. 8B, astigmatism of the lens assembly 1500 may be −0.50 mm to +0.50 mm, −0.30 mm to +0.40 mm, or −0.20 mm to +0.35 mm. According to FIG. 8B, it can be seen that the longitudinal spherical aberration is limited to −0.15 mm to +0.35 mm, showing stable optical properties.

Referring to FIG. 8C, a distortion rate of the lens assembly 1500 may be less than 8% or less than 6%. Referring to FIG. 8C, it can be seen that the lens assembly 1500 exhibits good optical properties at a distortion rate of less than 6%.

Referring to FIG. 8D, the lens assembly 1500 may exhibit an MTF of 0.5 or more, specifically 0.7 or more, at 120 cycles/mm with respect to normal incident light (0.0 field) of a pattern in a tangential direction. Referring to FIG. 8D, it can be seen that the lens assembly 1500 exhibits good optical properties with an MTF of 0.7 or more.

Hereinafter, a structure and a design method of a meta-lens providing an identical phase delay profile for different wavelengths will be described with reference to FIGS. 9 to 20. The meta-lenses 1120a, 1320a, 1370a, 1520a, and 1580a of FIGS. 1, 5, and 7 may be designed in the manner described below.

Figure 9:
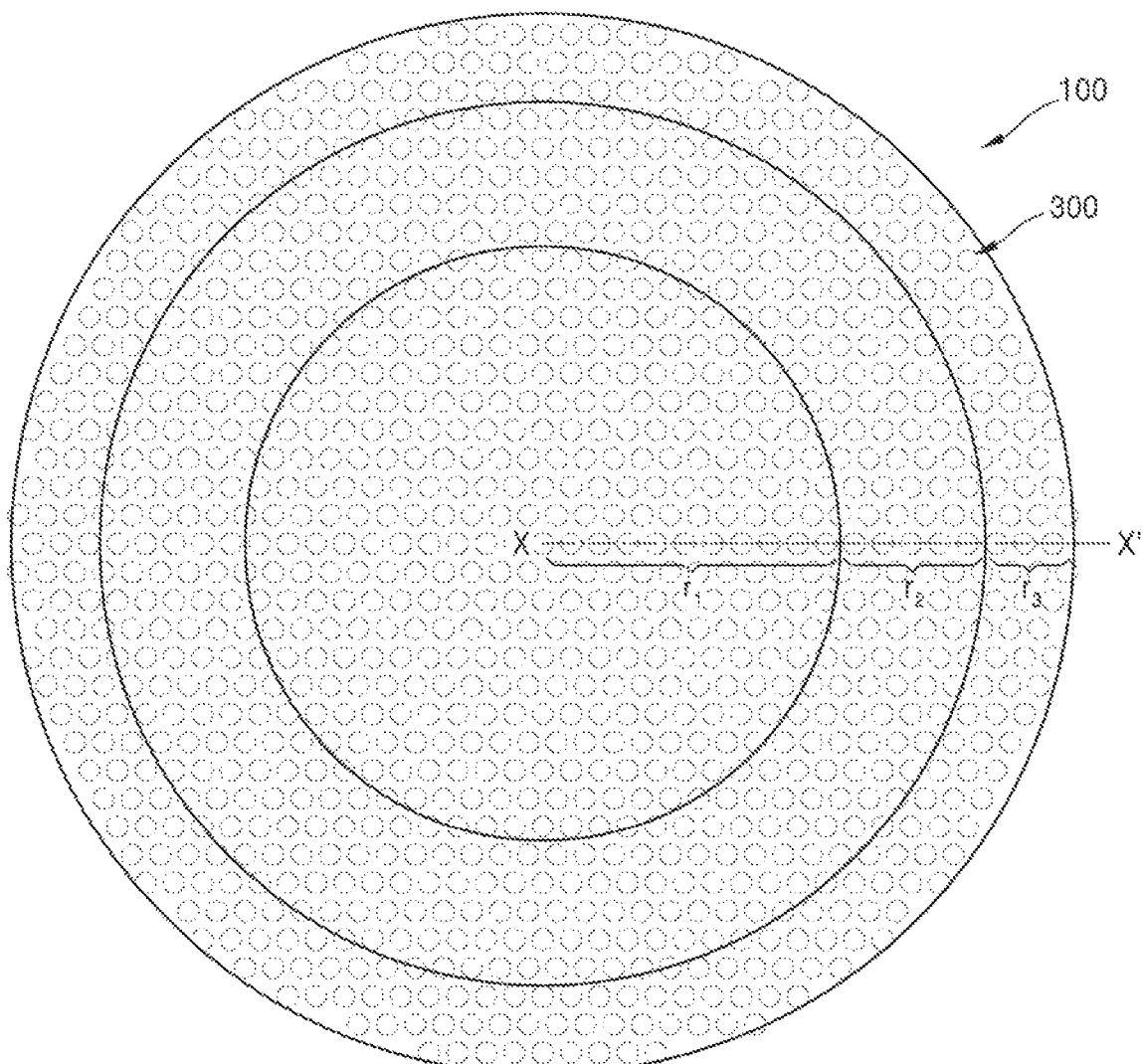
FIG. 9 is a plan view of a schematic structure of a meta-lens according to an example embodiment.
Figure 10:
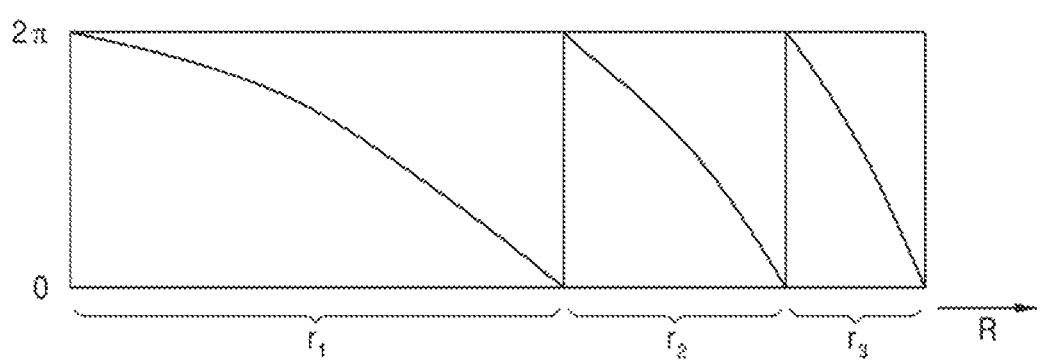
FIG. 10 illustrates a phase delay profile to be implemented with the meta-lens of FIG. 9.
Figure 11:
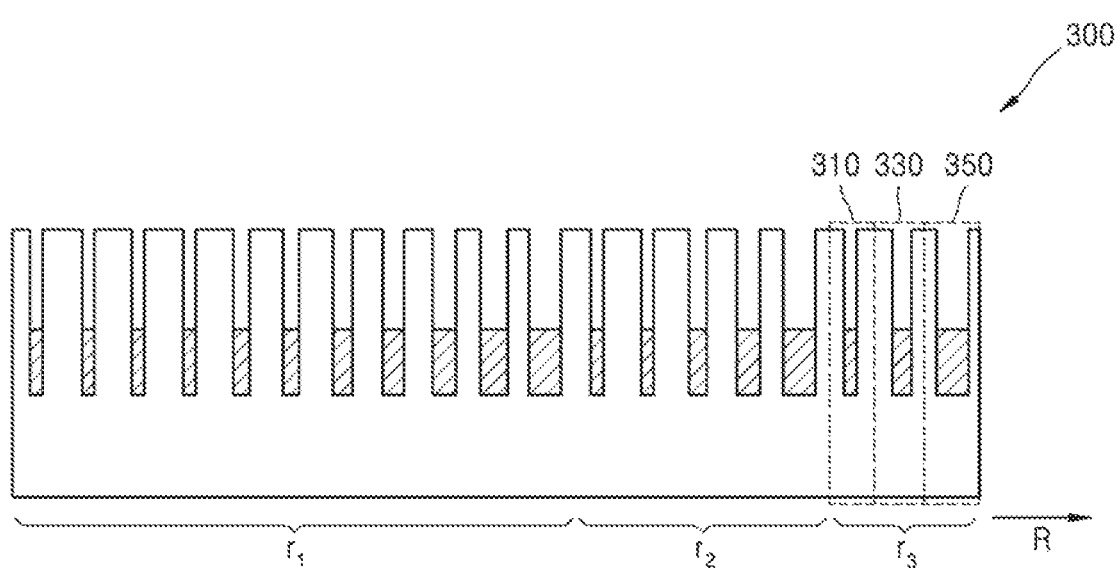
FIG. 11 is a cross-sectional view of the meta-lens of FIG. 9.

FIG. 9 is a plan view of a schematic structure of a meta-lens according to an example embodiment. FIG. 10 is a view showing a phase delay profile to be implemented with the meta-lens of FIG. 9 along a line X-X', and FIG. 11 is a vertical cross-sectional view of the meta-lens of FIG. 9 taken along the line X-X'.

FIG. 9 exemplarily shows a meta-lens 100 including a nano structure array 300 having three Fresnel zones $r_1$, $r_2$, and $r_3$ arranged in concentric circles. The number of Fresnel zones, the number of nano structures, and the arrangement of nano structures may vary according to the size of a meta-lens, optical power to be implemented, and a phase delay profile.

FIG. 10 shows a phase unwrapping profile of the meta-lens 100 shown along the line X-X' in FIG. 9. The phase unwrapping means that a phase component corresponding to a relative phase delay between 0 and $2\pi$ is left by subtracting an integer multiple of $2\pi$ from the amount of phase delay. Because there is a limit to a phase delay that can be achieved by adjusting the height, width, etc. of a nano structure, through the phase unwrapping, the concentric Fresnel zones $r_1$, $r_2$, and $r_3$ may be formed by repeatedly arranging structures that implement a relative phase delay of 0 to $2\pi$ on a principle similar to a Fresnel lens.

The meta-lens 100 of FIG. 9 has a phase delay profile that decreases in an outer direction (R direction) from the center of the lens such that the meta-lens 100 may function as a convex lens, and may provide an identical phase delay profile for incident light in an operating wavelength band. For example, a phase delay profile showing a phase difference between light incident to the meta-lens 100 and light emitted from the meta-lens 100 may be the same for various wavelengths. For example, phase delay profiles of light of a first wavelength (588 nm), light of a second wavelength (486 nm), and light of a third wavelength (656 nm) passing through the meta-lens 100 may be the same. Therefore, when the amount of phase delay of the light of the first wavelength (588 nm) changes by $2\pi$ in an R direction, the light of the second wavelength (486 nm) and the light of the third wavelength (656 nm) also exhibit a phase delay change by $2\pi$, so that the design of a meta-lens may be facilitated and the performance may be improved. The same change in phase delay may not mean that the amounts of change in phase delay are completely the same, but that the difference in the amount of change in phase delay according to a wavelength in the operating wavelength band is within an error of 10%. The operating wavelength band in which the meta-lens 100 of FIG. 9 may exhibit a designed function may be a visible light band.

FIG. 11 is a vertical cross-sectional view of the meta-lens 100 taken along the line X-X' of FIG. 9. FIG. 11 illustrate an example structure in which 19 nano structures are arranged in the three Fresnel zones $r_1$, $r_2$, and $r_3$ arranged in the R direction from the center of the meta-lens 100.

Figure 12A:
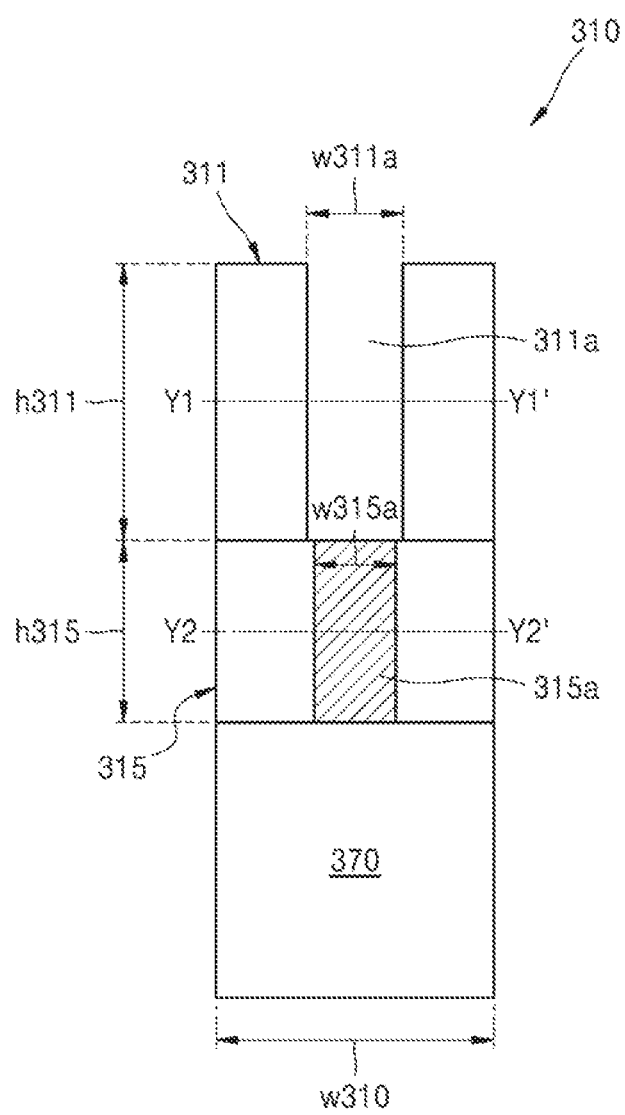
FIG. 12A is a view of a cross-section of a first nano structure arranged in a third Fresnel zone of FIG. 11, FIGS. 12B and 12C are cross-sectional views of a first phase shift layer and a second phase shift layer of the first nano structure of FIG. 12A.
Figure 12B:
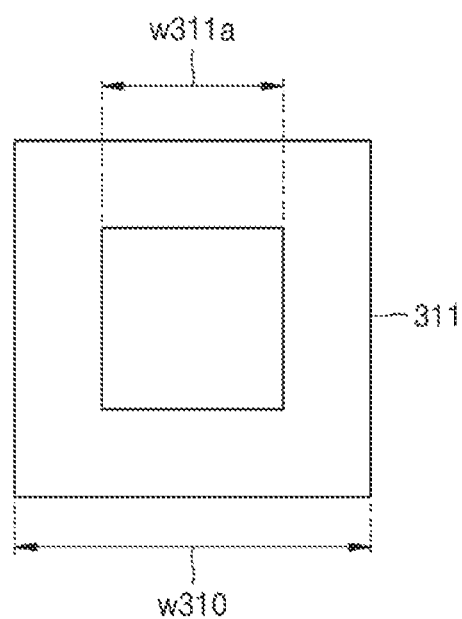
FIG. 12D is a cross-sectional view of the first nano structure further including a spacer layer.
Figure 12C:
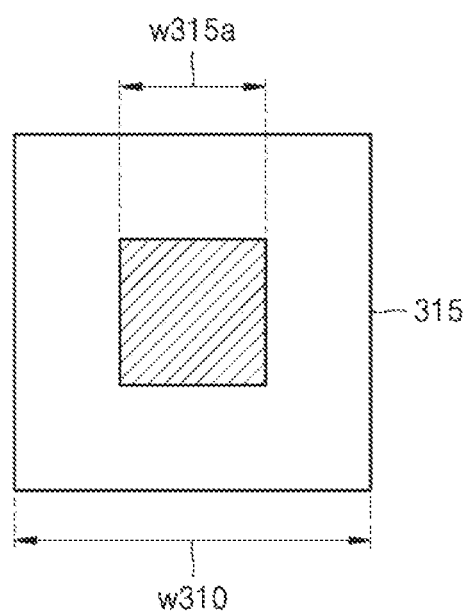

FIG. 12A is a detailed view of a cross-section of a first nano structure 310 among nano structures arranged in the third Fresnel zone $r_3$ of FIG. 11, and FIGS. 12B and 12C are horizontal cross-sectional views taken along lines Y1-Y1' and Y2-Y2' of FIG. 12A, respectively.

The first nano structure 310 may include a first phase shift layer 311, a second phase shift layer 315, and a support layer 370. The first phase shift layer 311 may change a phase by reacting with light incident on the first nano structure 310. The phase-shifted light may be incident on the second phase shift layer 315, and the second phase shift layer 315 may further change the phase of the light. As a result, incident light may sequentially interact with the first phase shift layer 311 and the second phase shift layer 315, and thus may be emitted in a phase-changed form. FIGS. 11 and 12A show the support layer 370 supporting the first phase shift layer 311 and the second phase shift layer 315, but the support layer 370 may be omitted.

Each of the first phase shift layer 311 and the second phase shift layer 315 may be a combination of materials having different refractive indices. According to example embodiment shown in FIGS. 11 and 12A to 12D, each of the first phase shift layer 311 and the second phase shift layer 315 may have a form in which one material surrounds the other. For example, each of the first phase shift layer 311 and the second phase shift layer 315 may include an inner post and a structure surrounding the inner post. In more detail, the first phase shift layer 311 may be a structure having an empty interior, and the structure may surround an air post 311a. The second phase shift layer 315 may be a structure in which the inside is filled, for example, a structure of another material may surround a post-shaped inner material. The structures of the first phase shift layer 311 and the second phase shift layer 315 surrounding the inner material may include the same materials, for example, a dielectric (silicon oxide ($SiO_2$), etc.), glass (fused silica, BK7, etc.), quartz, polymer (PMMA, SU-8, etc.), plastic, and/or semiconductor materials. The material of the inner post may include crystalline silicon (c-Si), poly Si, amorphous silicon (Si), silicon nitride ($Si_3N_4$), gallium phosphide (GaP), gallium arsenide (GaAs), titanium oxide (TiOx), aluminum antimonide (AlSb), aluminum arsenide (AlAs), aluminum gallium arsenide (AlGaAs), aluminum gallium indium phosphide (AlGaInP), boron phosphide (BP), and/or zinc germanium phosphide ($ZnGeP_2$). For example, the inner post of the second phase shift layer 315 may include $TiO_2$.

The cross-sectional shapes, sizes and heights of the first phase shifter layer 311 and the second phase shift layer 315, and the cross-sectional shapes, sizes, and heights of first inner post 311a and the second inner post 315a may be appropriately designed considering characteristics of the selected material. For example, cross-sections of the first phase shift layer 311 and the second phase shift layer 315 may have a shape of a square, a rectangle, a parallelogram, a regular hexagon, and the like. For example, FIGS. 12B and 12C show the first phase shift layer 311 and the second phase shift layer having a square shape. Widths w310 of the first phase shift layer 311 and the second phase shift layer 315 may be less than a wavelength of incident light. The widths w310 of the first phase shift layer 311 and the second phase shift layer 315 designed to change the phase of visible light may be less than 400 nm or 300 nm, for example, 250 nm.

Figure 12D:
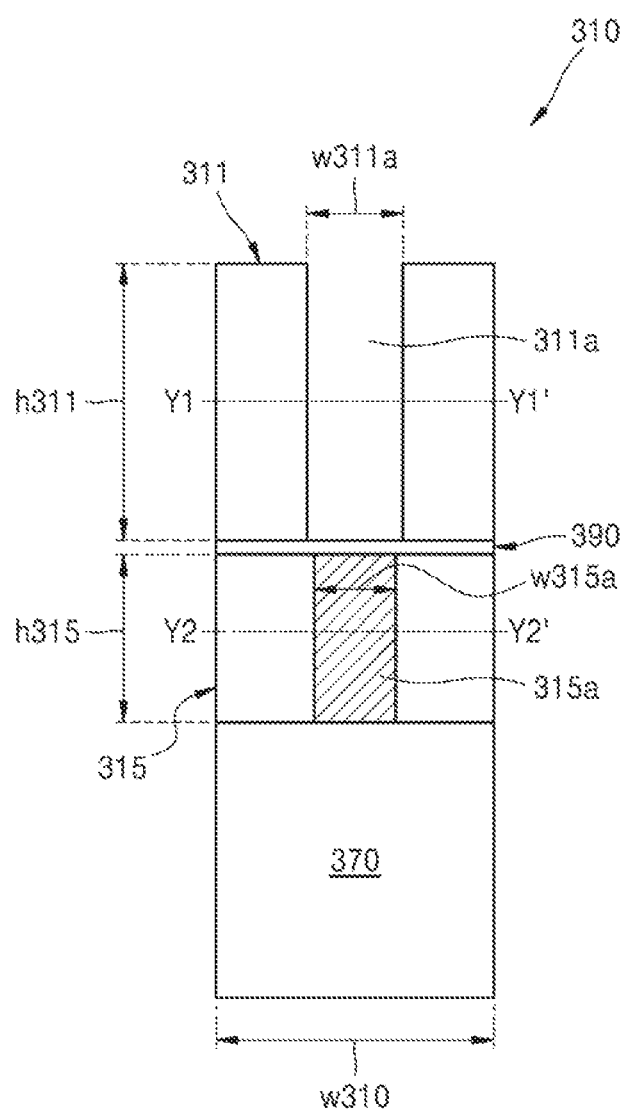

Cross-sections of the first inner post 311a and the second inner post 315a may be square, circular, rectangular, hollow circular, hollow square, etc. For example, in FIGS. 12B and 12C, first inner post 311a and the second inner post 315a have a square shape. The first inner post 311a and the second inner post 315a may have heights h311 and h315 greater than or equal to twice the widths w311a and w315a in order to avoid light resonance therein. The heights h311 and h315 of the first inner post 311a and the second inner post 315a may be optimized through iterative simulation considering material properties and manufacturing processes. In FIG. 12A, the heights of the first inner post 311a and the second inner post 315a and the heights of the first phase shift layer 311 and the second phase shift layer 315 are the same, but may be different. For example, the heights of the first inner post 311a and the second inner post 315a may be less than heights of the first phase shift layer 311 and the second phase shift layer 315. The height h311 of the first phase shift layer 311 and the first inner post 311a designed to interact with visible light may be, for example, 3000 nm. The height h315 of the second phase shift layer 315 and the second inner post 315a may be, for example, 1500 nm. According to this example, the height of the first phase shift layer 311 that first interacts with incident light may be greater than the height of the second phase shift layer 315. A spacer layer may be further included between the first phase shift layer 311 and the second phase shift layer 315 and/or between the first inner post 311a and the second inner post 315a. FIG. 12D shows an example in which a spacer layer 390 is included between the first phase shift layer 311 and the second phase shift layer 315.

The support layer 370 may support the first phase shift layer 311 and the second phase shift layer 315, and may include a dielectric ($SiO_2$, etc.), glass (fused silica, BK7, etc.), quartz, polymer (PMMA, SU-8, etc.), plastic, and/or semiconductor materials. The support layer 370 may have a thickness of about 0.1 mm to about 1.0 mm.

The structure surrounding the first inner post 311a and the second inner post 315a of the first phase shift layer 311 and the second phase shift layer 315 and the support layer 370 may include an identical material, for example, $SiO_2$. The support layer 370 may include a material different from that of the structure of the first phase shift layer 311 and the second phase shift layer 315, and may be omitted as mentioned above.

Figure 13:
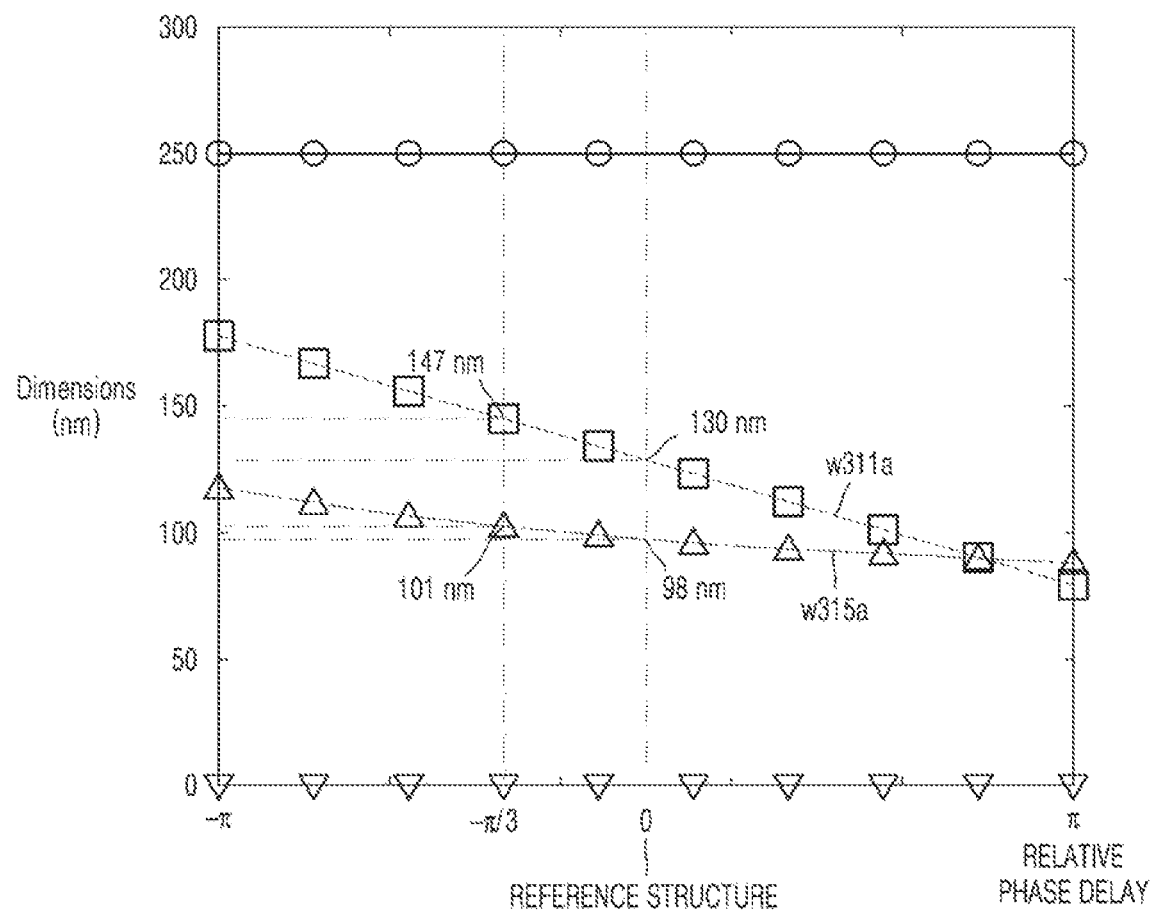
FIG. 13 illustrates a relationship between a phase delay of the first nano structure of FIG. 12A and widths of first inner post and second inner post.

FIG. 13 shows the relationship between a relative phase delay and the width of inner posts by the first nano structure of FIG. 12A.

First, a reference structure that is the basis for the relative phase delay of the nano structure is determined. According to the size of a meta-lens, the material of the nano structure, and the shape of an inner post, the width and cross-sectional shape of the reference structure may vary. The reference structure may be determined to be located at the center of a Fresnel zone in a designed meta-lens, or to have an average phase delay value of nano structures included in the Fresnel zone. In FIG. 13, a nano structure having a first inner post 311a of a square shape having the cross-section width w311a of 130 nm and a second inner post 315a of a square shape having the cross-section width w315a of 98 nm is used as the reference structure. The reference structure is for comparing relative amounts of phase delay of nano structures, and may be a virtual structure that does not need to be any one of nano structures included in the designed meta-lens. Setting of the reference structure determines the specifications of a nano structure that may be located in the center of the Fresnel zone and may be optimized through several simulation processes.

After the reference structure is set, it is possible to find a combination that provides the same phase delay difference as that of the reference structure for different wavelengths while changing the width w311a of the first inner post and the width w315a of the second inner post. By repeating this process, as shown in FIG. 13, it is possible to obtain a graph for the width w311a of the first inner post and the width w315a of the second inner post of the nano structure, where the amount of phase delay is $-\pi$ to $\pi$ (Rad.) compared to that of the reference structure. Referring to FIG. 13, for example, the width w311a of the first inner post 311a of the nano structure having a less amount of phase delay by $\pi/3$ Rad. compared to that of the reference structure may be 147 nm, and the width w351a of the second inner post 351a may be 101 nm. For example, light of a first wavelength (588 nm), light of a second wavelength (486 nm), and light of a third wavelength (656 nm) passing through a nano structure in which the width w311a of the first inner post 311a is 147 nm and the width w351a of the second inner post 351a is 101 nm has a less amount of phase delay by $\pi/3$ Rad. than light of a first wavelength (588 nm), light of a second wavelength (486 nm), and light of a third wavelength (656 nm) passing through the reference structure. When the graph as shown in FIG. 13 is obtained, a meta-lens may be designed by arranging nano structures to implement a desired phase delay profile.

Figure 14:
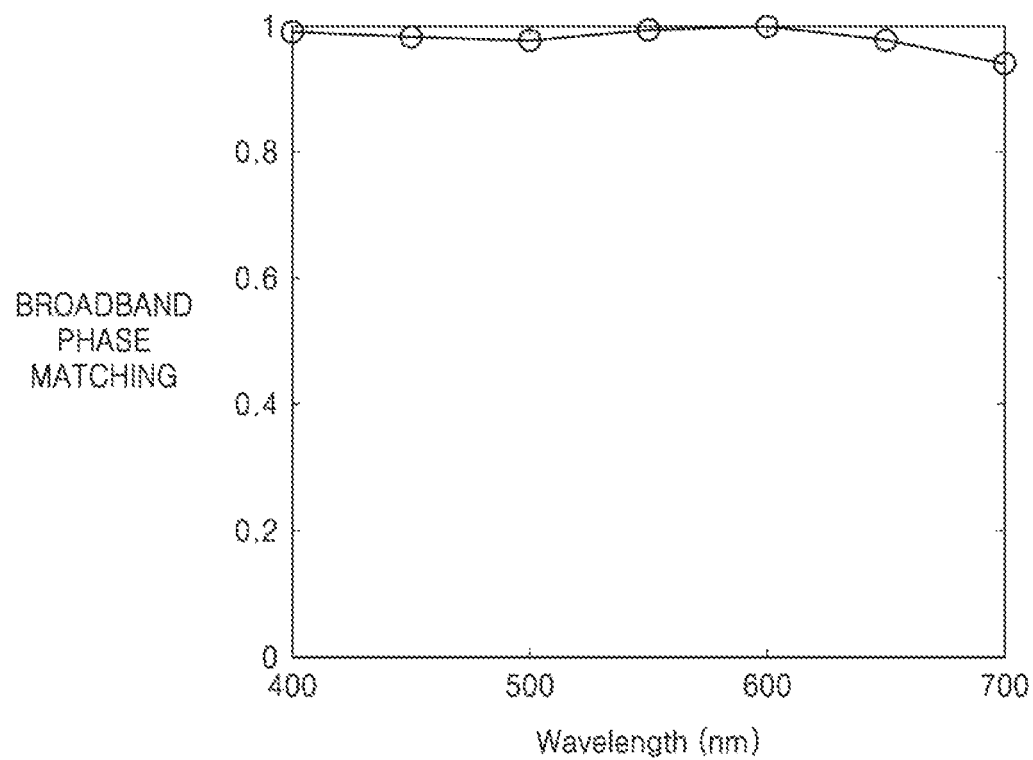
FIG. 14 illustrates a broadband phase matching of the first nano structure of FIG. 12A.

FIG. 14 is a view showing broadband phase matching ($\eta$) of the first nano structure of FIG. 12A. The higher the broadband phase matching, the higher the similarity between a transmission phase of an ideal thin lens and a designed meta-lens. The broadband phase matching may be expressed as Equation 9 below.

$$\eta = |\int_{-\pi}^{\pi} e^{i(\varphi(\lambda, \Delta\varphi) - \varphi_{ref}(\lambda) - \Delta\varphi)} d\Delta\varphi|^2$$

[Equation 9]

Here, $\Delta\varphi$ is a phase delay difference (the horizontal axis in FIG. 13) compared to a reference structure, $\varphi(\lambda, \Delta\varphi)$ is a phase delay of a structure designed to have the phase delay difference of $\Delta\varphi$, and $\varphi_{ref}(\lambda)$ is a phase delay of the reference structure. That is, $\varphi_{ref}(\lambda)+\Delta\varphi$ is an ideal target phase profile, and '$\varphi(\lambda, \Delta\varphi)-\varphi_{ref}(\lambda)-\Delta\varphi$' is a phase delay difference between the target phase profile and an actual lens.

Referring to FIG. 14, broadband phase matching of the meta-lens designed in the manner described with reference to FIG. 13 may be 0.8 or more, and more specifically, 0.9 or more.

Figure 15:
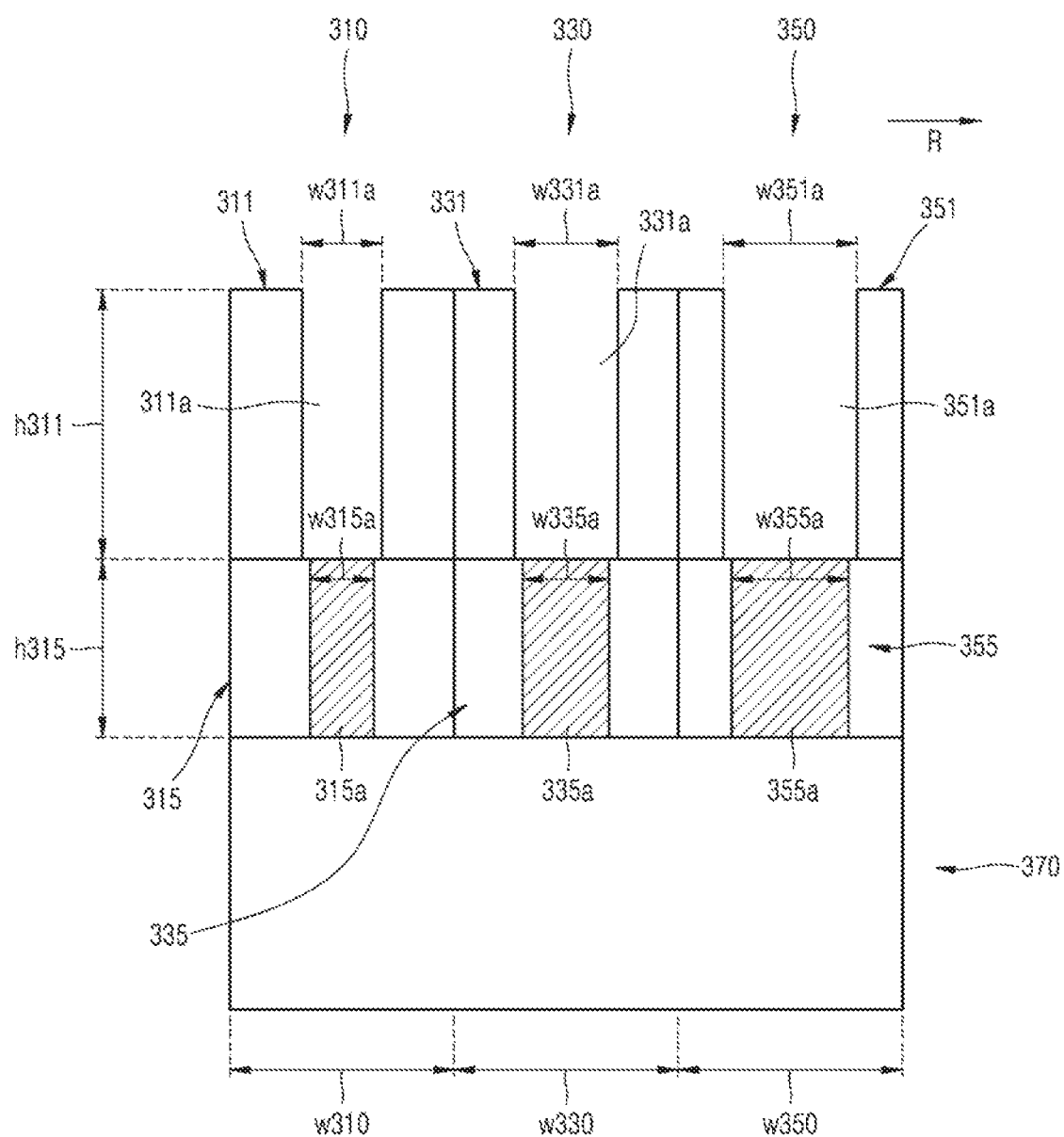
FIG. 15 is a cross-sectional view of nano structures arranged in the third Fresnel zone of FIG. 11.

FIG. 15 is a cross-sectional view illustrating nano structures arranged in the third Fresnel zone $r_3$ of FIG. 11 in more detail, and the relationship between effective refractive indices, dispersions, and inner post widths of adjacent nano structures will be described with reference to FIG. 15. An effective refractive index ($n_{eff}$) and dispersion (D) may be expressed as Equation 10 and Equation 11 below, respectively.

$$n_{eff}(\lambda) = \frac{\varphi}{K_0 \cdot h}$$ [Equation 10]

$$D(\lambda) = \frac{dn_{eff}(\lambda)}{d\lambda}$$ [Equation 11]

Here, $n_{eff}(\lambda)$ is an effective refractive index, $\lambda$ is a wavelength, $\varphi$ is a phase delay, $K_0$ is a wave number, h is the height of an inner post, and $D(\lambda)$ is dispersion.

Referring to FIG. 15, the first nano structure 310, a second nano structure 330, and a third nano structure 350 are arranged in an outer direction (R direction) of a meta-lens. Referring to FIG. 10, a phase delay of the third Fresnel zone $r_3$ has a profile that decreases in the R direction, and the nano structures 310, 330, and 350 are designed to provide an identical phase delay profile to light in an operating wavelength band. Referring to Equation 10, because a phase delay is proportional to an effective refractive index, it is designed to reduce an effective refractive index of the nano structures 310, 330, and 350 in the R direction, and for this purpose, first inner posts 311a, 331a, and 351a may increase in width in the R direction. When the first inner posts 311a, 331a, and 351a are air and the material of a structure surrounding the first inner posts 311a, 331a, and 351a is $SiO_2$ as an example, the refractive index of air is less than that of $SiO_2$. Accordingly, an effective refractive index of first phase shift layers 311, 331, and 351 gradually decrease as the width of an air post increases. Because most optical materials have a smaller effective refractive index, the smaller the dispersion size, and thus, dispersion of the first phase shift layers 311, 331, and 351 also decreases in the R direction. However, because a reduction rate of an effective refractive index is different from a reduction rate of dispersion, it is difficult to provide an identical phase delay profile for light of different wavelengths using only the first phase shift layers 311, 331, and 351. Second phase shift layers 315, 335, and 355 of FIG. 15 may correct the difference between the effective refractive index change and the dispersion change.

The second inner posts 315a, 335a, and 355a may be designed to increase in width in the R direction. When the second inner posts 315a, 335a, and 355a are $TiO_2$ and a surrounding structure is $SiO_2$ as an example, because a refractive index of $TiO_2$ is higher than that of $SiO_2$, an effective refractive index of the second phase shift layers 315, 335, and 355 increases in the R direction. The effective refractive index and a phase delay profile of the nano structures 310, 330, and 350 may be reduced in the R direction by designing an increase in the effective refractive index of the second phase shift layers 315, 335, and 355 to be less than a decrease in the effective refractive index of the first phase shift layers 311, 331, 351. At the same time, the ratio of a dispersion increase rate to a refractive index increase rate of the second inner posts 315a, 335a, and 355a may be designed to be greater than the ratio of a dispersion reduction rate to a refractive index reduction rate of the first phase shift layers 311, 331, and 351. For example, in order to prevent a phase delay for each wavelength from changing as the dispersion of the first phase shift layers 311, 331, and 351 decreases in the R direction, the dispersion of the second phase shift layers 315, 335, and 355 increases in the R direction to compensate for this. At this time, because the refractive index of the second phase shift layers 315, 335, and 355 need not to be increased to compensate for all decreases in the refractive index of the first phase shift layers 311, 331, and 351, the ratio of a dispersion increase rate to a refractive index increase rate of the second phase shift layers 315, 335, and 355 may be designed to be greater than the ratio of the dispersion reduction rate to the refractive index reduction rate of the first phase shift layers 311, 331, and 351.

A material having a large refractive index has a large change rate of dispersion compared to an effective refractive index change rate. A material having a larger refractive index than the first inner posts 311a, 331a, and 351a may be used as a material of the second inner posts 315a, 335a, and 355a. In addition, among the first and second inner posts 311a, 331a, 351a, 315a, 335a, and 355a, inner posts having a small height may include a material having a large refractive index. A relationship between the effective refractive index and the dispersion of the first phase shift layers 311, 331, and 351 and the second phase shift layers 315, 335, and 355 may satisfy Equation 12 to Equation 14 below.

$$N11 > N21 \qquad [\text{Equation 12}]$$

$$N12 < N22 \qquad [\text{Equation 13}]$$

$$\frac{\frac{(D11-D21)}{D11}}{\frac{(N11-N21)}{N11}} < \frac{\frac{(D22-D12)}{D12}}{\frac{(N22-N12)}{N12}} \qquad [\text{Equation 14}]$$

Here, N11 is the effective refractive index of the first phase shift layer 311 of the first nano structure 310, N12 is the effective refractive index of the second phase shift layer 315 of the first nano structure 310, N21 is the effective refractive index of the first phase shift layer 331 of the second nano structure 330, N22 is the effective refractive index of the second phase shift layer 335 of the second nano structure 330, D11 is the dispersion of the phase shift layer 311 of the first nano structure 310, D12 is the dispersion of the second phase shift layer 315 of the first nano structure 310, D21 is the dispersion of the first phase shift layer 331 of the second nano structure 330, and D22 is the dispersion of the second phase shift layer 335 of the second nano structure 330.

Figure 16A:
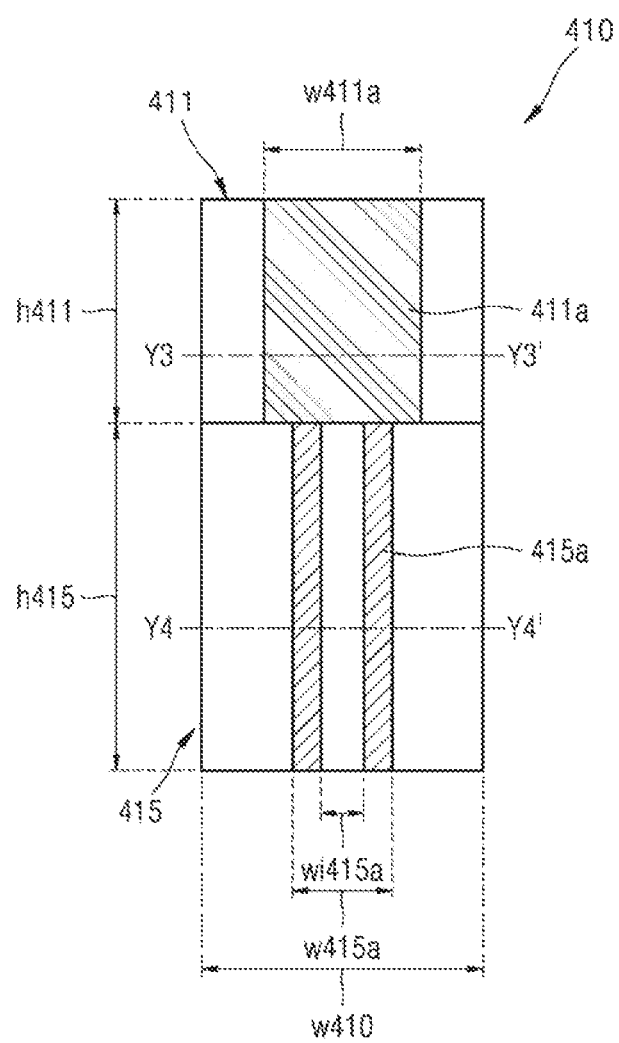
FIG. 16A illustrates a cross-section of a first nano structure according to another example embodiment.
Figure 16B:
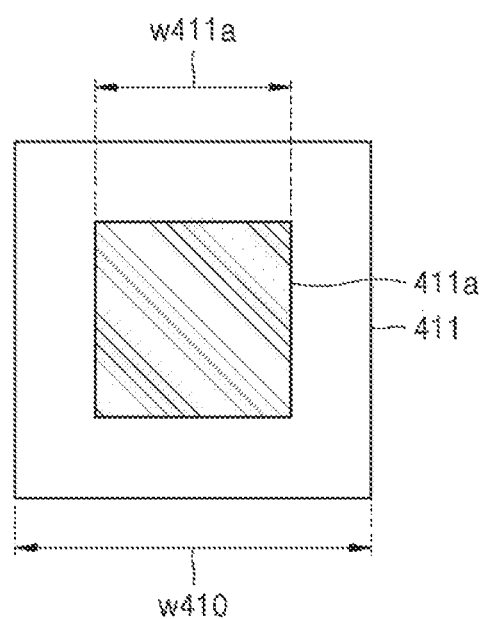
FIGS. 16B and 16C are cross-sectional views of a first phase shift layer and a second phase shift layer of the first nano structure of FIG. 16A.
Figure 16C:
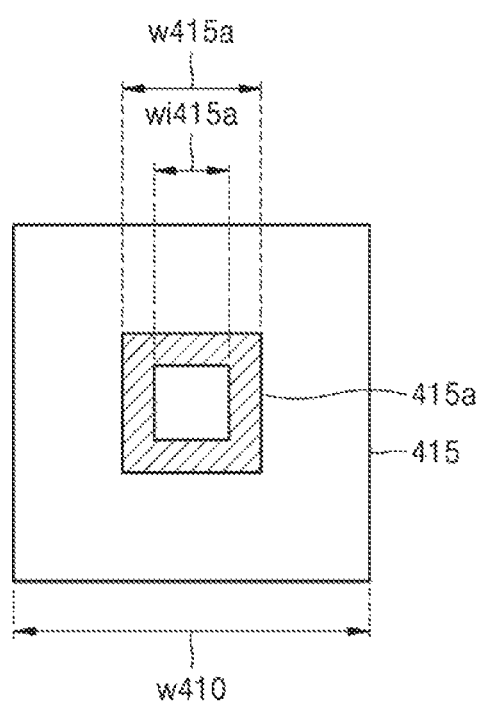

FIG. 16A illustrate a cross-section of a first nano structure according to another example embodiment, and FIGS. 16B and 16C are cross-sectional views of the first nano structure 410 taken along lines Y3-Y3' and Y4-Y4' of FIG. 16A. Descriptions that overlap with the previous embodiment will not be given herein.

Compared to the first nano structure 310 of FIG. 12A, in a first nano structure 410, a height h411 of a first phase shift layer 411 is less than a height h415 of a second phase shift layer 415, and a second inner post 415a has a hollow square cross-section and the inner space is filled by a structure.

In FIG. 16A, the first phase shift layer 411 is described as an example in which the cross-section is a square, the height h411 is 1450 nm, a first inner post 411a has a square cross-section, and the material is $TiO_2$, and the second phase shift layer 415 is described as an example in which the cross-section is a square, the height h415 is 2480 nm, the second inner post 415a has a square cross-section of outer and inner peripheral surfaces, and the material is $Si_3N_4$. Heights of the first inner post 411a and the second inner post 415a may be the same as the height of each phase shift layer, and structures of the first phase shift layer 411 and the second phase shift layer 415 may be $SiO_2$.

Figure 17:
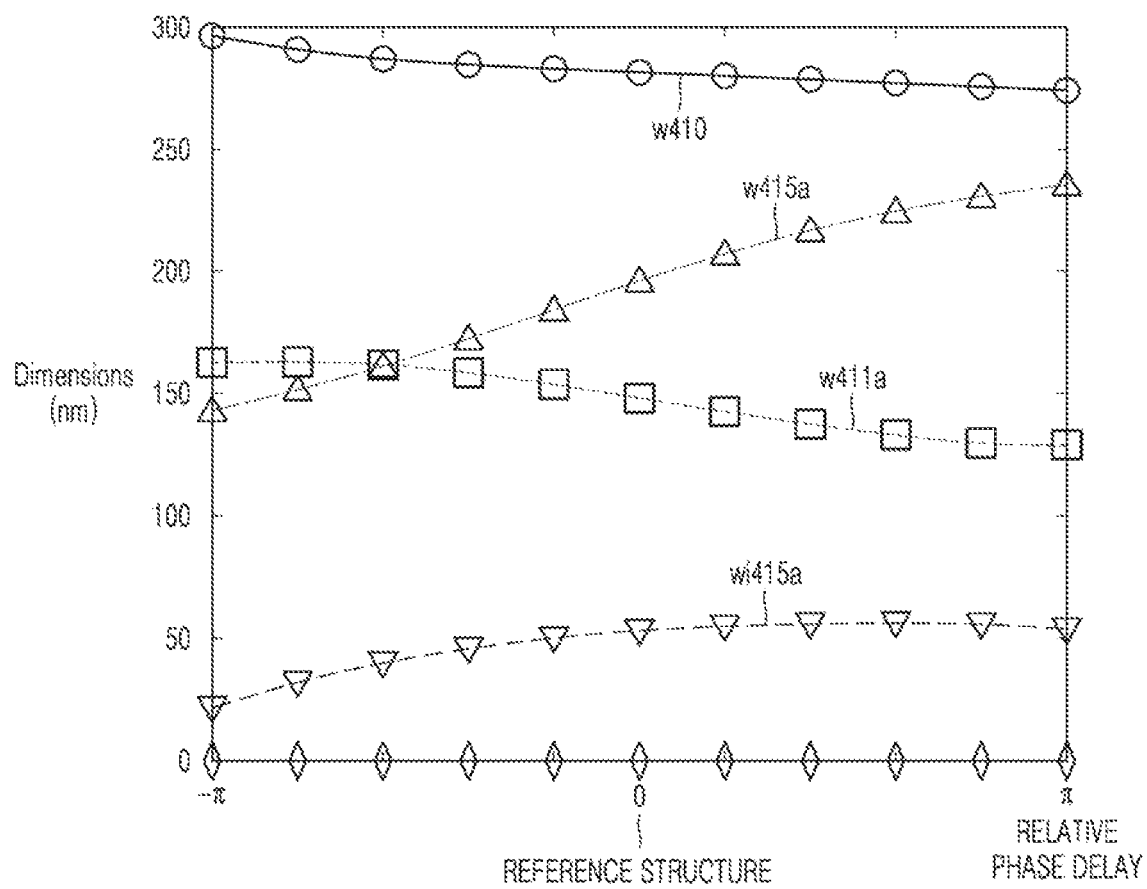
FIG. 17 is a view showing the relative amount of phase delay measured while changing a width of the first nano structure of FIG. 16A, a width of a first inner post, a width of an outer peripheral surface of a second inner post, and a width of an inner peripheral surface of the second inner post.
Figure 18:
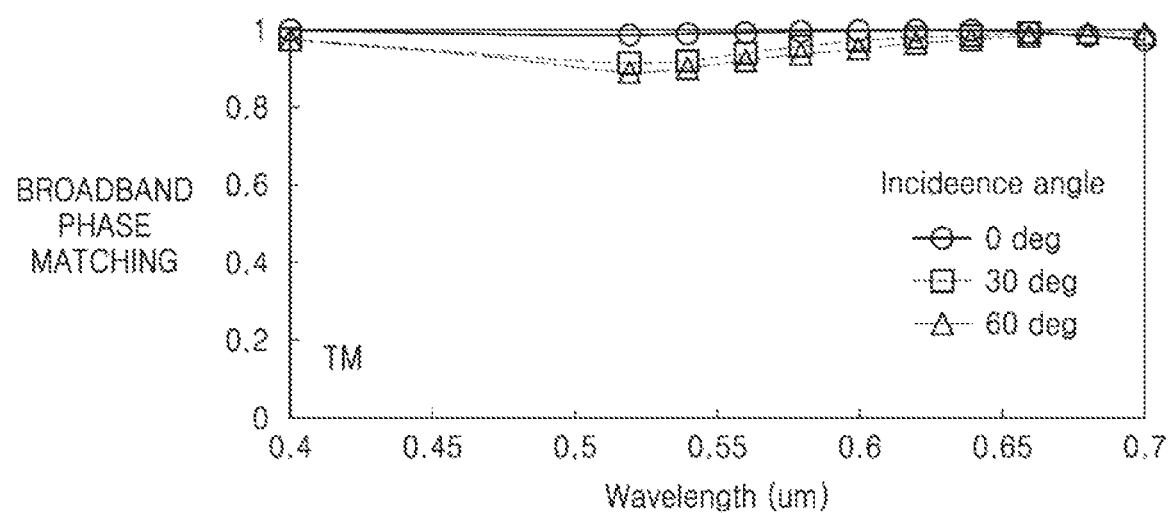
FIG. 18 illustrates broadband phase matching by the first nano structure of FIG. 16A.

FIG. 17 shows the relationship between a width wi415a of an inner peripheral surface of the second inner post 415a, a width w410 of the first nano structure 410, a width w411a of the first inner post 411a, a width w415a of an outer peripheral surface of the second inner post 415a of FIG. 16A, and the amount of delay in a relative phase by the first nano structure 410. FIG. 18 illustrates broadband phase matching by the first nano structure 410 of FIG. 16A.

Referring to FIG. 17, the width w410 of the first nano structure of FIG. 16A and the width w411a of the first inner post 411a show a profile that decreases in a direction in which the phase delay increases, the width w415a of the outer peripheral surface of the second inner post 415a shows a profile that increases in the direction in which the phase delay increases, and the width wi415a of the inner peripheral surface shows a profile that generally increases in the direction in which the phase delay increases and then decreases slightly when the phase delay approaches π.

Referring to FIG. 18, the first nano structure 410 of FIG. 16A exhibits broadband phase matching of 0.8 or more, more specifically 0.9 or more, for incident light entering 0 degrees to 60 degrees.

Figure 19:
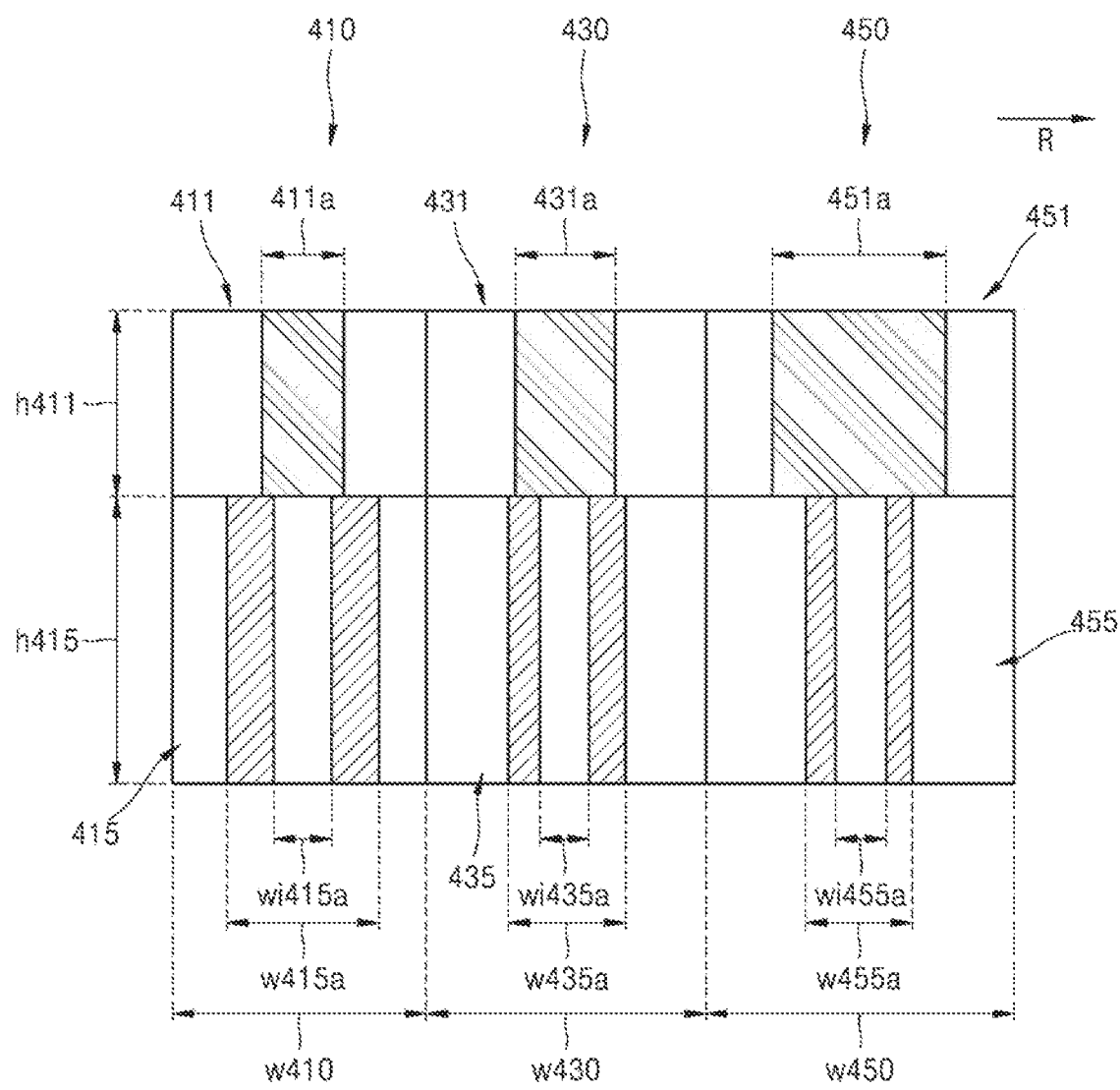
FIG. 19 is a cross-sectional view of nano structures arranged in the third Fresnel zone of FIG. 11 according to another example embodiment.

FIG. 19 is a view for explaining another example embodiment in which nano structures are arranged in the third Fresnel zone $r_3$ of FIG. 11, and is a cross-sectional view of nano structures 410, 430, and 450 designed to have a phase delay profile that decreases in the R direction, as shown in FIG. 10.

Referring to FIG. 19, the first nano structure 410, the second nano structure 430, and the third nano structure 450 are arranged in the R direction in an order, and may be designed to provide an identical phase delay profile for pieces of incident light having different wavelengths.

Similar to the method in which the second phase shift layers 315, 335, and 355 of FIG. 15 correct the difference between a refractive index change rate and a dispersion change rate of the first phase shift layers 311, 331, and 351, first phase shift layers 411, 431, and 451 of FIG. 19 may correct a difference between a refractive index change rate and a dispersion change rate of second phase shift layers 415, 435, and 455. In order to implement a phase delay profile, the second phase shift layers 415, 435, and 455 may be designed such that the effective refractive index decreases in the R direction, and the first phase shift layers 411, 431, and 451 may be designed to correct the amount of dispersion change of the second phase shift layers 415, 435, and 455 while the effective refractive index increases in the R direction at a smaller increase rate than an effective refractive index reduction rate of the second phase shift layers 415, 435, and 455.

Figure 20A:
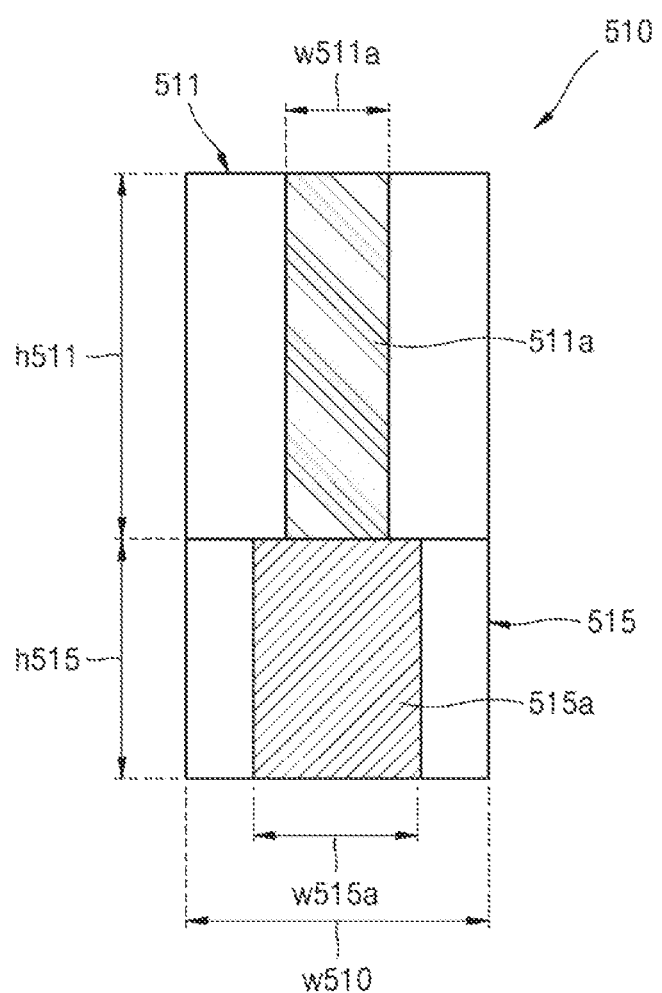
FIGS. 20A, 20B, and 20C are cross-sectional views of a nano structure according to another example embodiment.
Figure 20B:
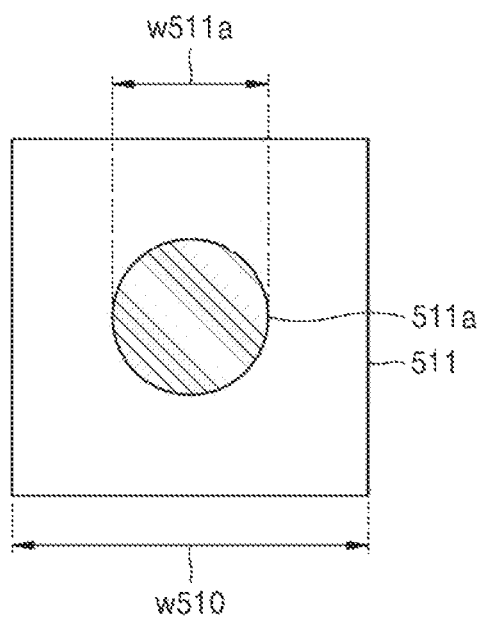
Figure 20C:
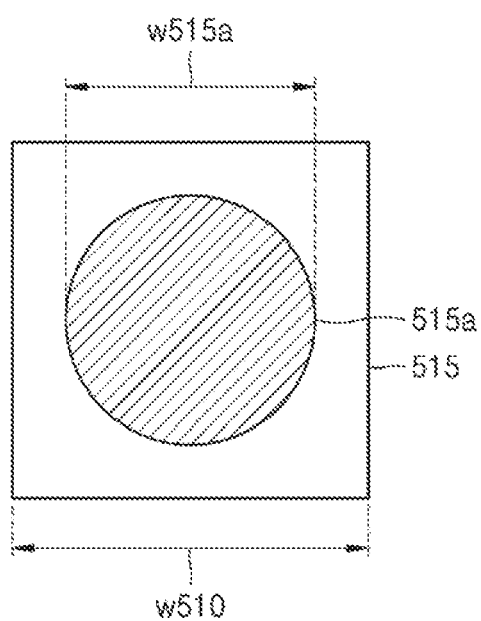

FIGS. 20A to 20C are views for illustrating an example embodiment in which cross-sections of the first inner post 511a and the second inner post 515a are circular. FIG. 20A is a cross-sectional view of a nano structure 510 in which the first inner post 511a is a $SiO_2$ cylinder and the second inner post 515a is a $TiO_2$ cylinder, FIG. 20B is a horizontal cross-sectional view of a first phase shift layer 511 of FIG. 20A, and FIG. 20C is a horizontal cross-sectional view of a second phase shift layer 515 of FIG. 20A.

In the example embodiment of FIG. 20A, although cross-sections of the first inner post 511a and the second inner post 515a have an identical shape (circular), cross-sections of the first inner post 511a and the second inner post 515a may have different shapes. For example, the cross-section of the first inner post 511*a* may be circular, and the cross-section of the second inner post 515*a* may be square.

Figure 21:
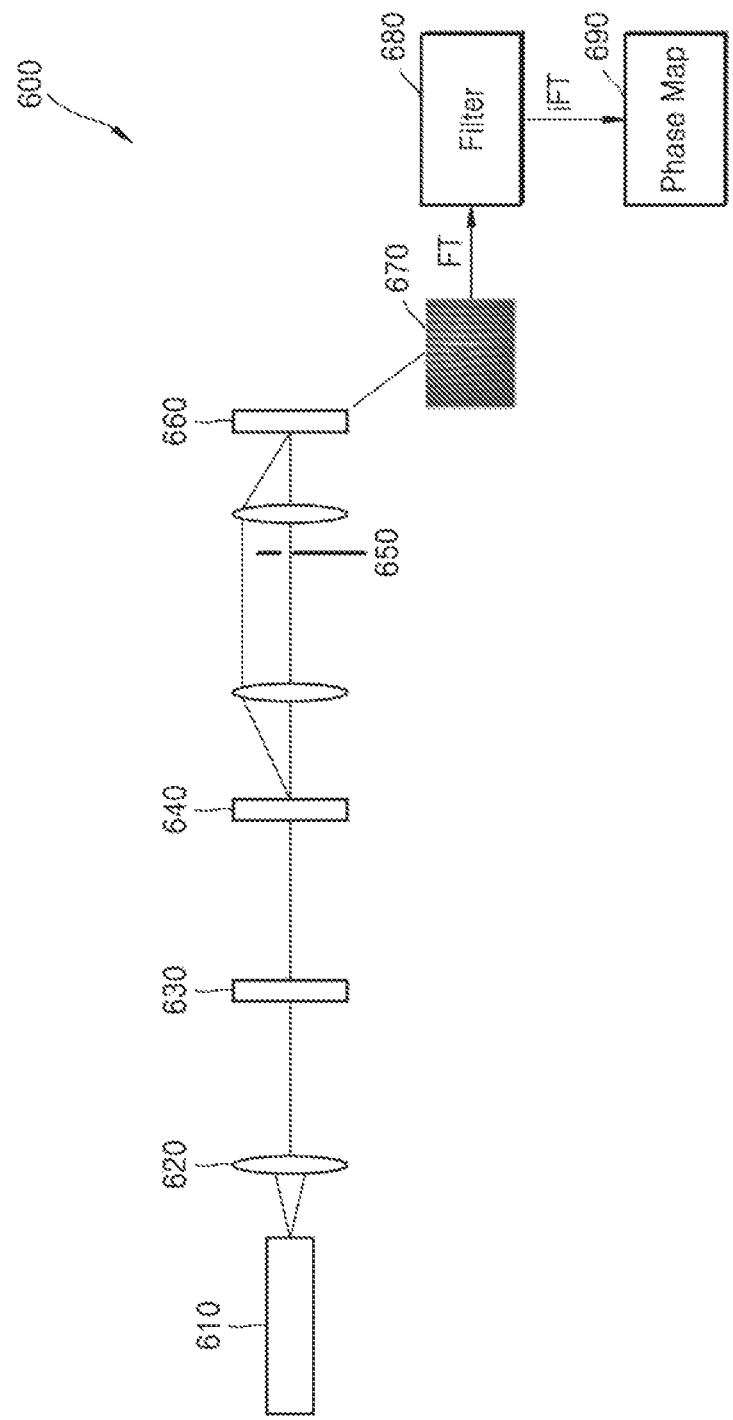
FIG. 21 illustrates an interferometer of a common path method.

FIG. 21 shows a common path interferometer, and a method of measuring a phase delay profile is described by the common path interferometer.

An interferometer 600 of FIG. 21 collimates light emitted from a laser light source 610 using a lens 620, the light passes through a sample 630 to be measured, that is, the meta-lens described above, and the interferometer 600 duplicates the light with a grating 640 and divides the light. The interferometer 600 may pass one of the duplicated beams through a pin hole 650 to form a parallel wave, and then combine the two divided beams again and measure them by an image sensor 660 to obtain an interference fringe 670. After the interference fringe 670 is Fourier transformed, appropriate filtering 680 and inverse Fourier transformation are performed to obtain a phase map 690 showing a phase delay profile. Because a relationship between a phase delay and an effective refractive index is the same as Equation 10 and a relationship between the effective refractive index and dispersion is the same as Equation 11, the effective refractive index profile and dispersion may be known from the measured phase delay profile.

The lens assemblies 1100, 1300, and 1500 described above may be mounted and used in an electronic device (optical device, etc.). The electronic device may further include an application processor AP in addition to the image sensor 1200, and may control a plurality of hardware or software components connected to the application processor AP by driving an operating system or an application program through the application processor AP, and may perform a variety of data processing and operations. The application processor AP may further include a graphic processing unit (GPU) and/or an image signal processor. When an image signal processor is included in the application processor AP, an image (or video) obtained by the image sensor 1200 may be stored and/or output using the application processor AP.

Figure 22:
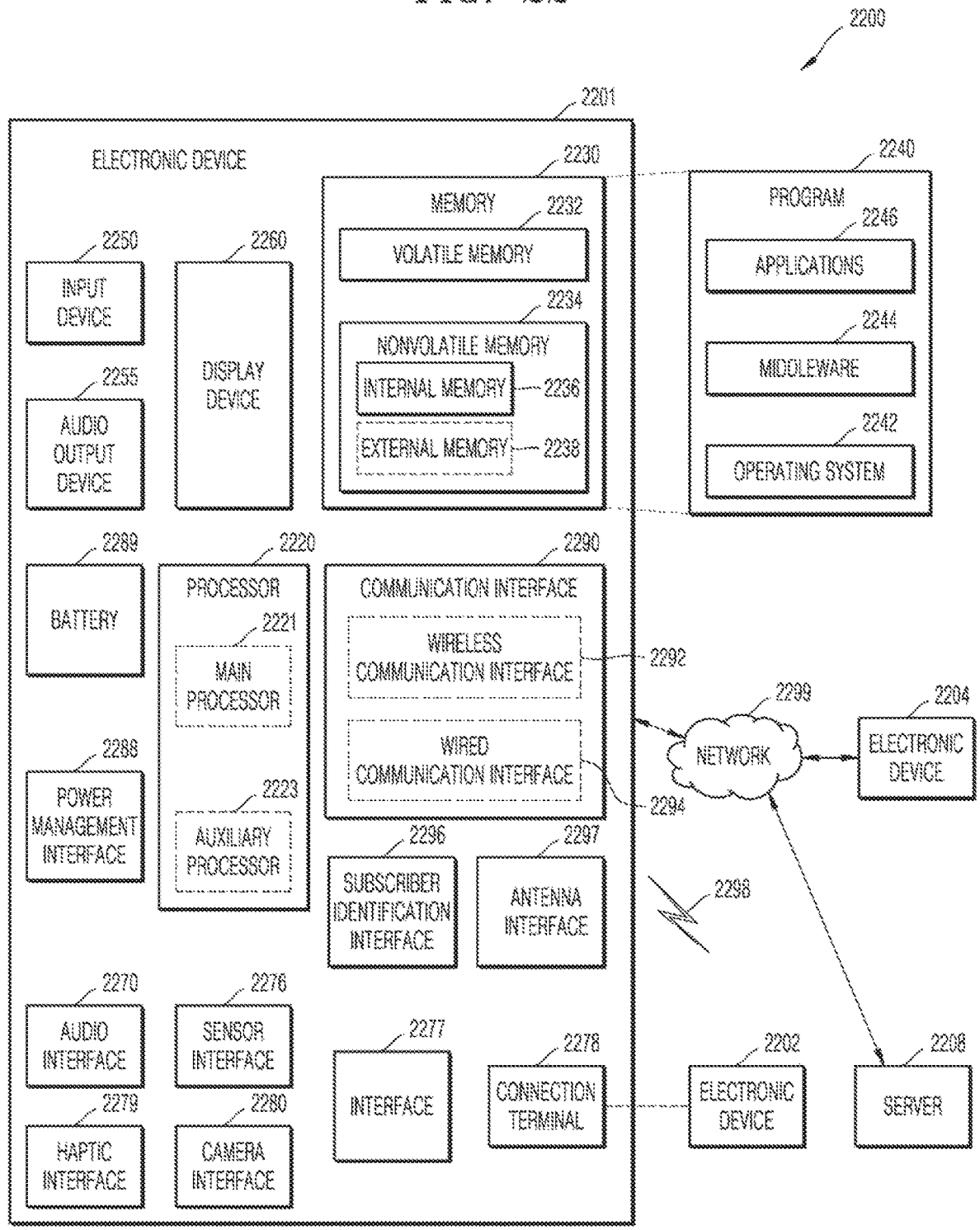
FIG. 22 illustrates a block diagram of an electronic device in a network environment according to an example embodiment.

FIG. 22 is a block diagram illustrating an example of an electronic device 2201 within a network environment 2200. Referring to FIG. 22, in the network environment 2200, the electronic device 2201 may communicate with another electronic device 2202 through a first network 2298 (near-field wireless communication network, etc.), or may communicate with another electronic device 2204 and/or a server 2208 through a second network 2299 (a telecommunications network, etc.). The electronic device 2201 may communicate with the electronic device 2204 through the server 2208. The electronic device 2201 may include a processor 2220, a memory 2230, an input device 2250, an audio output device 2255, a display device 2260, an audio device 2270, a sensor 2276, an interface 2277, a haptic device 2279, a camera 2280, a power management device 2288, a battery 2289, a communication interface 2290, a subscriber identification device 2296, and/or an antenna 2297. In the electronic device 2201, some (the display device 2260, etc.) of these components may be omitted, or other components may be added. Some of these components may be implemented in one integrated circuit. For example, the sensor 2276 (a fingerprint sensor, an iris sensor, an illuminance sensor, etc.) may be implemented by being embedded in the display device 2260 (a display, etc.).

The processor 2220 may execute software (a program 2240, etc.) to control one or more other components (hardware or software components, etc.) of the electronic device 2201 connected to the processor 2220, and may perform a variety of data processing or operations. As a portion of the data processing or operations, the processor 2220 may load instructions and/or data received from other components (the sensor 2276, the communication interface 2290, etc.) into a volatile memory 2232, may process instructions and/or data stored in the volatile memory 2232, and may store result data in a nonvolatile memory 2234. The processor 2220 may include a main processor 2221 (a central processing unit, an application processor, etc.) and an auxiliary processor 2223 (a graphics processing unit, an image signal processor, a sensor hub processor, a communication processor, etc.) that may be operated independently or together. The auxiliary processor 2223 uses less power than the main processor 2221 and may perform specialized functions.

The auxiliary processor 2223 may control functions and/or states related to some (the display device 2260, the sensor 2276, the communication interface 2290, etc.) of components of the electronic device 2201 on behalf of the main processor 2221 while the main processor 2221 is in an active (e.g., sleep) state or with the main processor 2221 while the main processor 2221 is in an inactive (e.g., application execution) state. The auxiliary processor 2223 (an image signal processor, a communication processor, etc.) may be implemented as a portion of other functionally relevant components (the camera 2280, the communication interface 2290, etc.).

The memory 2230 may store a variety of data required by components (the processor 2220, the sensor 2276, etc.) of the electronic device 2201. The data may include, for example, software (the program 2240, etc.) and input data and/or output data for commands related thereto. The memory 2230 may include the volatile memory 2232 and/or the nonvolatile memory 2234.

The program 2240 may be stored as software in the memory 2230, and may include an operating system 2242, middleware 2244, and/or applications 2246.

The input device 2250 may receive commands and/or data to be used for the components (the processor 2220, etc.) of the electronic device 2201 from the outside (a user, etc.) of the electronic device 2201. The input device 2250 may include a microphone, mouse, keyboard, and/or digital pen (a stylus pen, etc.).

The audio output device 2255 may output an audio signal to the outside of the electronic device 2201. The audio output device 2255 may include a speaker and/or a receiver. The speaker may be used for general purposes such as multimedia playback or recording playback, and the receiver may be used to receive incoming calls. The receiver may be combined as a portion of the speaker or may be implemented as a separate device.

The display device 2260 may visually provide information to the outside of the electronic device 2201. The display device 2260 may include a display, a hologram device, or a projector, and a control circuit for controlling the devices. The display device 2260 may include a touch circuitry set to sense a touch, and/or a sensor circuit (a pressure sensor, etc.) configured to measure the intensity of force generated by the touch.

The audio device 2270 may convert sound into an electrical signal, or vice versa. The audio device 2270 may obtain sound through the input device 2250, or may output sound through the audio output device 2255 and/or speakers and/or headphones of another electronic device (an electronic device 2102, etc.) directly or wirelessly connected to the electronic device 2201.

The sensor 2276 may detect an operating state (power, temperature, etc.) of the electronic device 2201 or an external environmental state (user status, etc.), and may generate an electrical signal and/or a data value corresponding to the detected state. The sensor 2276 may include a gesture sensor, a gyro sensor, a barometric sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 2277 may support one or more designated protocols, which may be used to directly or wirelessly connect the electronic device 2201 with other electronic devices (the electronic device 2102, etc.). The interface 2277 may include a high definition multimedia interface (HDMI), a universal serial bus (USB) interface, a secure digital (SD) card interface, and/or an audio interface.

A connection terminal 2278 may include a connector through which the electronic device 2201 may be physically connected to other electronic devices (the electronic device 2102, etc.). The connection terminal 2278 may include an HDMI connector, a USB connector, an SD card connector, and/or an audio connector (a headphone connector, etc.).

The haptic device 2279 may convert electrical signals into a mechanical stimulus (vibration, movement, etc.) or an electrical stimulus that the user may perceive through tactile or motor sensations. The haptic device 2279 may include a motor, a piezoelectric element, and/or an electrical stimulation device.

The camera 2280 may capture a still image and a moving image. The camera 2280 may include a lens assembly including one or more lenses, image sensors, image signal processors, and/or flashes. The lens assembly included in the camera 2280 may collect light emitted from an object to be image captured, and may be any one of the lens assemblies 1100, 1300, and 1500 described with reference to FIGS. 1, 5, and 7.

The power management device 2288 may manage power supplied to the electronic device 2201. The power management device 388 may be implemented as a portion of a power management integrated circuit PMIC.

The battery 2289 may supply power to components of the electronic device 2201. The battery 2289 may include a non-rechargeable primary battery, a rechargeable secondary battery, and/or a fuel cell.

The communication interface 2290 may support establishment of a direct (wired) communication channel and/or a wireless communication channel between the electronic device 2201 and other electronic devices (the electronic device 2102, an electronic device 2104, a server 2108, etc.), and communication through the established communication channel. The communication interface 2290 operates independently of the processor 2220 (an application processor, etc.) and may include one or more communication processors supporting direct communication and/or wireless communication. The communication interface 2290 may include a wireless communication interface 2292 (a cellular communication interface, a short-range wireless communication interface, a global navigation satellite system (GNSS), etc.) and/or a wired communication interface 2294 (a local area network (LAN) communication interface, a power line communication interface, etc.). The corresponding communication interface among these communication interfaces may communicate with other electronic devices through the first network 2298 (a local area network such as Bluetooth, WiFi Direct, or Infrared Data Association (IrDA)) or the second network 2299 (a telecommunication network such as a cellular network, the Internet, or computer networks (LAN, WAN, etc.)). These various types of communication interfaces may be integrated into a single component (a single chip, etc.) or may be implemented as a plurality of separate components (multiple chips). The wireless communication interface 2292 may identify and authenticate the electronic device 2201 within a communication network such as the first network 2298 and/or the second network 2299 by using subscriber information (an international mobile subscriber identifier (IMSI), etc.) stored in the subscriber identity module 2296.

The antenna 2297 may transmit and/or receive signals and/or power to and/or from the outside (other electronic devices, etc.). An antenna may include a radiator made of a conductive pattern formed on a substrate (PCB, etc.). The antenna 2297 may include one or more antennas. When a plurality of antenna are included, the communication interface 2290 may select an antenna suitable for a communication method used in a communication network, such as the first network 2298 and/or the second network 2299, among the plurality of antennas. Signals and/or power may be transmitted or received between the communication interface 2290 and other electronic devices through the selected antenna. Other components (RFIC, etc.) besides the antenna may be included as a portion of the antenna 2297.

Some of the components may be connected to each other and exchange signals (command, data, etc.) through a communication method between peripheral devices (a bus, general purpose input and output (GPIO), a serial peripheral interface (SPI), a mobile industry processor interface (MIPI), etc.).

Commands or data may be transmitted or received between the electronic device 2201 and the external electronic device 104 through the server 2108 connected to the second network 2299. The other electronic devices 2202 and 2204 may be the same as or different from the electronic device 2201. All or some of the operations executed in the electronic device 2201 may be executed in one or more of the other electronic devices 2202, 2204, and 2208. For example, when the electronic device 2201 needs to perform certain functions or services, the electronic device 2201 may request one or more other electronic devices to perform some or all of the functions or services instead of directly executing the functions or services. One or more other electronic devices that have received the request may execute an additional function or service related to the request, and may transfer a result of the execution to the electronic device 2201. To this end, cloud computing, distributed computing, and/or client-server computing technologies may be used.

Figure 23:
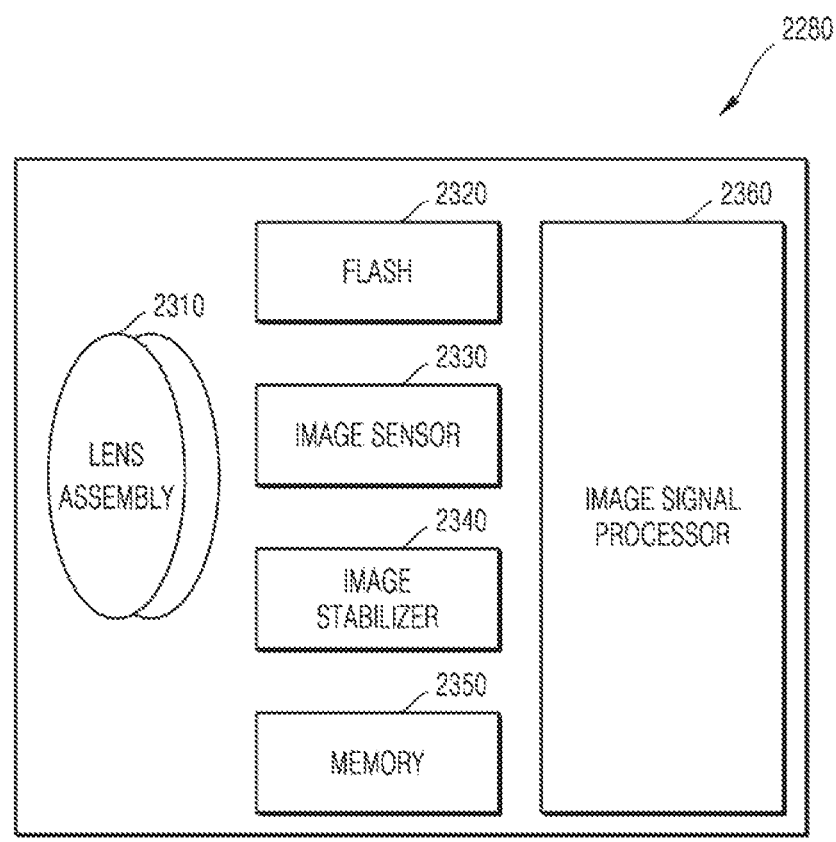
FIG. 23 is a detailed block diagram of a camera of FIG. 22.

FIG. 23 is a block diagram illustrating the camera 2280 of FIG. 22. Referring to FIG. 23, the camera 2280 may include a lens assembly 2310, a flash 2320, an image sensor 2330 (an image sensor 1200 of FIG. 1, etc.), an image stabilizer 2340, a memory 2350 (a buffer memory, etc.), and/or an image signal processor 2360. The lens assembly 2310 may collect light emitted from an object to be image captured, and may be any one of the lens assemblies 1100, 1300, and 1500 described with reference to FIGS. 1, 5, and 7. The camera 2280 may include a plurality of lens assemblies 2310, and in this case, may be a dual camera, a 360 degree camera, or a spherical camera. Some of the plurality of lens assemblies 2310 may have the same lens properties (angle of view, focal length, autofocus, F Number, optical zoom, etc.) or different lens properties. The lens assembly 2310 may include a wide-angle lens or a telephoto lens.

The flash 2320 may emit light used to enhance light emitted or reflected from an object. The flash 2320 may include one or more light-emitting diodes (red-green-blue (RGB) LED, white LED, infrared LED, ultraviolet LED, etc.), and/or a xenon lamp. The image sensor 2330 may be the image sensor 1200 described with reference to FIGS. 1, 5, and 7, and may obtain an image corresponding to the object by converting light emitted or reflected from the object and transferred through the lens assembly 2310 into an electrical signal. The image sensor 2330 may include one or a plurality of sensors selected from image sensors having different attributes, such as an RGB sensor, a black and white (BW) sensor, an IR sensor, or a UV sensor. Each of the sensors included in the image sensor 2330 may be implemented as a charged coupled device (CCD) sensor and/or a complementary metal oxide semiconductor (CMOS) sensor.

The image stabilizer 2340 may move one or a plurality of lenses or the image sensor 2330 included in the lens assembly 2310 in a specific direction in response to movement of the camera 2280 or an electronic device 2301 including the same, or may control an operating characteristic of the image sensor 2330 (adjustment of read-out timing, etc.) such that a negative effect due to movement is compensated for. The image stabilizer 2340 may detect movement of the camera 2280 or the electronic device 2301 by using a gyro sensor or an acceleration sensor arranged inside or outside the camera 2280. The image stabilizer 2340 may be implemented optically.

In the memory 2350, some or all of the data obtained through the image sensor 2330 may be stored for the next image processing operation. For example, when a plurality of images are obtained at high speed, the obtained original data (Bayer-patterned data, high-resolution data, etc.) may be stored in the memory 2350 and only a low-resolution image is displayed, and then the original data of a selected image (user selection, etc.) may be transferred to the image signal processor 2360. The memory 2350 may be integrated into the memory 2230 of the electronic device 2201 or may be configured as a separate memory that is independently operated.

The image signal processor 2360 may perform one or more image processes on an image obtained through the image sensor 2330 or image data stored in the memory 2350. The one or more image processes may include depth map generation, three-dimensional modeling, panorama generation, feature point extraction, image synthesis, and/or image compensation (noise reduction, resolution adjustment, brightness adjustment, blurring, sharpening, softening, etc.). The image signal processor 2360 may control (exposure time control, or read-out timing control, etc.) components (the image sensor 2330, etc.) included in the camera 2280. An image processed by the image signal processor 2360 may be stored again in the memory 2350 for further processing or may be provided to external components (the memory 2230, the display device 2260, the electronic device 2202, the electronic device 2204, the server 2208, etc.) of the camera 2280. The image signal processor 2360 may be integrated into the processor 2220 or may be configured as a separate processor that operates independently of the processor 2220. When the image signal processor 2360 is configured as a separate processor from the processor 2220, an image processed by the image signal processor 2360 may be displayed through the display device 2260 after further image processing by the processor 2220.

The electronic device 2201 may include a plurality of cameras 2280 having respective attributes or functions. In this case, one of the plurality of cameras 2280 may be a wide-angle camera, and the other may be a telephoto camera. Similarly, one of the plurality of cameras 2280 may be a front camera, and the other may be a rear camera.

By constructing a lens assembly combining a refractive lens and a meta-lens, the thickness of the lens assembly may be reduced and aberration problems may be improved.

As mentioned above, although example embodiments have been described in the disclosure, it is apparent to one of ordinary skill in the art that various modifications are possible without departing from the gist of the disclosure. For example, dimensions of the plurality of lenses disclosed in the example embodiments may be appropriately set according to a lens assembly to be actually manufactured, the structure and requirements of an electronic device on which the lens assembly will be mounted, an actual use environment, or the like.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A lens assembly comprising:
   a first lens having positive optical power with respect to incident light incident from an object side and having a convex surface facing the object side; and
   a second lens comprising a meta-lens having negative chromatic aberration with respect to the incident light passing through the first lens.
   wherein the meta-lens satisfies the following equation:

$$f_{M1}\lambda_1 = f_{M2}\lambda_2 = f_{M3}\lambda_3,$$

where $f_{M1}$ is a focal length of the meta-lens for light of a first wavelength $\lambda_1$ of the incident light, $f_{M2}$ is a focal length of the meta-lens for light of a second wavelength $\lambda_2$ of the incident light, and $f_{M3}$ is a focal length of the meta-lens for light of a third wavelength $\lambda_3$ of the incident light.

2. The lens assembly of claim 1, wherein the meta-lens comprises a nano structure array, the meta-lens being configured to form an identical phase delay profile for at least two different wavelengths of the incident light.

3. The lens assembly of claim 1, wherein the incident light comprises visible light.

4. The lens assembly of claim 1, comprising a total of five or more lenses.

5. The lens assembly of claim 1, wherein the second lens further comprises a refractive lens having positive optical power with respect to the incident light passing through the meta-lens, a surface of the refractive lens facing the object side being in contact with the meta-lens.

6. The lens assembly of claim 1, wherein the lens assembly satisfies the following expression:

$$0.8*F0 < F1 < 1.2*F0,$$

where F1 is a focal length of the first lens and F0 is a composite focal length of the lens assembly.

7. The lens assembly of claim 1, wherein the lens assembly satisfies the following expression:

$$0.85*F0 < TTL < 1.2*F0,$$

where TTL is a total track length of the lens assembly and F0 is a composite focal length of the lens assembly.

8. The lens assembly of claim 1, wherein an effective radius of a surface facing the object side of the first lens is greater than an effective radius of a surface facing the object side of the second lens.

9. The lens assembly of claim 2, wherein the nano structure array comprises a plurality of nano structures,
wherein the plurality of nano structures comprise a first phase shift layer configured to react with incident light passing through the first lens and change a phase of the incident light passing through the first lens, and a second phase shift layer configured to change a phase of incident light passing through the first phase shift layer, and
wherein a first nano structure of the plurality of nano structures and a second nano structure of the plurality of nano structures adjacent to the first nano structure satisfy the following expressions:

N11>N21, and

N12<N22, where N11 is an effective refractive index of the first phase shift layer of the first nano structure, N12 is an effective refractive index of the second phase shift layer of the first nano structure, N21 is an effective refractive index of the first phase shift layer of the second nano structure, and N22 is an effective refractive index of the second phase shift layer of the second nano structure.

10. The lens assembly of claim 2, wherein the nano structure array comprises a plurality of nano structures,
wherein the plurality of nano structures comprise a first phase shift layer configured to react with incident light passing through the first lens and changes a phase of the incident light passing through the first lens, and a second phase shift layer configured to change a phase of incident light passing through the first phase shift layer, and
wherein a first nano structure of the plurality of nano structures and a second nano structure of the plurality of nano structures adjacent to the first nano structure satisfy the following equation:

$$\frac{\frac{(D11-D21)}{D11}}{\frac{(N11-N21)}{N11}} \ne \frac{\frac{(D22-D12)}{D12}}{\frac{(N22-N12)}{N12}},$$

where N11 is an effective refractive index of the first phase shift layer of the first nano structure, N12 is an effective refractive index of the second phase shift layer of the first nano structure, N21 is an effective refractive index of the first phase shift layer of the second nano structure, N22 is an effective refractive index of the second phase shift layer of the second nano structure, D11 is dispersion of the first phase shift layer of the first nano structure, D12 is dispersion of the second phase shift layer of the first nano structure, D21 is dispersion of the first phase shift layer of the second nano structure, and D22 is dispersion of the second phase shift layer of the second nano structure.

11. The lens assembly of claim 2, wherein the nano structure array comprises a plurality of nano structures,
wherein the plurality of nano structures comprise a first phase shift layer configured to react with incident light passing through the first lens and changes a phase of the incident light passing through the first lens, and a second phase shift layer configured to change a phase of incident light passing through the first phase shift layer,
wherein the first phase shift layer comprises a first inner post and a first structure surrounding the first inner post,
wherein the second phase shift layer comprises a second inner post and a second structure surrounding the second inner post,
wherein the first inner post and the first structure respectively comprise materials having different refractive indices, and
wherein the second inner post and the second structure respectively comprise materials having different refractive indices.

12. The lens assembly of claim 11, wherein the first inner post comprises an air post.

13. The lens assembly of claim 1, further comprising:
a third lens having negative optical power with respect to the incident light passing through the second lens and having a concave surface facing the image side;
a fourth lens having positive optical power with respect to the incident light passing through the third lens and having a concave surface facing the object side;
a fifth lens having positive optical power with respect to the incident light passing through the fourth lens and having a concave surface facing the object side; and
a sixth lens having negative optical power with respect to the incident light passing through the fifth lens and having a concave surface facing the object side.

14. The lens assembly of claim 1, wherein the meta-lens comprises a first meta-lens, and
wherein the lens assembly further comprises a second meta-lens and at least one lens provided between the first meta-lens and the second meta-lens.

15. The lens assembly of claim 14, further comprising an infrared filter configured to remove light in an infrared wavelength band of the incident light, and
wherein a surface of the second meta-lens contacts the infrared filter.

16. An electronic device comprising:
a lens assembly comprising a plurality of lenses arranged from an object side to an image side;
an image sensor configured to detect an image of the object based on incident light passing through the plurality of lenses sequentially; and
an image signal processor configured to store or output an image,
wherein the lens assembly comprises:
a first lens having positive optical power with respect to incident light incident from the object side and having a convex surface facing the object side; and
a second lens comprising a meta-lens having negative chromatic aberration with respect to the incident light passing through the first lens, and
wherein the meta-lens satisfies the following equation:

$$f_{M1}\lambda_1 = f_{M2}\lambda_2 = f_{M3}\lambda_3,$$

where $f_{M1}$ is a focal length of the meta-lens for light of a first wavelength $\lambda_1$ of the incident light, $f_{M2}$ is a focal length of the meta-lens for light of a second wavelength $\lambda_2$ of the incident light, and $f_{M3}$ is a focal length of the meta-lens for light of a third wavelength $\lambda_3$ of the incident light.

17. The electronic device of claim 16, wherein the meta-lens comprises a nano structure array, the meta-lens being configured to form an identical phase delay profile for at least two different wavelengths of the incident light.

18. The electronic device of claim 16, wherein the incident light is visible light.

19. The lens assembly of claim 16, wherein the lens assembly comprises a total of five or more lenses.

20. The electronic device of claim 16, wherein the second lens further comprises a refractive lens having positive optical power with respect to the incident light passing through the meta-lens, a surface facing the object side of the second lens being in contact with the meta-lens.

21. The electronic device of claim 16, wherein the lens assembly satisfies the following expression:

0.8*F0<F1<1.2*F0, where F1 is a focal length of the first lens and F0 is a composite focal length of the lens assembly.

22. The electronic device of claim 16, wherein the lens assembly satisfies the following expression:

0.85*F0<TTL<1.2*F0, where TTL is a total track length of the lens assembly and F0 is a composite focal length of the lens assembly.

23. The electronic device of claim 16, wherein an effective radius of a surface facing the object side of the first lens is greater than an effective radius of a surface facing the object side of the second lens.

24. The electronic device of claim 17, wherein the nano structure array comprises a plurality of nano structures,
wherein the plurality of nano structures comprise a first phase shift layer configured to react with incident light passing through the first lens and change a phase of the incident light passing through the first lens, and a second phase shift layer configured to change a phase of incident light passing through the first phase shift layer, and
wherein a first nano structure of the plurality of nano structures and a second nano structure of the plurality of nano structures adjacent to the first nano structure satisfy the following expressions:

N11>N21, and

N12<N22, where N11 is an effective refractive index of the first phase shift layer of the first nano structure, N12 is an effective refractive index of the second phase shift layer of the first nano structure, N21 is an effective refractive index of the first phase shift layer of the second nano structure, and N22 is an effective refractive index of the second phase shift layer of the second nano structure.

25. The electronic device of claim 17, wherein the nano structure array comprises a plurality of nano structures,
wherein the plurality of nano structures comprise a first phase shift layer configured to react with incident light passing through the first lens and change a phase of the incident light, and a second phase shift layer configured to change a phase of incident light passing through the first phase shift layer, and
wherein a first nano structure of the plurality of nano structures and a second nano structure of the plurality of nano structures adjacent to the first nano structure satisfy the following equation:

$$\frac{\frac{(D11-D21)}{D11}}{(N11-N21)} \neq \frac{\frac{(D22-D12)}{D12}}{(N22-N12)},$$

where N11 is an effective refractive index of the first phase shift layer of the first nano structure, N12 is an effective refractive index of the second phase shift layer of the first nano structure, N21 is an effective refractive index of the first phase shift layer of the second nano structure, N22 is an effective refractive index of the second phase shift layer of the second nano structure, D11 is dispersion of the first phase shift layer of the first nano structure, D12 is dispersion of the second phase shift layer of the first nano structure, D21 is dispersion of the first phase shift layer of the second nano structure, and D22 is dispersion of the second phase shift layer of the second nano structure.

26. The electronic device of claim 17, wherein the nano structure array comprises a plurality of nano structures,
wherein the plurality of nano structures comprise a first phase shift layer configured to react with incident light passing through the first lens and change a phase of the incident light, and a second phase shift layer configured to change a phase of incident light passing through the first phase shift layer,
wherein the first phase shift layer comprises a first inner post and a first structure surrounding the first inner post,
wherein the second phase shift layer comprises a second inner post and a second structure surrounding the second inner post,
wherein the first inner post and the first structure respectively comprise materials having different refractive indices, and
wherein the second inner post and the second structure respectively comprise materials having different refractive indices.

27. The electronic device of claim 26, wherein the first inner post comprises an air post.

28. The electronic device of claim 16, further comprising:
a third lens having negative optical power with respect to the incident light passing through the second lens and having a concave surface facing the image side;
a fourth lens having positive optical power with respect to the incident light passing through the third lens and having a concave surface facing the object side;
a fifth lens having positive optical power with respect to the incident light passing through the fourth lens and having a concave surface facing the object side; and
a sixth lens having negative optical power with respect to the incident light passing through the fifth lens and having a concave surface facing the object side.

29. The electronic device of claim 16, wherein the meta-lens comprises a first meta-lens, and
wherein the lens assembly further comprises a second meta-lens and at least one lens provided between the first meta-lens and the second meta-lens.

30. The electronic device of claim 29, wherein the lens assembly further comprises an infrared filter configured to remove light in an infrared wavelength band of the incident light, and
wherein a surface of the second meta-lens contacts the infrared filter.

31. A meta-lens comprising:
nano structures comprising:
a first phase shift layer configured to react with incident light to change a phase of the incident light; and
a second phase shift layer configured to change the phase of the incident light passing through the first phase shift layer, wherein the nano structures are configured to form an identical phase delay profile for at least two different wavelengths of the incident light, and wherein a first nano structure of one of the nano structures and a second nano structure adjacent to the first nano structure satisfy the following expressions:

N11>N21, and

N12<N22, where N11 is an effective refractive index of the first phase shift layer of the first nano structure, N12 is an effective refractive index of the second phase shift layer of the first nano structure, N21 is an effective refractive index of the first phase shift layer of the second nano structure, N22 is an effective refractive index of the second phase shift layer of the second nano structure.

32. The meta-lens of claim 31, wherein the incident light is visible light.

33. The meta-lens of claim 31, wherein the meta-lens satisfies the following equation:

$$f_{M1}\lambda_1 = f_{M2}\lambda_2 = f_{M3}\lambda_3,$$

where $f_{M1}$ is a focal length of the meta-lens for light of a first wavelength $\lambda_1$ of the incident light, $f_{M2}$ is a focal length of the meta-lens for light of a second wavelength $\lambda_2$ of the incident light, and $f_{M3}$ is a focal length of the meta-lens for light of a third wavelength $\lambda_3$ of the incident light.

34. The meta-lens of claim 31, wherein the first nano structure of one of the nano structures and the second nano structure adjacent to the first nano structure satisfy the following equation:

$$\frac{\frac{(D11-D21)}{D11}}{\frac{(N11-N21)}{N11}} \neq \frac{\frac{(D22-D12)}{D12}}{\frac{(N22-N12)}{N12}},$$

where N11 is an effective refractive index of the first phase shift layer of the first nano structure, N12 is an effective refractive index of the second phase shift layer of the first nano structure, N21 is an effective refractive index of the first phase shift layer of the second nano structure, N22 is an effective refractive index of the second phase shift layer of the second nano structure, D11 is dispersion of the first phase shift layer of the first nano structure, D12 is dispersion of the second phase shift layer of the first nano structure, D21 is dispersion of the first phase shift layer of the second nano structure, and D22 is dispersion of the second phase shift layer of the second nano structure.

35. The meta-lens of claim 31, wherein the first phase shift layer comprises a first inner post and a first structure surrounding the first inner post, wherein the second phase shift layer comprises a second inner post and a second structure surrounding the second inner post, wherein the first inner post and the first structure respectively comprise materials having different refractive indices, and wherein the second inner post and the second structure respectively comprise materials having different refractive indices.

36. The meta-lens of claim 35, wherein the first inner post comprises an air post.

37. The meta-lens of claim 35, wherein the second inner post comprises a material having a higher refractive index than a refractive index of the first inner post.

38. The meta-lens of claim 35, wherein the first inner post and the second inner post respectively have a post shape with a width to height ratio of 2 or more.

39. The meta-lens of claim 31, further comprising:
a support layer configured to support the first phase shift layer and the second phase shift layer.

40. The meta-lens of claim 31, further comprising:
a spacer layer provided between the first phase shift layer and the second phase shift layer.

41. An electronic device comprising:
a lens assembly comprising a plurality of lenses arranged from an object side to an image side;
an image sensor configured to detect an image of an object from incident light passing through the plurality of lenses sequentially; and
an image signal processor configured to store or output an image,
wherein the lens assembly comprises:
a first lens having positive optical power with respect to incident light incident from the object side and having a convex surface facing the object side;
a second lens comprising a meta-lens having negative chromatic aberration with respect to the incident light passing through the first lens;
a third lens having negative optical power with respect to the incident light passing through the second lens and having a concave surface facing the image side;
a fourth lens having positive optical power with respect to the incident light passing through the third lens and having a concave surface facing the object side;
a fifth lens having positive optical power with respect to the incident light passing through the fourth lens and having a concave surface facing the object side; and
a sixth lens having negative optical power with respect to the incident light passing through the fifth lens and having a concave surface facing the object side,
wherein the lens assembly has a modulation transfer function of 0.5 or more at 120 cycles/mm or less for incident light, and
wherein the electronic device satisfies the following expression:

TTL/ISS<0.65, where a total track length (TTL) is a total track length of the lens assembly and an image sensor size (ISS) is a diagonal length of the image sensor.

42. The electronic device of claim 41, wherein the lens assembly comprises a total of five or more lenses.

43. The electronic device of claim 41, wherein the second lens further comprises a refractive lens having positive optical power with respect to the incident light passing through the meta-lens, a surface facing the object side of the second lens being in contact with a surface of the meta-lens facing the image side.

44. The electronic device of claim 41, wherein the lens assembly satisfies the following expression:

0.8*F0<F1<1.2*F0, where F1 is a focal length of the first lens and F0 is a composite focal length of the lens assembly.

45. The electronic device of claim 41, wherein the lens assembly satisfies the following expression:

0.85*F0<TTL<1.2*F0, where TTL is a total track length of the lens assembly and F0 is a composite focal length of the lens assembly.

46. The electronic device of claim 41, wherein an effective radius of a surface facing the object side of the first lens is greater than an effective radius of a surface facing the object side of the second lens.

\* \* \* \* \*